United States Patent
Adachi et al.

(10) Patent No.: US 9,307,533 B2
(45) Date of Patent: Apr. 5, 2016

(54) APPARATUS AND METHOD FOR WIRELESS COMMUNICATION

(71) Applicants: Tomoko Adachi, Tokyo (JP); Toshihisa Nabetani, Kawaski (JP); Kiyoshi Toshimitsu, Tokyo (JP); Tatsuma Hirano, Tokyo (JP)

(72) Inventors: Tomoko Adachi, Tokyo (JP); Toshihisa Nabetani, Kawaski (JP); Kiyoshi Toshimitsu, Tokyo (JP); Tatsuma Hirano, Tokyo (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 13/686,122

(22) Filed: Nov. 27, 2012

(65) Prior Publication Data

US 2013/0083762 A1    Apr. 4, 2013

Related U.S. Application Data

(63) Continuation of application No. 12/410,742, filed on Mar. 25, 2009, now Pat. No. 8,345,588.

(30) Foreign Application Priority Data

Jun. 30, 2008    (JP) .................................. 2008-171490

(51) Int. Cl.
*H04W 72/04* (2009.01)
*H04W 48/18* (2009.01)
*H04W 48/10* (2009.01)
*H04W 88/10* (2009.01)

(52) U.S. Cl.
CPC .......... *H04W 72/0453* (2013.01); *H04W 48/18* (2013.01); *H04W 48/10* (2013.01); *H04W 88/10* (2013.01)

(58) Field of Classification Search
None
See application file for complete search history.

(56) References Cited

U.S. PATENT DOCUMENTS 6,172,991 B1 *  1/2001  Mori ............................. 370/474
6,466,832 B1 * 10/2002  Zuqert et al. .................... 700/94
6,892,076 B2    5/2005  Maalismaa (Continued)

FOREIGN PATENT DOCUMENTS

JP    10-173668 A    6/1998
JP    11205352       7/1999

(Continued)

OTHER PUBLICATIONS

Office Action dated Mar. 21, 2012 from corresponding JP 2008-171490.

(Continued)

*Primary Examiner* — Chi H Pham
*Assistant Examiner* — Shick Hom
(74) *Attorney, Agent, or Firm* — Ohlandt, Greeley, Ruggiero & Perle, LLP.

(57) ABSTRACT

A wireless communication apparatus which can simultaneously conduct communication on at least two frequency channels is described. The apparatus includes a communication unit which refers to a connection management table to determine a communication system which can be used by a wireless communication terminal using an identifier of the wireless communication terminal, and conducts communication with the wireless communication terminal on a second frequency channel using the communication system, when a request from the wireless communication terminal to change the first frequency channel to the second frequency channel is permitted.

35 Claims, 20 Drawing Sheets

(56) References Cited

U.S. PATENT DOCUMENTS

| | | | |
|---|---|---|---|
| 7,990,904 B2 | 8/2011 | Proctor | |
| 2006/0176861 A1* | 8/2006 | Schmidt | 370/337 |
| 2007/0249307 A1* | 10/2007 | Rybicki et al. | 455/137 |
| 2007/0263570 A1* | 11/2007 | Alapuranen et al. | 370/337 |
| 2009/0058612 A1 | 3/2009 | Chung | |
| 2009/0204265 A1 | 8/2009 | Hackett | |
| 2009/0303941 A1 | 12/2009 | Naka et al. | |

FOREIGN PATENT DOCUMENTS

| | | |
|---|---|---|
| JP | 2000-92541 A | 3/2000 |
| JP | 2000-270015 A | 9/2000 |
| JP | 2002-77965 | 3/2002 |
| JP | 2003-110569 A | 4/2003 |
| JP | 2003-348635 A | 12/2003 |
| JP | 2004-32210 | 1/2004 |
| JP | 2004-221710 A | 8/2004 |
| JP | 2004-289373 A | 10/2004 |
| JP | 2004-357056 A | 12/2004 |
| JP | 2005-136458 A | 5/2005 |
| JP | 2006-186692 A | 7/2006 |
| JP | 2006-222835 A | 8/2006 |
| JP | 2006-246115 | 9/2006 |
| JP | 2006-270910 A | 10/2006 |
| JP | 2006-287438 A | 10/2006 |
| JP | 2007-166538 A | 6/2007 |
| JP | 2007-174120 A | 7/2007 |
| JP | 2008-104116 A | 5/2008 |
| JP | 2008-141363 A | 6/2008 |
| JP | 5563639 B2 | 7/2014 |
| WO | 2005/117473 A | 12/2005 |
| WO | 2007/023809 A1 | 3/2007 |

OTHER PUBLICATIONS

R.C. Daniels et al, "Multi-band Modulation, Coding, and Medium Access Control," IEEE 802.11-07/2780rl; Nov. 2007, Austin, TX, 18pp.

Part 11: "Wireless LAN MAC and PHY Specifications," IEEE, 2007, Std 802.11-2007, pp. 421-422, 436-438, and 463-464.

Rajagopal Iyengar et al, "Analysis of Contention-Based Multi-Channel Wireless MAC for Point-to-Multipoint Networks," IEEE, 2006, pp. 1-3.

Yong Huang et al., "Architecture and Scheduling Algorithm for Multi-Channel Wireless Infrastructure Network with Diversity Management Layer," IEEE, 2005, pp. 5336-5341.

Japanese First Office Action (with English translation) dated Sep. 24, 2013 from JP Application No. 2012-219392; 12 pages.

Japanese First Office Action dated May 12, 2015 from corresponding Japanese Patent Application No. 2014-120990, 4 pages.

Japanese Final Office Action dated Dec. 22, 2015 from corresponding Japanese Patent Application No. 2014-120990, 6 pages.

* cited by examiner

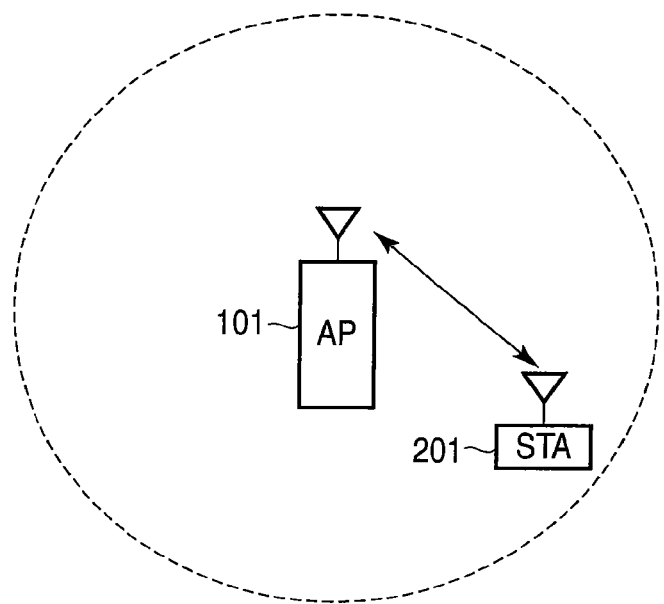
F I G. 1
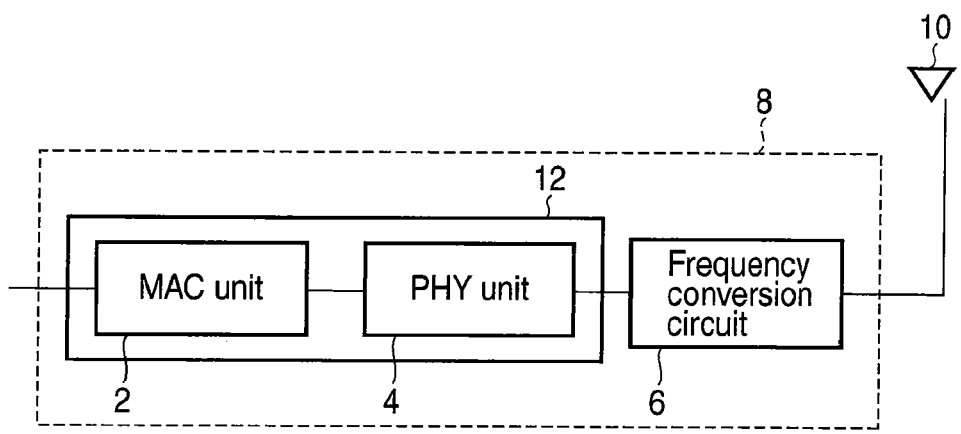
F I G. 2

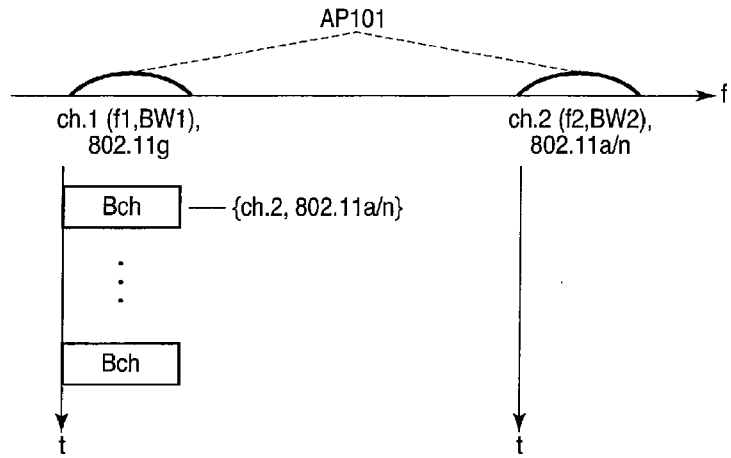
F I G. 9
F I G. 1 0 A
F I G. 1 0 B
F I G. 1 0 C
F I G. 1 0 D

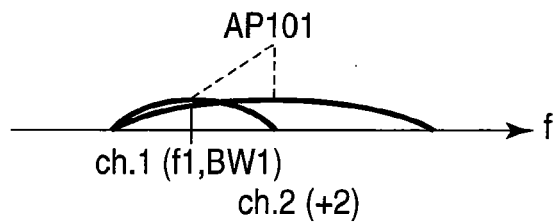
F I G. 1 1
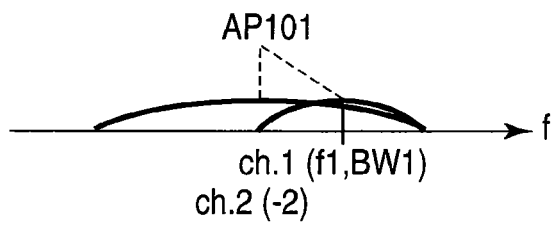
F I G. 1 2
| Channel identifier (ch.2) | Communication method (802.11a) |
F I G. 1 3

| Terminal identifier | Supportable channel | Supportable communication method | Used channel |
|---|---|---|---|
| STA201 | ch.1 | 802.11g | ch.1 |
|  | ch.2 | 802.11a |  |
| STA202 | ch.1 | 802.11g | ch.2 |
|  | ch.2 | 802.11a/n |  |

F I G. 1 4 A

| Terminal identifier | Supportable communication method | Used channel |
|---|---|---|
| STA201 | 802.11a/g | ch.1 |
| STA202 | 0802.11a/g/n | ch.2 |

F I G. 1 4 B

| Base station identifier | Supportable channel | Supportable communication method | Used channel |
|---|---|---|---|
| AP101 | ch.1 | 802.11g | ch.1 |
|  | ch.2 | 802.11a |  |

F I G. 1 5

| Modulation method | Coding rate (R) | Data rate (Mbps) | Mandatory /option |
|---|---|---|---|
| BPSK | 1/2 | 6 | Mandatory |
| BPSK | 3/4 | 9 | option |
| QPSK | 1/2 | 12 | Mandatory |
| QPSK | 3/4 | 18 | option |
| 16-QAM | 1/2 | 24 | Mandatory |
| 16-QAM | 3/4 | 26 | option |
| 64-QAM | 2/3 | 48 | option |
| 64-QAM | 3/4 | 54 | option |

F I G. 1 8

| MCS index | Number of streams (Nss) | Modulation method | Coding rate (R) | Data rate (Mbps) | Mandatory /option |
|---|---|---|---|---|---|
| 0 | 1 | BPSK | 1/2 | 6.5 | Mandatory |
| 1 | 1 | QPSK | 1/2 | 13.0 | Mandatory |
| 2 | 1 | QPSK | 3/4 | 19.5 | Mandatory |
| 3 | 1 | 16-QAM | 1/2 | 26.0 | Mandatory |
| 4 | 1 | 16-QAM | 3/4 | 39.0 | Mandatory |
| 5 | 1 | 64-QAM | 2/3 | 52.0 | Mandatory |
| 6 | 1 | 64-QAM | 3/4 | 58.5 | Mandatory |
| 7 | 1 | 64-QAM | 5/6 | 65.0 | Mandatory |
| 8 | 2 | BPSK | 1/2 | 13.0 | option |
| 9 | 2 | QPSK | 1/2 | 26.0 | option |
| ⋮ | | | | | |

F I G. 1 9

| Terminal identifier | Supportable channel | Supportable communication method | Transmittable and receivable data rate/MCS | Receivable data rate/MCS | Used channel |
|---|---|---|---|---|---|
| STA201 | ch.1 | 802.11g | 6, 12, 24 | 36, 54 | ch.1 |
|  | ch.2 | 802.11a | 6, 12, 24 | 36, 54 |  |
| STA202 | ch.1 | 802.11g | 6, 9, 12, 24, 36, 48, 54 |  | ch.2 |
|  | ch.2 | 802.11a | 6, 9, 12, 18, 24, 36, 48, 54 |  |  |
|  |  | 802.11n | 0-32 | 33, 34 |  |

FIG. 20

| Terminal identifier | Supportable channel | Supportable communication method | Transmittable and receivable data rate/MCS | Receivable data rate/MCS | Used channel |
|---|---|---|---|---|---|
| AP101 | ch.1 | 802.11g | 6, 12, 24, 36, 54 | 9, 18, 48 | ch.1 |
|  | ch.2 | 802.11a | 6, 12, 24, 36, 54 | 9, 18, 48 |  |

FIG. 21

| Information |
|---|
| Timestamp |
| Beacon Interval |
| Capability |
| Service Set Identifier (SSID) |
| Supported Rates |
| ⋮ |
| Country |
| ⋮ |
| HT Capabilities |
| HT Information |
| ⋮ |

F I G. 2 2

| B0 | B1 | B2 | B3 | B4 | B5 | B6 | B7 | B8 | B9 | B10 | B11 | B12 | B13 | B14 | B15 |
|---|---|---|---|---|---|---|---|---|---|---|---|---|---|---|---|
| ESS | IBSS | CF Pollable | CF-Poll Request | Privacy | Short Preamble | PBCC | Channel Agility | Spectrum Mgmt | QoS | Short Slot Time | APSD | Reserved | DSSS-OFDM | Delayed Block Ack | Immediate Block Ack |

| Element ID | Length | Primary Channel | Secondary Channel Offset | STA Channel Width | RIFS Mode | S-PSMP Support | Service Interval Granularity |
|---|---|---|---|---|---|---|---|
| | | B0 | B1 | B2 | B3 | B4 B5 | B5 B7 |

Octets: 1  1  1

FIG. 25B

| HT Protection | Non-greenfield HT STAs Present | Reserved | OBSS Non-HT STAs Present | Reserved | Reserved | Dual Beacon | Dual CTS Protection | STBC Beacon | L-SIG TXOP Protection Full Support | PCO Active | PCO Phase | Reserved | Basic MCS Set |
|---|---|---|---|---|---|---|---|---|---|---|---|---|---|
| B0 B1 | B2 | B3 | B4 | B5 B15 | B0 B5 | B6 | B7 | B8 | B9 | B10 | B11 | B12 B15 | |

2  2  16

| Information |
|---|
| Capability |
| Listen Interval |
| SSID |
| Supported Rates |
| Extended Supported Rates |
| ⋮ |
| Support Channels |
| ⋮ |
| QoS Capablities |
| ⋮ |
| HT Capablities |
| ⋮ |
F I G. 2 6
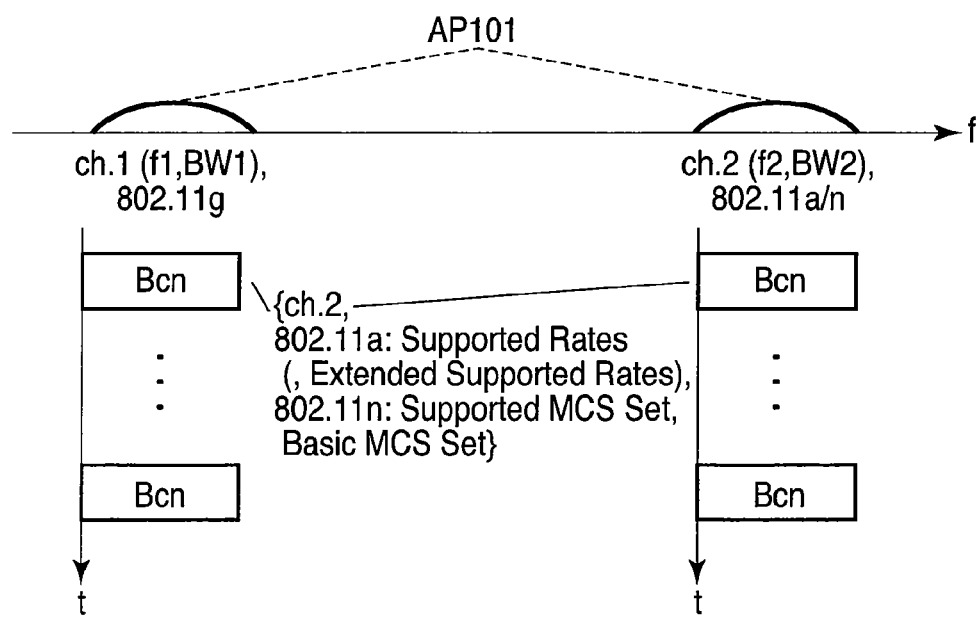
F I G. 2 7

| Information |
|---|
| Ch.# |
| BSSID |
| SSID |
| BSSType |
| Beacon Interval |
| DTIM Period |
| Timestamp |
| Local Time |
| ⋮ |

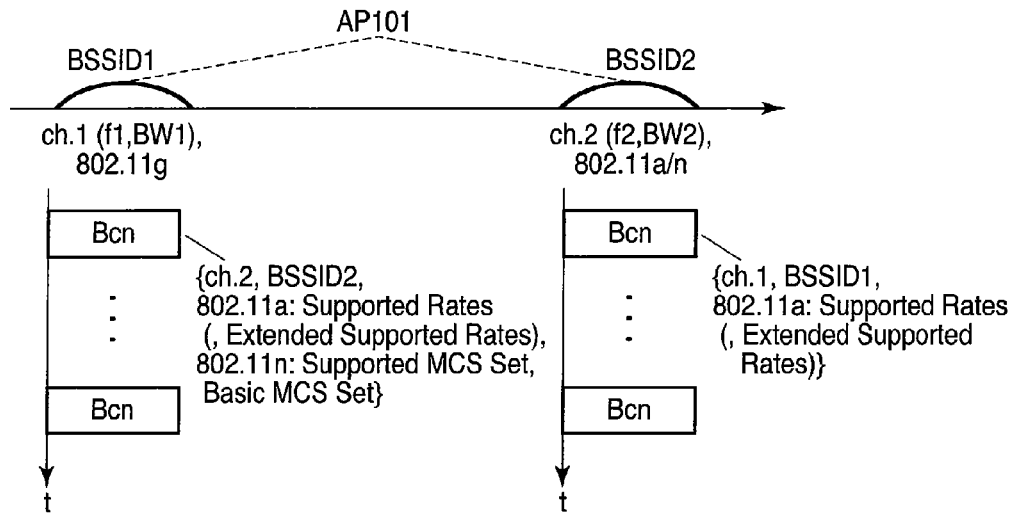
F I G. 30
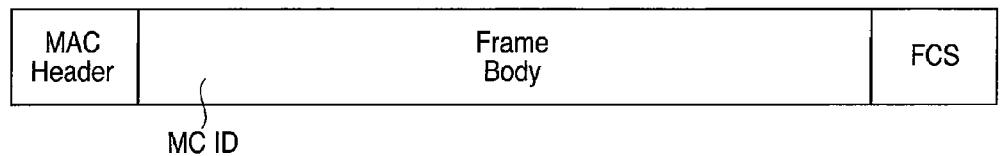
F I G. 31
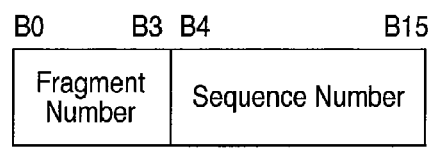
F I G. 32

| Terminal identifier | Supportable channel | Supportable communication method | Security information |
|---|---|---|---|
| STA201 | ch.1 | 802.11g | TKIP |
| | ch.2 | 802.11a | |
| STA202 | ch.1 | 802.11g | CCMP |
| | ch.2 | 802.11a/n | |
F I G. 3 3
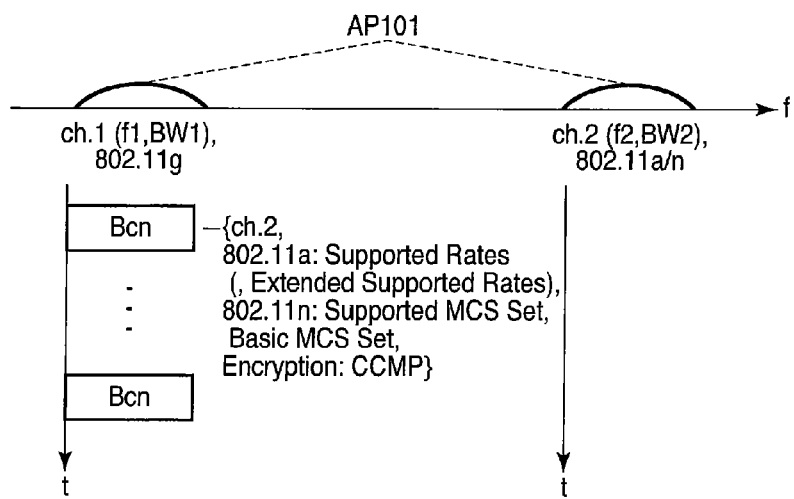
F I G. 3 4
| Base station identifier | Supportable channel | Supportable communication method | Encryption method | Used channel |
|---|---|---|---|---|
| AP101 | ch.1 | 802.11g | TKIP, CCMP | ch.1 |
| | ch.2 | 802.11a | CCMP | |
F I G. 3 5

| Base station identifier | Supportable channel | Supportable communication method | Supportable encryption method | Used channel | Security information |
|---|---|---|---|---|---|
| STA201 | ch.1 | 802.11g | TKIP, CCMP | ch.1 | TKIP |
| | ch.2 | 802.11a | | | |
| STA202 | ch.1 | 802.11g | CCMP | ch.1 | CCMP |
| | ch.2 | 802.11a/n | | | |

F I G. 3 6

| Terminal identifier | Supportable channel | Supportable communication method | Transmittable and receivable data rate/MCS | Receivable data rate/MCS | Used channel |
|---|---|---|---|---|---|
| STA201 | ch.1 | 802.11g | 6, 12, 24 | 36, 54 | ch.1 |
| | ch.2 | 802.11a | 6, 12, 24 | 36, 54 | |
| STA202 | ch.1 | 802.11g | 6, 9, 12, 24, 36, 48, 54 | | ch.1 |
| | ch.2 | 802.11a | 6, 9, 12, 18, 24, 36, 48, 54 | | |
| | | 802.11n | 0-32 | 33, 34 | |

F I G. 3 7

| Terminal identifier | Supportable channel | Supportable communication method | Transmittable and receivable data rate/MCS | Receivable data rate/MCS | Used channel |
|---|---|---|---|---|---|
| STA201 | ch.1 | 802.11g | 6, 12, 24 | 36, 54 | ch.1 |
|  | ch.2 | 802.11a | 6, 12, 24 | 36, 54 |  |
| STA202 | ch.1 | 802.11g | 6, 9, 12, 24, 36, 48, 54 |  | ch.1 |
|  | ch.2 | 802.11a | 6, 9, 12, 18, 24, 36, 48, 54 |  |  |
|  |  | 802.11n | 0-32 |  |  |
F I G. 3 8
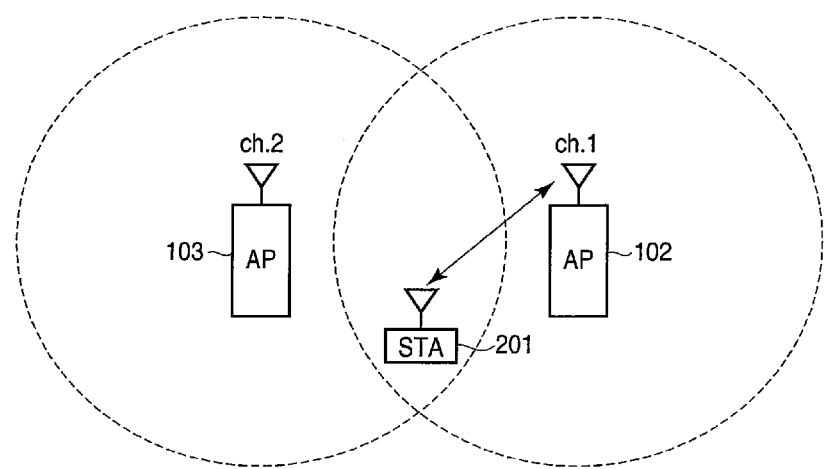
F I G. 3 9

APPARATUS AND METHOD FOR WIRELESS COMMUNICATION

CROSS-REFERENCE TO RELATED APPLICATIONS

This application is a continuation of U.S. application Ser. No. 12/410,742, filed Mar. 25, 2009, which issued as U.S. Pat. No. 8,345,588 on Jan. 1, 2013, and which is based upon and claims the benefit of priority from prior Japanese Patent Application No. 2008-171490, filed Jun. 30, 2008, the entire contents of each of which are incorporated herein by reference.

BACKGROUND OF THE INVENTION

1. Field of the Invention

The present invention relates to a wireless communication apparatus which can simultaneously conduct communication through plural frequency channels and a communication party on the other end which switches among frequency channels.

2. Description of the Related Art

Conventionally, in the case where a wireless communication terminal being connected to a wireless communication base station, changes a frequency channel while the wireless communication terminal scans to see whether or not there is a wireless communication base station connectable on the new frequency channel, and confirms whether or not the wireless communication base station whose existence is confirmed by the scanning is a proper wireless communication base station, whereby the wireless communication terminal sends a connection request to the wireless communication base station. When the wireless communication base station permits the wireless communication terminal to be connected thereto in response to the connection request, the connection is completed, and the wireless communication terminal starts the communication with the wireless communication base station.

There are a procedure for moving a wireless communication base station and wireless communication terminals connected thereto to another frequency channel and a procedure for moving an entire system consisting of only wireless communication terminals to another frequency channel (for example, see IEEE Std.802.11—2007, "IEEE Standard for Information technology—Telecommunications and information exchange between systems-Local and metropolitan area networks—Specific requirements; Part 11: Wireless LAN Medium Access Control (MAC) and Physical Layer (PHY) Specifications", IEEE Computer Society, Jun. 12, 2007). In addition, there are some studies for a system in which communication is simultaneously conducted on plural frequency channels (for example, see R. Lyenger, et al., "Analysis of Contention-based Multi-channel Wireless: MAC for Point-to-multipoint Networks," Proc. of the 2006 International Symposium on a World of Wireless, Mobile and Multimedia Networks (WoWMoM '06), 26-29 Jun. 2006, 3 pp., Y Huang, et al., "Architecture and Scheduling Algorithm for a Multi-Channel Wireless Infrastructure Network with Diversity Management Layer," Proc. of The 44th IEEE Conf. on Decision and Control, and the European Control Conf. 2005, Dec. 12-15, 2005, pp. 406-410, R. C. Daniels, et al., "Multi-band Modulation, Coding, and Medium Access Control," doc.: IEEE 802.11-07/2780r1, November 2007, JP-A Nos. 2006-246115 (KOKAI), 11-205352 (KOKAI), 2004-32210 (KOKAI), and 2002-77965 (KOKAI)).

In IEEE 802.11 wireless LAN, from the viewpoints of coverage securement and effective utilization of frequency channels, there is a discussion that plural frequency channels are shared under one wireless communication base station (for example, see R. C. Daniels, et al., "Multi-band Modulation, Coding, and Medium Access Control," doc.: IEEE 802.11-07/2780r1, November 2007). There are a system in which a control station collects pieces of information on wireless communication base stations to allocate an optimum communication channel to wireless communication terminals (for example, see JP-A No. 2006-246115 (KOKAI) and Y. Huang, et al., "Architecture and Scheduling Algorithm for a Multi-Channel Wireless Infrastructure Network with Diversity Management Layer," Proc. of the 44th IEEE Conf. on Decision and Control, and the European Control Conf. 2005, Dec. 12-15, 2005, pp. 406-410), a system for allocating a communication protocol to wireless communication terminals (for example, see JP-A No. 11-205352 (KOKAI)), a system in which a wireless communication base station that can conduct communication on plural frequency channels newly allocates a frequency channel to a terminal requesting communication according to wireless condition (for example, see JP-A No. 2004-32210 (KOKAI)), and a system to hand over a connected wireless communication terminal to another system (for example, see JP-A No. 2002-77965 (KOKAI)).

By the conventional techniques, although a wireless communication base station can perform transmission and reception on plural frequency channels, wireless communication terminals connected to the wireless communication base station cannot recognize that the wireless communication base station can perform the transmission and reception on the plural frequency channels. Accordingly, in the case where the wireless communication terminal changes the frequency channel to another frequency channel on which the wireless communication base station can perform the transmission and reception, it is necessary for the wireless communication terminal to scanning again whether or not there is a connectable wireless communication base station.

Even if plural communication systems such as modulation and coding schemes and security systems can be used by the wireless communication base station, in each frequency, the wireless communication base station does not notify the wireless communication terminals of the communication systems that are supported in other frequencies. Accordingly, in the case where the wireless communication terminal moves to another frequency channel on which the wireless communication base station can perform transmission and reception, it is necessary for the wireless communication terminal obtain information on the communication system with which the wireless communication base station is supported at the frequency channel from the wireless communication base station again.

Thus, it is preferable to be able to make a notification that the transmission and reception can be performed on plural frequency channels. When plural communication systems such as modulation and coding schemes and security systems can be used, it is preferable in each frequency to be able to make a notification of the communication systems that are supported in other frequencies. It is preferable that a wireless communication apparatus can manage the communication systems with which another wireless communication apparatus is supported over plural frequency channels.

BRIEF SUMMARY OF THE INVENTION

According to one aspect of the present invention, there is provided a wireless communication apparatus which can simultaneously conduct communication on at least two frequency channels, comprising: notification unit which makes a notification of an identifier of a second frequency channel and a communication system on a first frequency channel, the second frequency channel being in a wireless packet receivable state other than the first frequency channel, the communication system being used on the second frequency channel; a connection management table in which a communication system is retained along with an identifier of a wireless communication terminal and identifiers of frequency channels, the identifiers of the frequency channels including at least an identifier of the first frequency channel, the communication system being able to be used by the wireless communication terminal and notified by the wireless communication terminal when connection of the wireless communication terminal is permitted on the first frequency channel; and communication unit which refers to the connection management table to determine the communication system which can be used by the wireless communication terminal using the identifier of the wireless communication terminal, and conducts communication with the wireless communication terminal on the second frequency channel using the communication system, when a request from the wireless communication terminal to change the first frequency channel to the second frequency channel is permitted.

BRIEF DESCRIPTION OF THE SEVERAL VIEWS OF THE DRAWING

FIG. 1 typically shows the case in which a wireless communication base station and a wireless communication terminal according to an embodiment are connected to each other;

FIG. 2 is a functional block diagram showing a communication function unit incorporated into the wireless communication base station and wireless communication terminal of the embodiment;

FIG. 9 shows a state in which the wireless communication base station of the first embodiment sends a beacon frame;

FIGS. 10A to 10D show examples of notation of a item in a MAC frame with which the wireless communication base station of the first embodiment notifies the wireless communication terminal of information on another frequency channel;

FIG. 11 shows an example in which two frequency channels partly overlap each other on the frequency channel in the first embodiment;

FIG. 12 shows another example in which two frequency channels partly overlap each other on the frequency channel in the first embodiment;

FIG. 13 shows an example of the notation of the item in the MAC frame which the wireless communication terminal of the first embodiment notifies the wireless communication base station of information on another frequency channel;

FIGS. 14A and 14B show examples of a connection management table in the wireless communication base station of the first embodiment;

FIG. 15 shows an example of the connection management table in the wireless communication terminal of the first embodiment;

FIG. 18 shows a transmission rate defined by IEEE 802.11a in the second embodiment;

FIG. 19 shows a relationship between MCS defined by IEEE 802.11n and a transmission rate in a 20-MHz channel bandwidth in the second embodiment;

FIG. 20 shows an example of a connection management table in the wireless communication base station of the second embodiment;

FIG. 21 shows an example of the connection management table in the wireless communication terminal of the second embodiment;

FIG. 22 shows a beacon frame according to a third embodiment;

FIG. 24 shows a capability element of the third embodiment;

FIGS. 25A and 25B show an HT Information element of the third embodiment;

FIG. 26 shows an association request frame of the third embodiment;

FIG. 27 shows a state in which a wireless communication base station according to a fourth embodiment sends a beacon frame;

FIG. 30 shows another state in which the wireless communication base station of the fifth embodiment sends the beacon frame;

FIG. 31 shows a state in which Multi-Channel ID is inserted into frame body fields in a beacon frame and a probe response frame according to a sixth embodiment;

FIG. 32 shows a sequence control item according to a seventh embodiment;

FIG. 33 shows an example of a connection management table in a wireless communication base station according to a ninth embodiment;

FIG. 34 shows a state in which a wireless communication base station according to a tenth embodiment sends a beacon frame;

FIG. 35 shows an example of a connection management table in a wireless communication terminal of the tenth embodiment;

FIG. 36 shows an example of the connection management table in a wireless communication base station according to an eleventh embodiment;

FIG. 37 shows an example of a connection management table in a wireless communication base station according to a thirteenth embodiment;

FIG. 38 shows an example of the updated connection management table in the wireless communication base station of the thirteenth embodiment; and FIG. 39 shows a relationship between a wireless communication base station and a wireless communication terminal according to a fourteenth.

DETAILED DESCRIPTION OF THE INVENTION

Figure 3:
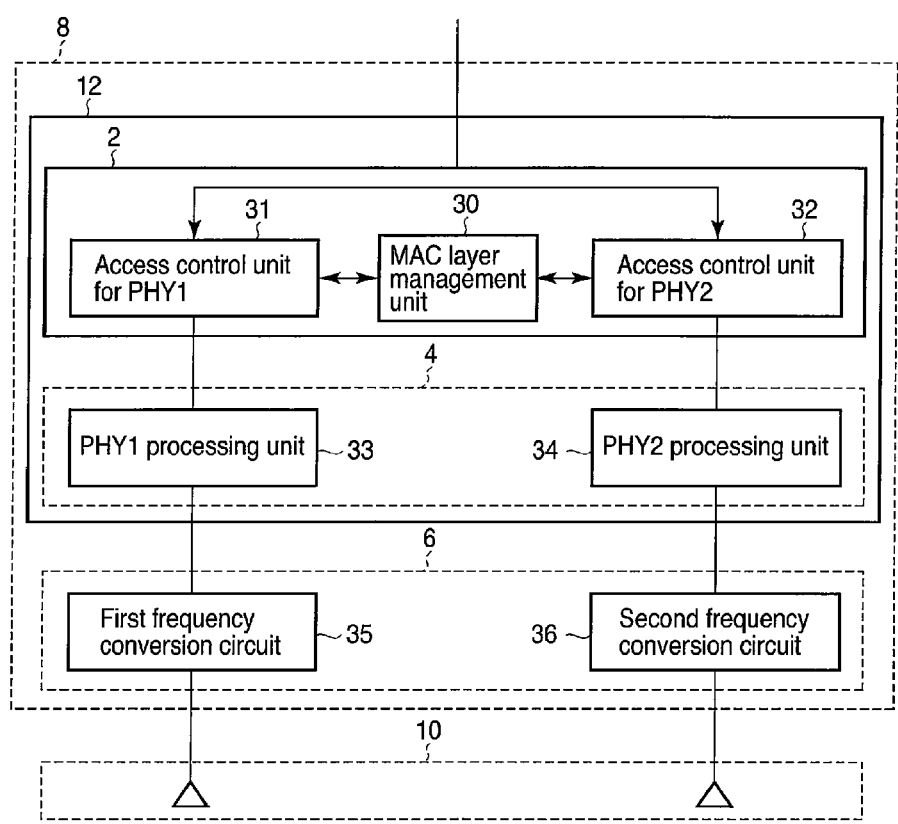
FIG. 3 is a functional block diagram showing the details of the communication function unit in the wireless communication base station of the embodiment.

Embodiments of the invention will be described in detail below with reference to the drawings.

Referring to FIG. 1, a wireless communication base station (AP (Access Point) in the FIG. 101 and a wireless communication terminal (STA (STAtion) in the FIG. 201 are connected to each other. The wireless communication base station 101 may be connected to one or plural wireless communication terminals other than the wireless communication terminal 201, or may be connected to another one or plural wireless communication base stations, or may be connected to a wired network. The wireless communication terminal 201 may be connected to another one or plural wireless communication terminals connected to the wireless communication base station 101. As used herein, "connection" between the wireless communication base station and the wireless communication terminal, between the wireless communication base stations, or between the wireless communication terminals shall mean a state in which the wireless communication terminals mutually recognize the existence and has exchanged notifications of capabilities necessary for the communication. The wireless communication can be conducted between the wireless communication base station and wireless communication terminal that are in the connected state, between the wireless communication base stations in the connected state, or between the wireless communication terminals in the connected state. The wireless communication base station and the wireless communication terminal(s) connected to the wireless communication base station correspond to a component called an infrastructure BSS (Basic Service Set) in the IEEE 802.11 wireless LAN system. Sometimes the infrastructure BSS is simply referred to as BSS.

FIG. 2 is a functional block diagram showing a communication function unit incorporated in the wireless communication base station and wireless communication terminal of the embodiment. Referring to FIG. 2, a wireless communication function unit 8 includes a baseband processing unit 12, a frequency conversion circuit 6, and a wireless antenna 10. The wireless communication function unit 8 generates data whose communication is conducted through a Logical Link Control (LLC) layer defined by, for example, an IEEE 802 standard. The wireless communication function unit 8 may be connected to a user interface that displays the data on a display. In the configuration of FIG. 1, the wireless communication base station is connected to the wired network, and the wireless communication function unit 8 of the wireless communication base station can exchange the data with other wireless communication base stations or terminals including wireless communication terminals that are located on the wired network.

The baseband processing unit 12 includes a MAC (Media Access Control) unit 2 and a PHY (PHYsical) unit 4. The baseband processing unit 12 is pursuant to an IEEE 802.11 wireless LAN (including series of amendment and supplement standards such as 802.11a, 802.11b, 802.11e, 802.11g, 802.11h, 802.11i, 802.11j, and 802.11n after IEEE 802.11, the same holds true for the following descriptions) system. The MAC unit 2 performs a specified operation relating to a MAC layer, and the PHY unit 4 performs a specified operation relating to a PHY layer. The MAC unit 2 includes a memory for a work area and a frame buffer. The MAC unit 2 performs MAC header processing, access control for transmitting a MAC frame, reception frame processing including response frame transmission and management relating to a set up between wireless communication terminals. The latter-mentioned wireless communication terminal information or wireless communication base station information is also stored in the memory. Instead of being incorporated into the MAC unit 2 in order to specialize in the MAC processing, the memory may be provided outside the MAC unit 2, and may be also used in other pieces of processing than the MAC layer. The PHY unit 4 is connected to the MAC unit 2, and performs PLCP (Physical Layer Convergence Protocol) header processing, modulation and demodulation processing, and A/D conversion processing.

The frequency conversion circuit 6 is connected to the PHY unit 4. The frequency conversion circuit 6 converts a frequency of a transmission signal in a stepwise manner in order to radiate a radio wave from an antenna 10, and converts a frequency of a reception signal in a stepwise manner such that the received radio wave can be processed by the PHY unit 4.

For example, the data fed from the LLC layer is converted into the MAC frame by the MAC unit 2, and the MAC frame is converted into the PHY packet by the PHY unit 4 and is sent as a radio signal from the antenna 10 through the frequency conversion circuit 6. On the contrary, the radio signal received from the antenna 10 is processed through the frequency conversion circuit 6, PHY unit 4, and MAC unit 2, and the data addressed to the terminal is supplied to a higher layer such as the LLC layer.

FIG. 3 shows a detailed functional block diagram of the wireless communication base station of the embodiment. The reference numerals of FIG. 3 are in common with those of FIG. 2. In the wireless communication base station, at least two access control units (access control unit for PHY1 31 and access control unit for PHY2 32 in FIG. 3) corresponding to the PHY unit 4 are provided in the MAC unit 2, the PHY unit 4 includes at least two processing units (PHY1 processing unit 33 and PHY2 processing unit 34 in FIG. 3) corresponding to the PHY layer, the access control units are respectively connected to the PHY processing units (in FIG. 3, the access control unit for PHY1 31 is connected to the PHY1 processing unit 33, and the access control unit for PHY2 32 is connected to the PHY2 processing unit 34), the PHY processing units are respectively connected to the frequency conversion circuits (first frequency conversion circuit 35 and second frequency conversion circuit 36 of FIG. 3), and the frequency conversion circuits are respectively connected to antennas. The access control units for PHY (access control unit for PHY1 31 and access control unit for PHY2 32 of FIG. 3) in the MAC unit 2 are connected to a MAC layer management unit (corresponding to a portion that performs MAC sub-Layer Management Entity (MLME) in IEEE 802.11 wireless LAN) 30, and the access control units for PHY are connected to each other (arrow between the access control unit for PHY1 31 and access control unit for PHY2 32 of FIG. 3). For the frequency conversion circuit 8 and the antenna 10, a configuration other than the configuration of FIG. 3 may be adopted when the radio signals having different frequencies can simultaneously be transmitted or received from the antenna 10.

For example, the radio signal sent through the access control unit for PHY1 31, PHY1 processing unit 33, and first frequency conversion circuit 35 of FIG. 3 is one that is supported with IEEE 802.11b or IEEE 802.11g which is a 2.4 GHz bandwidth wireless LAN or IEEE 802.11n operated in a 2.4 GHz bandwidth. For example, the radio signal sent through the access control unit for PHY2 32, PHY2 processing unit 34, and second frequency conversion circuit 36 is one that is supported with IEEE 802.11a which is a 5 GHz bandwidth wireless LAN or IEEE 802.11n operated in a 5 GHz bandwidth.

In this case, the access control unit for PHY1 31 performs control to transmit the radio signal using access control parameters (a slot length, a SIFS (Short Inter-Frame Space) length, and the like that are used to perform CSMA/CA) and information on the modulation and coding scheme according to IEEE 802.11b, IEEE 802.11g, or 2.4 GHz bandwidth IEEE 802.11n. The access control unit for PHY2 32 performs control to transmit the radio signal using the access control parameters and the information on the modulation and coding scheme according to IEEE 802.11a or 5 GHz bandwidth IEEE 802.11n. Thus, in the wireless communication base station, the communication using different extensions/amendments in the same standard may be conducted simultaneously. The communication may be conducted by not only the different extensions/amendments in the same standard, such as 2.4 GHz bandwidth IEEE 802.11g and 5 GHz bandwidth IEEE 802.11a as above-described example, but different frequency channels used in the same extension/amendment of the same standard, like channel numbers 36 and 44 of frequency channels used in 5 GHz bandwidth IEEE 802.11a.

Alternatively, for example, the radio signal sent through the access control unit for PHY1 31, PHY1 processing unit 33, and first frequency conversion circuit 35 of FIG. 3 is a 5 GHz-band signal and the radio signal sent through the access control unit for PHY2 32, the PHY2 processing unit 34, and the second frequency conversion circuit 36 is a 60 GHz bandwidth (so-called millimeter wave bandwidth of 57 GHz to 62 GHz) signal. Here, the access control unit for PHY1 31 performs control using parameters and information relating to transmission of the 5 GHz-band radio signal, and the access control unit for PHY2 32 performs control using parameters and information relating to transmission of the radio signal in the 60 GHz bandwidth (for example, frequency bandwidth of 57 GHz to 66 GHz). A wireless communication base station may be such as this using communication systems having largely different frequency bandwidths simultaneously.

Alternatively, for example, the radio signal sent through the access control unit for PHY1 31, PHY1 processing unit 33, and first frequency conversion circuit 35 of FIG. 3 is for a GSM or 3GPP portable telephone (cellular phone) and the radio signal sent through the access control unit for PHY2 32, PHY2 processing unit 34, and second frequency conversion circuit 36 is for a wireless LAN. Here, the access control unit for PHY1 31 performs control using parameters and information relating to transmission of the radio signal for the GSM or 3GPP portable telephone (cellular phone), and the access control unit for PHY2 32 performs control using parameters and information relating to transmission of the radio signal for the wireless LAN. Or, the communication system may be those of an 802.16 system (WiMAX system) of a Wireless Metropolitan Area Network (WMAN) or an 802.15 system (WiMedia system) of a Wireless Personal Area Network (WPAN). A wireless communication base station may be such as this using communication systems for different wireless communication standards simultaneously.

First Embodiment

Figure 4:
FIG. 4 shows an example of an operation on frequencies of a wireless communication base station according to a first embodiment.

FIG. 4 shows an example of an operation on frequencies of a wireless communication base station according to a first embodiment.

Figure 5:
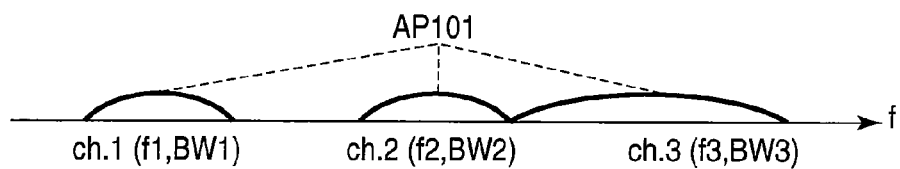
FIG. 5 shows another example of the operation on frequencies of the wireless communication base station of the first embodiment.

The wireless communication base station (designated by AP (Access Point) in FIG. 4), can simultaneously conduct communication on plural frequency channels. Although an example of two different frequency channels is shown in FIG. 4, the communication can simultaneously be conducted on three or more different frequency channels as shown in FIG. 5.

Each frequency channel is defined, for example, by a set of a center frequency (designated by f1 and f2 in FIG. 4) and a channel bandwidth (designated by BW1 and BW2 in FIG. 4), and a channel identifier (designated by ch.1 and ch.2 in FIG. 4) used to distinguish the frequency channels from one another. Accordingly, in FIG. 4, the channel identifier ch.1 has the center frequency f1 and the channel bandwidth BW1.

On the other hand, each frequency channel belongs to a large frequency bandwidth. When the frequency channel is classified by the frequency bandwidth, the reorganization of the frequency bandwidth may be enough. For example, the frequency channels may be indicated by levels of the identifier ch.1 meaning the 5 GHz bandwidth and the identifier ch.2 meaning the 60 GHz bandwidth. This is because basically there is no difference in operation at the detailed frequency channel level in the frequency bandwidth (although there may be regulatory limitations in changing such as transmission power or access parameters). In the case where the wireless communication terminal (including wireless communication base station) is operated pursuant to IEEE 802.11b, IEEE 802.11g, or IEEE 802.11n in the 2.4 GHz bandwidth, a basic function with which the wireless communication terminal is supported is independent of the detailed frequency channel in the 2.4 GHz bandwidth. The same holds true for the case in which the wireless communication terminal is operated pursuant to IEEE 802.11a or IEEE 802.11n in the 5 GHz bandwidth, and the same holds true for the 60 GHz bandwidth.

As used herein, "communication can simultaneously be conducted on plural frequency channels" shall mean that, assuming that two channels ch.1 and ch.2 exist, when the wireless communication terminals transmit the radio signals on each of the two channels, ch.1 and ch.2, to the wireless communication base station, the wireless communication base station demodulates and decodes the radio signals based on the configuration of FIG. 3 and transfers the radio signals to the MAC unit 2, and the MAC unit 2 performs proper reception processing on the radio signal as a MAC frame.

Figure 6:
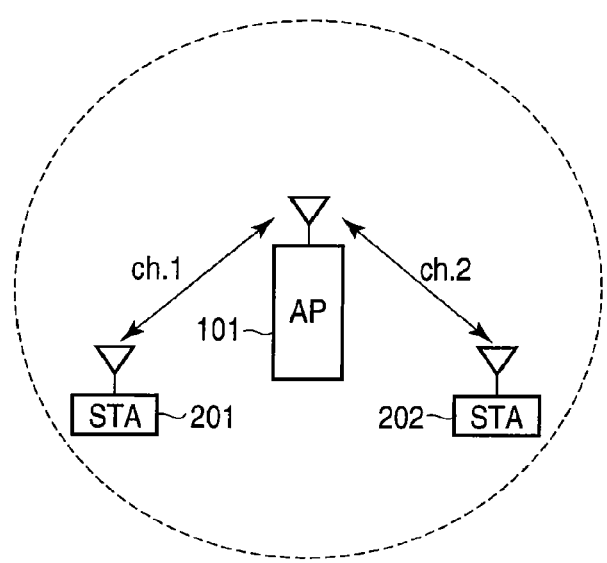
FIG. 6 shows connection of the wireless communication base station and wireless communication terminal of the first embodiment.

The meaning of "communication can simultaneously be conducted on plural frequency channels" will specifically be described with reference to FIG. 6. In FIG. 6, the wireless communication terminal 201 transmits the radio signal on the channel ch.1 to the wireless communication base station 101, and the wireless communication terminal 202 transmits the radio signal on the channel ch.2 to the wireless communication base station 101. Even if the radio signals are transmitted at the same time or in a partially overlapping time, in the wireless communication base station 101, the MAC unit 2 can perform the proper reception processing on the radio signals as MAC frames through the demodulation and decoding.

For example, the wireless communication base station 101 and the wireless communication terminal 201 are pursuant to IEEE 802.11g in the channel ch.1, and the wireless communication terminal 201 sends a probe request frame to the wireless communication base station 101 in order to learn parameters used by the wireless communication base station 101 in forming the infrastructure BSS on the channel ch.1. The wireless communication base station 101 sends back an ack frame in response to the reception of the probe request frame and generates a probe response frame indicating parameters used in the infrastructure BSS, and sends the probe response frame to the wireless communication terminal 201. On the other hand, the wireless communication base station 101 and the wireless communication terminal 202 are pursuant to IEEE 802.11a in the channel ch.2, the wireless communication terminal 202 subscribes to the infrastructure BSS formed on the channel ch.2 by the wireless communication base station 101, and sends an authentication frame to the wireless communication base station 101 in order to establish connection with the wireless communication base station 101 to start data exchange (that is, communication). Then, the wireless communication base station 101 sends back the ack frame in response to the reception of the authentication frame, and sends the authentication frame in response to contents of the authentication frame from the wireless communication terminal 202. Through the authentication processing, a set up such as to use WEP (Wired Equivalent Privacy), which is an encryption system, can be established. When a series of pieces of processing relating to the authentication is completed between the wireless communication terminal 202 and the wireless communication base station 101, the wireless communication terminal 202 sends an association request frame to the wireless communication base station 101 in order to notify the wireless communication base station 101 of its capability, and to be able to start the actual data exchange in the infrastructure BSS. After sending back the ack frame in response to the reception of the association request frame, the wireless communication base station 101 sends an association response frame to the wireless communication terminal 202. The association response frame includes the capability possessed by the wireless communication base station 101 and a response as to whether or not an association request is accepted. After the series of frame exchanges for connection set up, the wireless communication terminal 202 starts exchanging data frames with the wireless communication base station 101.

Thus, the wireless communication base station 101 can independently perform transmission and reception on the channels ch.1 and ch.2. On the other hand, the wireless communication terminal 201 can conduct the communication pursuant to IEEE 802.11g on the channel ch.1 and can conduct the communication pursuant to IEEE 802.11a on the channel ch.2. The wireless communication terminal 201 includes at least one frequency conversion circuit shown in FIG. 2, and can perform transmission and reception at least on either the channel ch.1 or ch.2 when actually transmitting the radio signal. Alternatively, the wireless communication terminal 201 may have the configuration shown in FIG. 3 like the wireless communication base station 101, and may simultaneously conduct the communication on channels ch.1 and ch.2.

Here, using the channel ch.1, the wireless communication base station 101 notifies the wireless communication terminal 201 of the information about the frequency channel ch.2. The notification may be annunciation. The annunciation shall mean that a large indefinite number of wireless communication terminals (including surrounding wireless communication base stations) are notified. For example, in the IEEE 802.11 wireless LAN standard, the annunciation may be performed using a frame having a broadcast address such as a beacon frame.

A frame format of the MAC layer in the IEEE 802.11 wireless LAN will be described with reference to FIG. 7.

Figure 7:
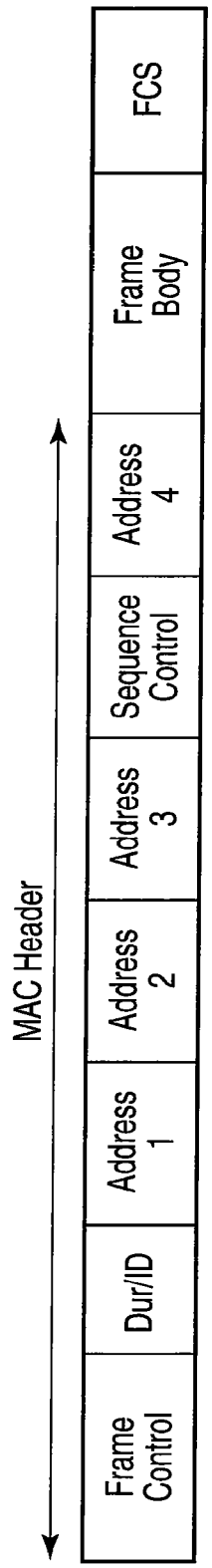
FIG. 7 shows a frame format in a MAC layer of IEEE 802.11 wireless LAN of the first embodiment.

Referring to FIG. 7, a MAC header portion ranges from a frame control item up to the point where the frame body item follows (i.e., to an address 4 in FIG. 7.) The MAC header portion may also include a QoS control item which is used in performing QoS control.

Figure 8:
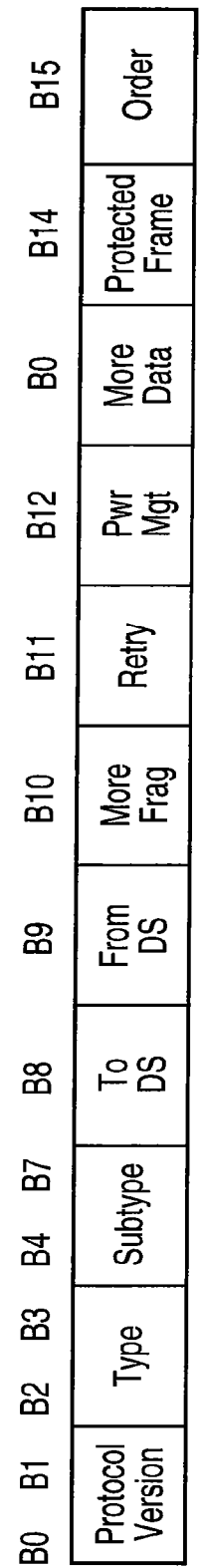
FIG. 8 shows contents of a frame control item of FIG. 7 of the first embodiment.

FIG. 8 shows contents of the frame control item of FIG. 7. A bit position of each item is designated by (X=1, 2, . . . ).

In a IEEE 802.11 wireless LAN system, as types of transmitting MAC frames, there are a data frame for transmitting data generated by a layer above the MAC layer (however, sometimes empty data is generated by the MAC layer and transmitted), a management frame for transmitting management information on a MAC layer level, and a control frame relating to access control in the MAC layer. These classifications are indicated by a type item of the frame control item. For example the beacon frame belongs to the management frame, and {B2,B3}={0,0} indicating the management frame is described in the type item. The type item will be {B2, B3}={0,1} for the data frame, and {B2,B3}={1,0} for the control frame. On the contrary, it can be said that the data frame, the management frame, and the control frame can be distinguished from one another by the description of the type item. In addition to the large classification of the type of the frame, a subtype item indicates a detailed type of the frame within the large classification. For example, in the beacon frame, the subtype item. is {B4,B5,B6,B7}={0,0,0,1}.

FIG. 7 shows the most versatile configuration, and some of the item are omitted in some frames. For example, there are four address fields in FIG. 7. All the address fields are used in the case where the data frame is sent between the wireless communication base stations. Basically, an address 1, an address 2, and an address 3 are used in the case of other data frames, the address 1, the address 2, and the address 3 are used in the case of management frames, only the address 1 or the address 1 and the address 2 are used in the case of control frames (however, there are some exceptions in the case where a control frame is contained in the other control frame).

In IEEE 802.11, all the bits of the address 1 item are set to 1 in a broadcast frame. The address 1 item indicates a direct transmission address. A broadcast frame is sent to all the wireless communication terminals without specifying the transmission address. Additionally, there is a multicast frame as a frame sent to plural wireless communication terminals. In a multicast frame, an initial bit (specified as an individual/group bit) of an initial octet item of the address 1 item is set to 1 (that is, group bit), and each of the particular values are specified to address a particular group of wireless communication terminal. A broadcast frame is a special case of a multicast frame. And a frame sent to a single wireless communication terminal is called a unicast frame, in contrast with a group address frame set to plural wireless communication terminals. When a wireless communication terminal receives a broadcast frame in which all the bits of the address 1 item are set to 1, or when a wireless communication terminal receives a multicast frame in which the multicast address indicated in the address 1 item includes the address of the terminal itself, the wireless communication terminal recognizes that the broadcast frame or the multicast frame is addressed to the terminal itself, and performs reception processing. According to some of the type of a frame, the wireless communication terminal performs the reception processing after confirming whether the address item (if the frame is a data frame and transmitted from the wireless communication base station to the wireless communication terminal, then it will be the address 2 item and if the frame is a management frame, then it will be the item address 3 item) in which BSSID for identifying the BSS is described, shows the BSSID of BSS to which the wireless communication terminal belongs.

In a management frame, information produced in the MAC layer is inserted in the frame body item. In a data frame, data generated by the layer above the MAC and transferred to the MAC layer is inserted in the frame body item. In a control frame, sometimes information produced by the MAC layer is inserted in the frame body item, and sometimes the frame body item does not exist.

The operation in which the wireless communication base station 101 broadcasts the information about the frequency channel ch.2 on the channel ch.1 will be described with reference to an example in which a beacon frame of IEEE 802.11 is used. Basic information relating to the BSS including synchronous information is inserted in the beacon frame. As shown in FIG. 9, when the wireless communication base station 101 sends the beacon frame on the channel ch.1, information about the frequency channel ch.2 is also inserted in the beacon frame. Here, the information about the frequency channel ch.2 is the channel identifier ch.2 and a communication system used on the channel ch.2. In FIG. 9, it is shown that the wireless communication base station 101 is supported with IEEE 802.11a and IEEE 802.11n by the information on the communication system for the channel ch.2 as an example. In the first embodiment, a communication standard system is inserted as the information on the communication system. As described above, IEEE 802.11a and IEEE 802.11n are extended standards in the communication standard system of IEEE 802.11 and the description may be in such level, or may be in a larger category such as IEEE 802.11 and GSM. For example, as a communication standard system for 60 GHz bandwidth, there is one defined by IEEE 802.15 (802.15.3c), but one defined by IEEE 802.11 can be also expected. In such case when the wireless communication base station 101 is supported with the millimeter wave defined by IEEE 802.11 in the channel ch.2 the extended system of the IEEE 802.11 standard corresponding to the millimeter wave bandwidth is notified. In the case of IEEE 802.15.3c, a notification of IEEE 802.15.3c is made as the communication standard system. In IEEE 802.15.3c, plural systems exist in the PHY layer. When the wireless communication on base station 101 is supported with a part of the plural systems, a notification is made up to the level where the supported systems can be identified.

When the specific communication systems in the channels ch.1 and ch.2 can be distinguished from each other by the frequency bandwidths to which the frequency channels of the channels ch.1 and ch.2 belong, the specific communication system can be omitted by putting the channel identifiers ch.1 and ch.2. In this case, the notification of the communication system is made by inserting the channel identifier. Assuming that IEEE 802.11 wireless LAN is used, when the channel ch.1 is in the 5 GHz bandwidth, it implies the support of IEEE 802.11a/n bandwidth, and when the channel ch.2 is in the 60 GHz bandwidth it implies the support of the millimeter wave standard defined by IEEE 802.11. When the notification or a connection request is made in the frame format defined by IEEE 802.11, it will also show that the communication is conducted based on the IEEE 802.11 wireless LAN standard.

Alternatively, the frequency channel information on the channel ch.1 or ch.2 can be shown in the form of a frequency bandwidth level and a subset of frequency channels allocated in the frequency bandwidth. In the case where the wireless communication base station 101 corresponds to some of the subsets of the plural frequency channels in the frequency bandwidth, one may define those subsets and by indicating the frequency bandwidth and the names of the subsets, and it is possible for the wireless communication base station 101 to show its support to groups of frequency channels in the frequency bandwidth. Therefore, for example, notifications such as ch.1=2.4 GHz bandwidth channel subset 1 (corresponding only to channel number 1) and ch.2=5 GHz bandwidth channel subset 10 (corresponding to channel numbers 36, 40, and 52) can be made.

FIG. 9 shows an example in which a notification of the position of the frequency channel is made with the channel identifier ch.2. When for example the channel bandwidths of the frequency channels used by the communication base station 101 are allocated at regular intervals, the center frequency and the channel bandwidth can be specified by the channel identifier. Even in an irregular arrangement of the frequency channels, when information on the arrangement of the frequency channels is previously shared between the wireless communication base station and the wireless communication terminal, the wireless communication terminal can learn the center frequency (f2 in the example) and channel bandwidth (BW2 in the example) of the frequency channel (frequency channel having the channel identifier ch.2 in the example) from the channel identifier notified by the wireless communication base station. Therefore, a subfield such as FIG. 10A may be provided in the frame body item of the beacon frame to indicate the information on other frequency channels used by the wireless communication base station 101.

On the other hand, sometimes there is a case where the wireless communication terminal cannot specify the necessary frequency channel information such as the center frequency and the channel bandwidth only by the channel identifier.

IEEE 802.11a uses the channel bandwidth of 20 MHz, and IEEE 802.11n has the channel bandwidth of 40 MHz as an option in addition to the channel bandwidth of 20 MHz. In the case where different channel bandwidths can be used such that the channel bandwidth BW1 of the channel ch.1 is 20 MHz while the channel bandwidth BW2 of the channel ch.2 is 40 MHz, information on the channel bandwidth BW2 is added as the information about the frequency channel ch.2. The actual channel bandwidth (for example, 40 MHz) can be described as the information on the channel bandwidth BW2, or the information on the channel bandwidth can be normalized by the reference channel bandwidth and expressed by an integer when different channel bandwidths are an integral multiple of two or more of the reference channel bandwidth (for example, 20 MHz). In the example, the channel bandwidth BW2 is double the channel bandwidth BW1, so that the channel bandwidth BW2 can be expressed by two. When the reference channel bandwidth used in the normalization is known by the wireless communication terminal, a normalized value is directly inserted as the channel bandwidth information. In the case where the reference channel bandwidth is not known, assuming that the channel used as the reference is the current frequency channel (ch.1, in the example) on which the notification of the information on another frequency channel is made, and by the information about the current frequency channel itself (in the example, the channel bandwidth BW1 as the information on the channel ch.1) been announced, the wireless communication terminal can specify the information on another frequency channel. In the IEEE 802.11 wireless LAN standard when the bandwidth is extended in the regulatory class, a frequency direction can be expressed by defining a regulatory class in addition to the information (such as the center frequency position and the channel bandwidth) on the reference frequency channel A new supported channel bandwidth (for example, 60 MHz or 80 MHz) and the extended frequency direction may be defined if necessary, and in the regulatory class such regulatory class can be used in pair with the channel identifier to express the new supported channel width and its extended frequency direction.

Sometimes there may be a case where the center frequency cannot be specified only by the channel identifier because, for example, the center frequency channels are not allocated at regular intervals. In such case, the information of the center frequency f2 is added as the information about the frequency channel ch.2. Obviously the notification can be made by a set of the information on the center frequency and the information on the channel bandwidth along with the channel identifier. FIG. 10B shows an example of the subfield inserted in the frame body item of the frame when the notification of the center frequency and channel bandwidth is made along with the channel identifier as the information on another frequency channel (ch.2, in the example) used by the wireless communication base station 101.

Two or more frequency channels may partially overlap on the frequency. For example, in the case where a channel with the double channel bandwidth spreads in the increasing direction of the frequency with respect to the frequency channel of the channel ch.1 as shown in FIG. 11, when the center frequency f1 and the channel bandwidth BW1 is known by the wireless communication terminal as the information on the channel ch.1 due to the beacon frame transmitted on the channel ch.1, and when the information in the channel ch.2 indicates that the channel bandwidth further occupies another amount of the channel bandwidth BW1 in the increasing direction of the frequency based on the center frequency f1 and the channel bandwidth BW1 (in the example, "+2"), the wireless communication terminal 201 can specify the information about the frequency channel ch.2. Here, the subfield inserted in the frame body item of the frame may be as FIG. 10C. Based on this example of FIG. 10C, in the case where the double channel bandwidth is widened in the decreasing direction of the frequency as shown in FIG. 12, "−2" is described as the information about the frequency channel ch.2 while the notification of the information on the channel ch.1 is made. When the center frequency f1 and channel bandwidth BW1 is unknown to the wireless communication terminal as the information on the channel ch.1, such information can be announced together using the beacon frame on the channel ch.1. When the extended channel bandwidth is an optional feature as the 40 MHz in IEEE 802.11n and the wireless communication terminal does not always need to support the operation on the channel ch.2, it can be notified by a subfield in which a mandatory/option is described as information on another frequency channel as shown in FIG. 10D, and a flag of "1" set in the subfield to show it is optional. Also in this case, a supported channel bandwidth (such as 60 MHz or 80 MHz) and extended direction in frequency may be defined as the regulatory class and expressed by the regulatory class and the reference frequency channel on request.

The series of expressions of the pieces of channel information and communication systems can be also applied to the case for a wireless communication terminal described later.

When the information on another frequency channel (in the example, ch.2) is announced by a beacon frame of the channel ch.1, the wireless communication terminal 201 can recognize that the communication can be conducted on another frequency channel (in the example, ch.2) with the wireless communication base station 101 which transmits the beacon frame, and which communication system is used on another frequency channel ch.2.

In FIG. 9, when the wireless communication terminal 201 recognizes that the wireless communication base station 101 uses IEEE 802.11g on the channel ch.1 while using IEEE 802.11a on the channel ch.2, in order for the wireless communication terminal 201 to start communication with the wireless communication base station 101 on the channel ch.1 which is the frequency channel currently being received, the wireless communication terminal 201 starts a procedure for setting up a connection with the wireless communication base station 101. The procedure in which the wireless communication terminal 201 finds the wireless communication base station 101 and sets up a connection with the wireless communication base station 101 will be described referring to the procedure in IEEE 802.11. The wireless communication terminal 201 searches (scans) for the wireless communication base station to connect on its transmittable and receivable frequency channel. In a scanning operation, there are a passive scanning mode and an active scanning mode. In passive scanning, the wireless communication terminal finds the wireless communication base station by receiving a beacon frame sent on the frequency channel from the wireless communication base station. In active scanning, a probe request frame is sent, and when a probe response frame is received in response to the probe request frame by the probe response frame, the wireless communication terminal can find the wireless communication base station. The probe request frame may be sent without specifying the destination address (address 1 item in FIG. 7 for management frames), i.e., sent as a broadcast frame, or may be sent to a particular wireless communication base station in a unicast format. When receiving the probe request frame from the wireless communication terminal 201, the wireless communication base station 101 first responds by an ack frame if the probe request frame was a unicast frame, and generates a probe response frame, to send to the wireless communication terminal 201. The same information on another frequency channel as inserted in the beacon frame is inserted in the frame body item of the probe response frame. Alternatively, even if the information on another frequency channel is not inserted in the beacon frame by the wireless communication base station 101, in the case where the wireless communication terminal 201 makes a request of the information on another frequency channel by the probe request frame, the information on another frequency channel may be inserted in the probe response frame by the wireless communication base station 101. After the scanning operation, the wireless communication terminal 201 performs authentication procedures and association procedures. In the first embodiment, when transmitting an association request frame to the wireless communication base station 101, the wireless communication terminal 201 notifies the wireless communication base station 101 of the communication system which can be used in the channel ch.2 in the subfield indicating its capability within the frame body item. For example, the wireless communication terminal 201 notifies the wireless communication base station 101 that the communication can be conducted pursuant to IEEE 802.11a on the channel ch.2 with the subfield having the format of FIG. 13 provided in an association request frame. Obviously, in addition to the format of FIG. 13, a format similar to the ones shown in FIG. 10 A-D the wireless communication base station 101 informs the supported frequency channel and communication system in the beacon frames and in the probe response frames can be used.

The wireless communication base station 101 receives the association request frame from the wireless communication terminal 201 on the channel ch.1 using IEEE 802.11g, and the corresponding capability of the wireless communication terminal 201 to conduct communication using IEEE 802.11g on the channel ch.1 is described in the association request frame. In addition, the wireless communication base station 101 can recognize that communication with the wireless communication terminal 201 can be conducted using IEEE 802.11a on the channel ch.2. Currently the frequency channel ch.1 is used to conduct communication with wireless communication terminal 201.

Now it is considered that another wireless communication terminal 202 notifies the wireless communication base station 101 of the frequency channel and communication system which can be used by the wireless communication terminal 202 using the association request frame. For example, the wireless communication terminal 202 notifies the wireless communication base station 101 that the communication can be conducted pursuant to IEEE 802.11a/g/n. It is assumed that the frequency channel ch.2 is currently used in the communication between the wireless communication terminal 202 and the wireless communication base station 101.

Then, the wireless communication base station 101 generates a connection management table therein as shown in FIG. 14A, where the connection management table holds the information on the communication capabilities of the wireless communication terminal. The connection management table may be retained in the MAC layer management unit 30 of FIG. 3, or may be retained in an external memory connected to the MAC layer management unit 30. The wireless communication base station 101 may notify the wireless communication terminals that the wireless communication base station 101 has a capability to retain information on wireless communication terminals between the frequency channels which it supports in beacon and probe response frames. In FIG. 14A, the terminal identifier of the wireless communication terminal 201 (STA201) is described in the item "terminal identifier", the frequency channel identifies of the supported frequency channels notified by the wireless communication terminal 201 to the wireless communication base station 101 is described in the item "supportable channel", the communication system which can be supported in each of the frequency channels is described in the item "supported communication system", and the identifier of the frequency channel on which the communication is currently conducted is described in the item "channel used". Here, the wireless communication terminal 201 notifies the wireless communication base station 101 by the association request frame that the wireless communication terminal 201 supported the frequency channel ch.2 and the IEEE 802.11a is the communication system which can be used on the frequency channel ch.2. Therefore, the wireless communication base station 101 can enter the information regarding the frequency channel ch.2 in the connection management table. On the other hands, as the association request frame is sent on the frequency channel ch.1, and the information for conducting the communication on the current channel, that is, the frequency channel ch.1 is also given to use IEEE 802.11g in the association request frame, the information on the frequency channel ch.1 can be compensated and retained as the information in the connection management table even if the support of the frequency channel ch.1 is not explicitly described in the association request frame.

It is not always necessary for the wireless communication terminal identifier to be the actual MAC address of the wireless communication terminal, and the description can be in other ways if the wireless communication base station can uniquely identify each of the wireless communication terminals. For example, in IEEE 802.11, an association identifier (AID) is inserted in the frame body item of the association response frame which is sent in response to the association request frame from the wireless communication terminal (for example, 201) by the wireless communication base station 101. An AID is a unique value of 1 to 2007 which is allocated to each wireless communication terminal during the association process and used to identify the wireless communication terminals by the wireless communication base station. In the case where an AID is inserted in an AID item of a frame consisting of two octets, "1"s are inserted in bit 14 and bit 15, and the unique value (AID) of 1 to 2007 is inserted in the remaining bits, a bit 0 to a bit 13. When the wireless communication base station 101 receives the association request frame from the wireless communication terminal 201, an STA management entity (SME) makes a determination of the connection with the wireless communication terminal 201 through the MAC layer management unit 30 of FIG. 3, and the wireless communication base station 101 notifies the wireless communication terminal 201 of the connection permission by a status code subfield of the association response frame (status code subfield is also used in the case of the notification of the connection rejection). Here, the MAC layer management unit 30 records the AID allocated to the wireless communication terminal 201 in the item for the wireless terminal identifier in the connection management table, extracts the pieces of information about the frequency channel and communication system which the wireless communication terminal 201 supported from the association request frame, and writes the pieces of information about the frequency channel and communication system in a predetermined item corresponding to the wireless communication terminal identifier. Although not shown in FIGS. 2 and 3, an SME is connected to the MAC layer management unit 30 (included in the MAC unit 2 in FIG. 2), and determines an operation policy (including other layers) of the wireless communication terminal or the wireless communication base station.

When a single baseline communication standard is used across plural frequency channels in the wireless communication base station but when the frequency channels differ from one another in the supported extended level from the base line, interoperability between the extended standards can be expected. For example, the backward compatibility with IEEE 802.11b is required in IEEE 802.11g, the backward compatibility with IEEE 802.11a is required in the 5 GHz bandwidth in IEEE 802.11n, and the backward compatibility with IEEE 802.11b/g is required in the 2.4 GHz bandwidth in IEEE 802.11n. One can understand that the compatibility with IEEE 802.11b is also obtained by the notification of the compatibility with IEEE 802.11g. One can understand that the compatibility with IEEE 802.11a is also obtained by the notifications of the compatibility with IEEE 802.11n and the support of the frequency channel ch.2 in the 5 GHz bandwidth. When the frequency channel supported with the extended standard can be specified while the backward compatibility is obtained between the extended standards, the information on the comprehensive standard or supported frequency channel may be omitted and the connection management information may be retained as FIG. 14B.

On the other hand, the wireless communication terminal 201 recognizes that the wireless communication base station 101 can also conduct the communication on the frequency channel ch.2 and that the wireless communication base station 101 is supported with the communication system of IEEE 802.11a on the frequency channel ch.2 (because the wireless communication terminal 201 is not supported with IEEE 802.11n, the wireless communication terminal 201 does not need to recognize that the wireless communication base station 101 is supported with IEEE 802.11n) by the beacon frame or the probe response frame received from the wireless communication base station 101, so that the wireless communication terminal 201 can generate at least a connection management table as FIG. 15 when receiving the notification of the connection permission by the association response frame. When the wireless communication base station to connect is uniquely determined, the base station identifier in FIG. 15 may be omitted (after the identifier of the wireless communication base station to connect while is retained in another information management place, for example, a Management Information Base (MIB) as a MIB value) and can be referred to. In FIG. 15, the communication system 802.11n which the wireless communication terminal 201 does not supported is not recorded as in the communication system on the frequency channel ch.2 even if it is described in the beacon frame or the probe response frame because the wireless communication terminal 201 does not supported it. However, in the case where the wireless communication terminal 201 can recognize the communication system 802.11n although not supported with, the communication system 802.11n may be described in the item of the communication system corresponding to the frequency channel ch.2. The wireless communication terminal 201 may generate the connection management table as FIG. 15 before receiving the connection permission by the association response frame, and may recognize the current status whether or not the connection permission is received by writing in the "channel used" column when receiving the connection permission. By doing this, the wireless communication terminal 201 can collect pieces of information on candidate plural wireless communication base stations and the frequency channels and communication system which the wireless communication base stations is support, and select a wireless communication base station suitable for the communication request of the wireless communication terminal 201 as the one to connect, and initiate the connection set up with the selected wireless communication base station.

Figure 16:
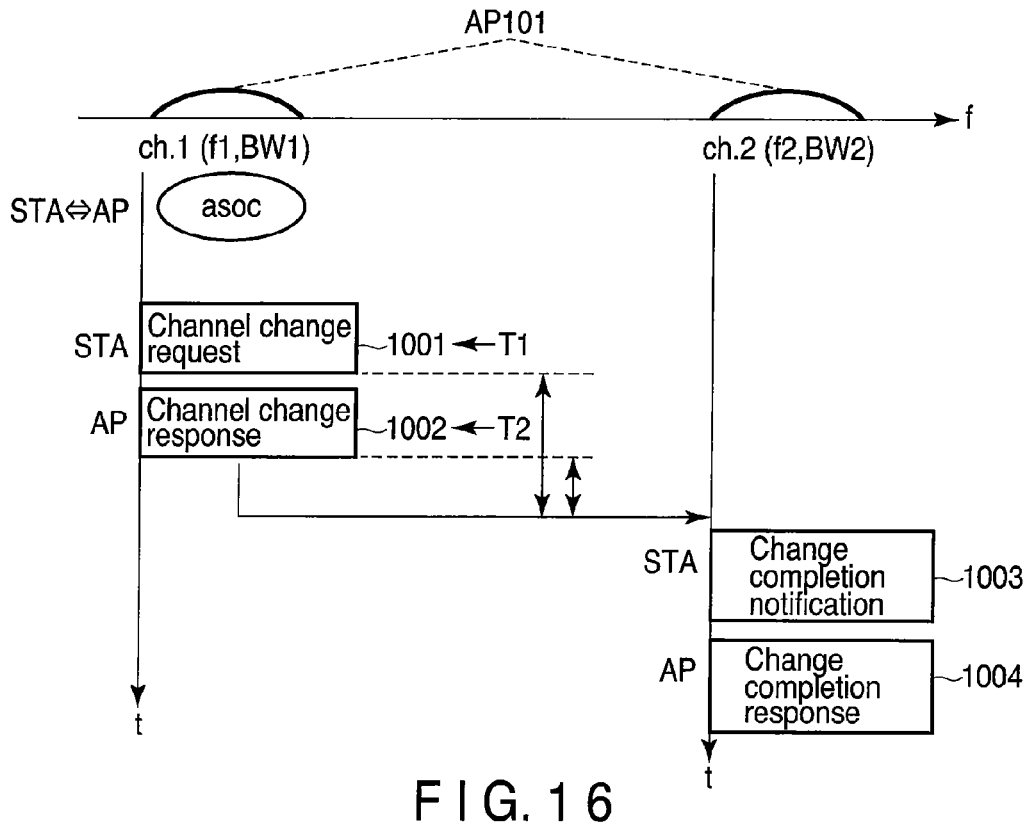
FIG. 16 shows a state in which the wireless communication terminal of the first embodiment makes a frequency channel change request to the wireless communication base station.

When receiving the association response frame from the wireless communication base station 101, the wireless communication terminal 201 can start the communication on the frequency channel ch.1, and also recognize that the wireless communication base station 101 can conduct the communication on the frequency channel ch.2 using IEEE 802.11a from the connection management table of FIG. 15. Therefore, the wireless communication terminal 201 can change the communication used between the wireless communication base station 101 from the frequency channel ch.1 to the frequency channel ch.2. In changing the communication frequency channel to the frequency channel ch.2, in the first embodiment, the wireless communication terminal 201 sends a change request 1001 to the wireless communication base station 101 on the frequency channel ch.1 as shown in FIG. 16. In the case of the communication based on IEEE 802.11, the change request 1001 is a unicast management frame (subsequent frames 1002 to 1004 are also unicast management frames), and after the wireless communication base station 101 send an ack frame because the change request 1001 is a unicast frame addressed to the wireless communication base station 101, it may accept the channel change request of the wireless communication terminal 201 as is. On the other hand, in FIG. 16, the wireless communication base station 101 sends a channel change response 1002 in which the wireless communication terminal 201 is notified of the response (in this case, permission) for the change request while the response is inserted in the status code subfield. Therefore, the wireless communication terminal 201 can confirm whether or not the wireless communication base station 101 accepts the change request to change the communication frequency channel to the frequency channel ch.2. The wireless communication terminal 201 will make itself capable to perform transmission and reception on the frequency channel ch.2 when determining that the wireless communication base station 101 accepts the change request to change the communication to the frequency channel ch.2 (by receiving an ack frame to the change request frame, or by receiving a successful change response frame if it is expected to be received). If the wireless communication terminal 201 can only perform transmission and reception on a single frequency channel, the frequency conversion circuit 6 of FIG. 2 is switched to the frequency channel ch.2, and parameter change and circuit switching in the MAC unit 2 and the PHY unit 4 are also performed according to the communication system supported with the frequency channel ch.2.

It is assumed that the wireless communication base station 101 has a transmission queue which accommodates frames to transmit in each frequency channel. The transmission queue is provided in the access control unit for PHY1 31 of FIG. 3 for the frequency channel ch.1, and the transmission queue is provided in the access control unit for PHY2 32 of FIG. 3 for the frequency channel ch.2.

After receiving the channel change request 1001, the wireless communication base station 101 stops the transmission of at least the data frame to the wireless communication terminal 201 on the frequency channel ch.1. After transmitting the necessary frame(s). (This is because it is necessary for the wireless communication base station 101 to send the ack frame (control frame) or the response frame (management frame) for the channel change), the wireless communication base station 101 may stop the transmission of all the frames to the wireless communication terminal 201. During the period when stopping the transmission to the wireless communication terminal 201, the wireless communication base station 101 moves frames addressed to the wireless communication terminal 201 from the transmission queue for the frequency channel ch.1 to the transmission queue for the frequency channel ch.2.

When the access control unit for PHY1 31 of FIG. 3 controls frame transmission on the frequency channel ch.1, a system for stopping an access operation here can be one way to simply stop the frame transmission on the frequency channel ch.1 (transmission of all the frames will be stopped on the frequency channel ch.1 by this). When CSMA/CA is used as an access system, the transmission can be also stopped by making the wireless communication base station 101 in a similar situation like it detects the wireless medium to be busy. Or the access itself may be cancelled to stop the operation of passing out the frame from the transmission queue (located in the access control unit for PHY1 31 of FIG. 3). For a system for stopping not all the frame transmission on the frequency channel ch.1 but only the transmission addressed to the wireless communication terminal 201, the destination address (address 1 field) of frames can be confirmed at the exit of the transmission queue on the frequency channel ch.1 and the access is processed if it is not to the wireless communication terminal 201, but the frame is moved to the transmission queue for the frequency channel ch.2 if it is to the wireless communication terminal 201. Alternatively, the access may be continued until a framer for the wireless communication terminal 201 comes to the head (exit) of the transmission queue, and the access operation may be stopped when a frame for the wireless communication terminal 201 comes to the head of the transmission queue.

Similarly, the wireless communication terminal 201 stops transmission of at least the data frames after transmission the change request 1001 (the transmission queue in the MAC unit 2 of FIG. 2 and the access control unit for PHY are involved in stopping the transmission). When the wireless communication terminal 201 becomes ready to conduct communication on the frequency channel ch.2, the wireless communication terminal 201 sends a channel change completion notification 1003 to the wireless communication base station 101 as can be seen from FIG. 16. Therefore, the wireless communication base station 101 can recognize that the wireless communication terminal 201 can conduct communication on the frequency channel ch.2. Additionally, as shown in FIG. 16, the wireless communication base station 101 may send a channel change completion response 1004 as a response to the channel change completion notification 1003 in order to notify the wireless communication terminal 201 that it has received the channel change completion notification relating to. After taking these steps, transmission of (data) frames on the frequency channel ch.2 is started between the wireless communication base station 101 and the wireless communication terminal 201.

When receiving the channel change completion notification 1003, the wireless communication base station 101 re-starts the transmission of (data) frames to the wireless communication terminal 201 on the frequency channel ch.2. Alternatively, after transmission the channel change completion response 1004, the wireless communication base station 101 may re-start transmission of (data) frames to the wireless communication terminal 201 on the frequency channel ch.2.

Here, instead of the channel change completion notification 1003, the wireless communication terminal 201 may send on the frequency channel ch.2 an acknowledgement frame, or a delivery confirmation response frame to the group of frames received from the wireless communication base station 101 on the frequency channel ch.1. For example, a block ack mechanism, in which a control frame called a Block Ack Request (BAR) frame is used as a delivery confirmation request frame and a control frame called a Block Ack (BA) frame is used as a delivery confirmation response frame, is defined in IEEE 802.11. The target data frames are QoS frames in which the QoS Control item is added as to the MAC header portion. A Traffic Identifier (TID) indicating the traffic type is inserted in the QoS Control item. After the block ack mechanism is set up with another wireless communication terminal (including a wireless communication base station), a wireless communication terminal (including a wireless communication base station) which receives data frames having the same TID notify the partner wireless communication terminal which is a transmitter of the data frames by a BA frame of the delivery confirmation information on the data frames sent from the partner wireless communication terminal within the range and having the corresponding TID requested by the BAR frame from the partner wireless communication terminal (there is also an implicit BAR system in which transmission of a BAR frame is omitted). Such mechanism can be applied here. For example, it is assumed that the wireless communication base station 101 has set up the use of the block ack mechanism relating to TID=3 with the wireless communication terminal 201, and it is assumed that the wireless communication terminal 201 receives a series of data frames of TID=3 from the wireless communication base station 101 on the frequency channel ch.1. After the frequency channel is changed to the frequency channel ch.2, the wireless communication terminal 201 sends the delivery confirmation information retained for the wireless communication base station 101 as a BA frame to the wireless communication base station 101. Even if the wireless communication terminal 201 does not receive the BAR frame from the wireless communication base station 101, the wireless communication terminal 201 may send the BA frame when the frequency channel is changed to the frequency channel ch.2 and when it can send frames. The wireless communication terminal 201 may send the same contents as those already sent to the wireless communication base station 101 on the frequency channel ch.1, namely, the wireless communication terminal 201 may retransmit the frame while the frequency channel from the frequency channel ch.1 to the frequency channel ch.2. In the case where the operation in which the wireless communication base station 101 stops the transmission of data to the wireless communication terminal 201 is delayed while the wireless communication terminal 201 moves from the frequency channel ch.1 to the frequency channel ch.2, the wireless communication terminal 201 may not be able to receive some frames from the wireless communication base station 101 due to the channel change. In such cases, by transmitting the delivery confirmation response frame, the wireless communication base station 101 can recognize the state in which the change in the wireless communication terminal 201 to the frequency channel ch.2 is completed and the wireless communication terminal 201 is ready to communicate in the frequency channel ch.2 while confirming which data frames are received by the wireless communication terminal 201. Even if the wireless communication base station 101 does not deal with the operation of stopping the data transmission, the wireless communication base station 101 can deal with lost data by receiving the change completion notification using a BA frame. When the wireless communication base station 101 sends not only frames of TID=3 but also data frames of TID=4 to the wireless communication terminal 201 on the frequency channel ch.1, desirably the wireless communication terminal 201 sends BA frames for the data frames of TID=3 and TID=4 when completing the change of the frequency channel to the frequency channel ch.2. In the case where the wireless communication terminal 201 receives data frames in plural series under the block ack mechanism from the wireless communication base station 101 because the set up is performed by exchanging management frames such as an ADDBA Request frame and an ADDBA Response frame for each TID in order to use the block ack mechanism, it is desirable to send all the BA frames which have block ack set up (even if the wireless communication terminal 201 receives no frame of the corresponding TID from the wireless communication base station 101 to send a delivery confirmation response). When the BA frames are sent instead of the change completion notification on the frequency channel ch.2, if the BA frames are aggregated in one physical packet and sent (sent in aggregation format). The wireless communication base station 101 can process the BA frames as a single channel change completion notification. Based on the BA frame or the BA frames, the wireless communication base station 101 can recognize which data frames have to be retried and retransmit those data frames to the wireless communication terminal 201 on the frequency channel ch.2.

A mechanism to control timing of changed frequency channel may be provide when the wireless communication terminal changes the frequency channel. For example, in FIG. 16, the wireless communication terminal 201 sets a subfield in the frame body item of the channel change request 1001 in order to make a notification that the communication or transmission is started on the frequency channel ch.2 after at least the predetermined time T1 elapses since the channel change request 1001 is sent. The value T1 in this subfield is a time enough for the wireless communication terminal 201 to switch to the frequency channel ch.2. The wireless communication terminal 201 sets a timer to the predetermined time T1 when the transmission of the channel change request 1001 is completed (the completion time can be recognized by a primitive signal called PHY_TXEND.confirm defined in IEEE 802.11, which is used by the PHY unit 4 to notify the MAC unit 2 of the time). The timer continuously works even while the wireless communication terminal 201 switches to the frequency channel ch.2, and the wireless communication terminal 201 gets access to the medium on the frequency channel ch.2 after the predetermined time T1 elapses. This is performed by an operation, in which the frame transmission from the transmission queue for transmission data located in the MAC unit 2 of the wireless communication terminal 201 is released after the predetermined time T1 elapses from the time when the transmission of the channel change request 1001 is completed and gets access to the medium on the frequency channel ch.2. Or by an operation, in which the access control unit for PHY in the MAC unit 2 performs the recognition similar to the recognition that the wireless medium is busy for at least the predetermined time T1 since the transmission of the channel change request 1001 is completed and performs the recognition similar to the recognition that the wireless medium becomes idle after the predetermined time T1 elapses.

Alternatively, the time enough for the wireless communication terminal 201 to switch to the frequency channel ch.2 may be counted from the reception of the channel change response 1002, which is a response frame and written as the predetermined time T1 in the frame body item of the channel change request 1001 and sent to the wireless communication base station 101. The wireless communication terminal 201 sets a timer to the predetermined time T1 when the reception of the channel change response 1002 is completed (the completion time can be recognized by a primitive signal called PHY_RXEND.indication defined in IEEE 802.11, which is used by the PHY unit 4 to notify notifies the MAC unit 2 of the time). The timer continuously works even while the wireless communication terminal 201 switches to the frequency channel ch.2, and the wireless communication terminal 201 gets access to the medium on the frequency channel ch.2 after the predetermined time T1 elapses. The access system is similarly performed as described previously.

Alternatively, when a notification of the time enough for the wireless communication terminal 201 to switch to the frequency channel ch.2 is made as the predetermined time T1 by the channel change request 1001, and the wireless communication base station 101 receives the notification, it may notify the wireless communication terminal 201 of a channel change time T2 necessary for the wireless communication base station 101 by the channel change response 1002 when (the wireless communication base station 101) accepts the channel change request. The wireless communication base station 101 stops transmission to the wireless communication terminal 201 for the channel change time T2 after transmitting the channel change request response 1002, and starts access for transmission to the wireless communication terminal 201 on the frequency channel ch.2 after the channel change time T2. The wireless communication terminal 201 moves to the frequency channel ch.2 during the channel change time T2 after receiving the channel change request response 1002, and may start access on the frequency channel ch.2 after the channel change time T2 elapses. The wireless communication base station 101 determines the channel change time T2 such that the channel change time T2 satisfies a time necessary for the wireless communication base station 101 to prepare frames addressed to the wireless communication terminal 201 to be sent on the frequency channel ch.2 (the time required to move the frames addressed to the wireless communication terminal 201 from the transmission queue for the frequency channel ch.1 to the transmission queue for the frequency channel ch.2) and such that the channel change time T2 is not shorter than the predetermined time T1 given by the wireless communication terminal 201. Therefore, a sufficient switching time can be negotiated between the wireless communication base station 101 and the wireless communication terminal 201 to start the communication on the frequency channel ch.2.

Alternatively, instead of inserting the time (T1, or T1 and T2) for the channel change in the frame relating to the channel change, it may be inserted in a frame for set up (for example, in the association process) to start communication between the wireless communication terminal 201 and the wireless communication base station 101 (for example, by making the notification as a capability in the association request frame or also inserting the time in the association response frame and performing the negotiation), or the time may be used while not inserted in the frame because the time necessary for the channel change is uniquely determined (for example, defined as a MIB value in IEEE 802.11). Alternatively, instead of describing a specific value for the channel change time, a unit parameter may be defined and the moving time may be recognized based on the unit parameter. For example, the parameter corresponding to the actual moving time is defined so as to be set to 400 µs when the channel change time is indicated as "1" or to be set to 1.5 ms when the channel change time is indicated as "2". Alternatively, the notification can be made based on an interval of beacons (beacon interval) on the frequency channel ch.2. In the case of beacon interval=2, when the beacon is received twice or when the expected beacon transmission timing (corresponding to Target Beacon Transmission Time (TBTT) in IEEE 802.11) is passed twice on the frequency channel ch.2, the wireless communication terminal 201 may send the channel change completion notification 1003 on the frequency channel ch.2 or may directly start communication on the frequency channel ch.2 without transmitting the channel change completion notification 1003.

In the system for making the notification of the time T1, the wireless communication base station can previously recognize how long the transmission to the wireless communication terminal 201 should be stopped. Therefore, the channel change completion notification 1003 made by the wireless communication terminal 201 and the associated response 1004 performed by the wireless communication base station 101 may be omitted. Alternatively, the wireless communication base station 101 which can deal with the one-way request of the channel change time (T1) from the wireless communication terminal 201 may send the pending frames addressed to the wireless communication terminal 201 based on the channel change completion notification 1003 which is sent from the wireless communication terminal 201 on the frequency channel ch.2 after the time T1 elapses.

During the series of frame exchanges from the request 1001 to the response 1004, in the case where the wireless communication terminal 201 cannot receive the frames 1002 and 1004 when the transmission of the frames 1002 and 1004 from the receiver side is expected, the corresponding request frame 1001 or the notification frame 1003 may be sent to the wireless communication base station 101 again after a certain fixed time elapses.

When the wireless communication base station 101 receives the channel change request 1001 from the wireless communication terminal 201 (and sends the channel change response 1002 for permitting the channel change request 1001), the wireless communication base station 101 changes the "channel used" column of FIG. 14 corresponding to the wireless communication terminal 201 from the frequency channel ch.1 to the frequency channel ch.2, recognizes the information corresponding to the frequency channel ch.2 in the pieces of information relating to the wireless communication terminal 201 by FIG. 14, that is, recognizes that the wireless communication terminal 201 supported IEEE 802.11a on the frequency channel ch.2 by FIG. 14, and conducts the communication with the wireless communication terminal 201 in the frequency channel ch.2 using IEEE 802.11a (although the wireless communication base station 101 supports both IEEE 802.11a and IEEE 802.11n). Thus, in the first embodiment, the wireless communication base station 101 shares and manages the connection information on the wireless communication terminals over different frequency channels.

(Effect)

Thus, the wireless communication base station announces or notifies where another supported frequency channel exists and which communication system is used on a certain frequency channel, so that the wireless communication terminal which performs the transmission and reception on the current frequency channel can recognize the information on another frequency channel. During the connection set up, the wireless communication terminal notifies the wireless communication base station of its supporting communication systems including those on other frequency channels, so that the wireless communication base station can retain the supported communication systems by the wireless communication terminal whose connection is permitted, along with the identifier. Therefore, when the wireless communication terminal moves to another frequency channel which the wireless communication base station supports, the wireless communication base station already recognizes the supported communication systems by the wireless communication terminal on the new channel, so that the communication can be continued. In such cases, it is not necessary to terminate the connection once and restart the set up to communicate on the changed frequency channel by exchanging connection information again.

During the connection set up the match in the connection information between the wireless communication terminal and the wireless communication base station can be assured by the response frame sent from the wireless communication base station in response to the request frame from the wireless communication terminal.

For the announcement or notification of the communication system, the recognition system of the communication systems among many systems can be easily matched between the wireless communication base station and the wireless communication terminal by indicating specific types of communication standards and types of the extending systems in a communication standard.

When the wireless communication base station permits the connection of the wireless communication terminal, the management number allocated to the wireless communication terminal is retained as the identifier of the wireless communication terminal in the connection management table. Therefore, the wireless communication base station can identify the wireless communication terminals and easily manage the wireless communication terminals using the unique identifiers.

The wireless communication base station has a queue in which transmission frames are stored for each frequency channel, and the frames addressed to the wireless communication terminal are transferred to the corresponding transmission queue of the new frequency channel when the wireless communication terminal makes the frequency channel change request. Therefore, the wireless communication base station can send the frames addressed to the wireless communication terminal on the appropriate frequency channel in which the communication is conducted even when the wireless communication terminal moves between the frequency channels.

The wireless communication base station starts communication with the wireless communication terminal on the changed frequency channel after a fixed time elapses since the wireless communication base station permits the frequency channel change request from the wireless communication terminal, so that a delay can be granted in order for the wireless communication base station and the wireless communication terminal to prepare to start communication on the changed frequency channel. The fixed time is set not shorter than the time necessary for the wireless communication terminal to change the frequency channel, so that transmission of the frame can be started after the wireless communication terminal is assured to be in the receivable state on the changed frequency channel. When the time required to change frequency channel is obtained from the wireless communication terminal before the change to another frequency channel is permitted, the time required by the wireless communication terminal to change frequency channel is correctly recognized by the wireless communication base station, and the communication with the wireless communication terminal can be scheduled to start on the changed frequency channel after at least the time required to change frequency channel elapses, so that a degree of certainty can be enhanced for the securement that the wireless communication terminal is in the receivable state on the changed frequency channel. The fixed time is set not shorter than the time necessary to move the frames addressed to the wireless communication terminal between the queues in the wireless communication base station, so that the frames addressed to the wireless communication terminal can be securely sent to the wireless communication terminal on the changed frequency channel. By determining the time to start communication between the wireless communication base station and the wireless communication terminal on the changed frequency channel through the frame exchange in consideration of the above-described effects, the start of the communication can be securely after the wireless communication base station and the wireless communication terminal are prepared to conduct communication on the changed frequency channel.

When the wireless communication terminal sends the retained delivery confirmation information to the wireless communication base station after moving to another frequency channel, while the wireless communication base station can confirm which frame is received by the wireless communication terminal, the wireless communication base station can also recognize the state that the wireless communication terminal has completed the frequency channel change and became ready to communicate.

When the wireless communication base station makes the announcement or notification of the bandwidth of another frequency channel, the wireless communication terminal can determine whether or not another frequency channel has the bandwidth in which the wireless communication terminal can conduct communication, and the communication on the transferred frequency channel can be secured. By the wireless communication base station providing the information that the bandwidth of another frequency channel is an integral multiple of at least 2 to the wireless communication terminal, the wireless communication terminal can easily determine whether or not another frequency channel has the bandwidth in which the wireless communication terminal can conduct communication, and a communication system using bandwidth extension can be also easily realized.

Thus, in the first embodiment, the communication can efficiently be conducted while the plural frequency channels or plural communication systems are switched.

Second Embodiment

In a second embodiment, the description will be made centering on an aspect that differs with the first embodiment. The second embodiment differs from the first embodiment in that the notification of information including a modulation and coding scheme with which the wireless communication base station and the wireless communication terminal are supported is made, while the notification of only the standard is made in the first embodiment.

Figure 17:
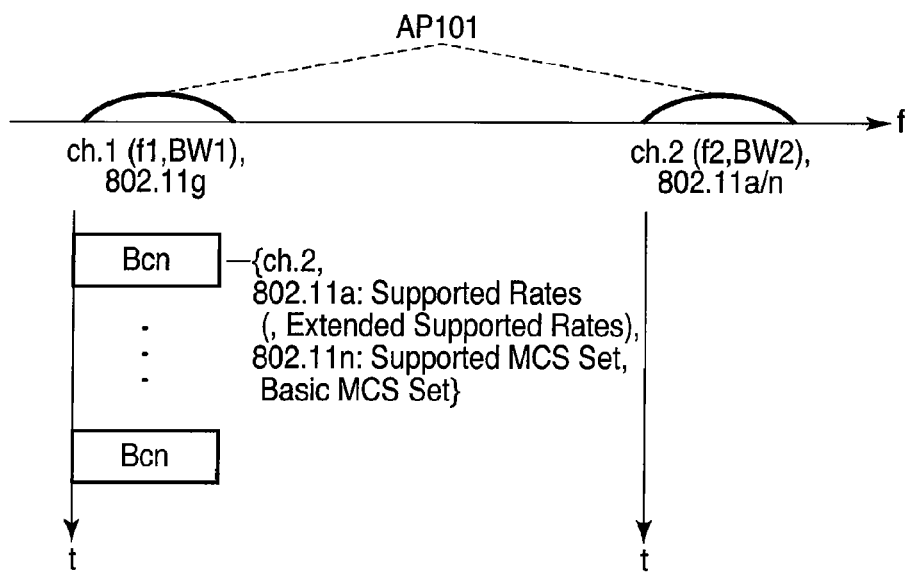
FIG. 17 shows a state in which the wireless communication base station according to a second embodiment sends a beacon frame.

FIG. 17 is a view explaining that the wireless communication base station 101 of the second embodiment makes the notification that IEEE 802.11a/n is used as the information about the frequency channel ch.2 when transmitting the beacon on the frequency channel ch.1, and makes the notification of a corresponding transmission rate in using the IEEE 802.11a on the frequency channel ch.2 and a corresponding Modulation and Coding Scheme (MCS) in using the IEEE 802.11n on the frequency channel ch.2.

FIG. 18 shows a transmission rate defined by IEEE 802.11a. In a BPSK (Binary Phase Shift Keying) modulation, there is a transmission rate of 6 Mbps, which is half of the coding rate, and a transmission rate of 9 Mbps, which is three-fourths of the coding rate. In QPSK (Quadrature Phase Shift Keying) modulation, there is a transmission rate of 12 Mbps, which is half of the coding rate, and a transmission rate of 18 Mbps, which is three-fourths of the coding rate. In 16-QAM (Quadrature Amplitude Modulation) modulation, there is a transmission rate of 24 Mbps, which is half of the coding rate, and a transmission rate of 36 Mbps, which is three-fourths of the coding rate. In 64-QAM modulation, there is a transmission rate of 48 Mbps, which is two-thirds of the coding rate, and a transmission rate of 54 Mbps, which is three-fourths of the coding rate. The transmission rates of 6 Mbps, 12 Mbps, and 24 Mbps are required for the transmission and reception in the modulation supported with IEEE 802.11a. The table of FIG. 18 shows the transmission rates in the case where the basic 20-MHz channel bandwidth is used, that is, in the case of the 20-MHz channel spacing. The transmission rate is halved in the case of the 10-MHz channel spacing operated at "half-clock", and the transmission rate is quartered in the case of the 5-MHz channel spacing operated at "quarter-clock". The transmission rates of 6 Mbps, 12 Mbps, 24 Mbps are required for the transmission and reception in the case of 20 MHz, that is, the transmission rates of 3 Mbps, 6 Mbps, and 12 Mbps are required for the transmission and reception in the case of the 10-MHz channel spacing, and the transmission rates of 1.5 Mbps, 3 Mbps, and 6 Mbps are required for the transmission and reception in the case of the 5-MHz channel spacing. The information on the channel spacing is inserted as a regulatory class in the country information element, and the information is inserted in the beacon frame or the probe response frame. In IEEE 802.11a, the wireless communication terminal (including the wireless communication base station) notifies the other terminal (including the wireless communication base station) as a supported rates element (or as an extended supported rates element when the pieces of information cannot be accommodated in the supported rates element) that the wireless communication terminal can perform the transmission and reception at a certain transmission rate and that the wireless communication terminal can receive at a certain transmission rate while the pieces of information are inserted in the frame body item of the frame (association request and association response) which is exchanged in the association process. In order to indicate that the transmission and reception are required at a certain transmission rate as BSS and that the reception can be performed at a certain transmission rate, the supported rates element is also inserted in the beacon frame and the probe response frame, and the supported rates element is sent as required information in the BSS to the wireless communication terminal. The information in forming the BSS on the frequency channel ch.2 is also announced when the announcement that IEEE 802.11a can be used on the frequency channel ch.2 is made by the beacon on the frequency channel ch.1, and the information is also announced when the announcement that IEEE 802.11a can be used on the frequency channel ch.2 is made by the probe response on the frequency channel ch.1.

FIG. 19 shows a relationship between an MCS defined in IEEE 802.11n and the transmission rate in the 20-MHz channel bandwidth (all the relationships are not described, but the relationships from MCS index 10 are omitted). The MCSs are classified by the MCS index, and a supported MCS set item indicates which MCS can be sent or received by the wireless communication terminal (including the wireless communication base station). The wireless communication terminal notifies the other terminal (including the wireless communication base station) of the supported MCS set item while the supported MCS set item is inserted in the frame body item of the frame (association request and association response) which is exchanged in the association process. The supported MCS set item is also inserted in the beacon frame and the probe response frame in order to inform the wireless communication terminal which MCS can be received or sent by the wireless communication base station. In IEEE 802.11n, which MCS is supported as a BSS (that is, which MCS can be sent and received) is indicated as basic MCS set fields inserted in the beacon frame and the probe response frame. In IEEE 802.11n, the relationship between MCS and the transmission rate is not unique, unlike IEEE 802.11a, but the transmission rate is obtained by adding the information on the channel bandwidth (20 MHz is a mandatory and 40 MHz is an option). The announcements of the pieces of information on the supported MCS set item and the basic MCS set item used in IEEE 802.11n on the frequency channel ch.2 are also made when the announcement that IEEE 802.11n can be used on the frequency channel ch.2 is made by the beacon on the frequency channel ch.1. As described above, when the information on the channel bandwidth on the frequency channel ch.2 can also be recognized by making the notification with the beacon on the frequency channel ch.1, or when the information on the channel bandwidth on the frequency channel ch.2 can also be recognized by unique determination with the channel identifier on the frequency channel ch.2, the wireless communication terminal 201 can previously recognize on the frequency channel ch.1 the transmission rate which can be used by the wireless communication base station 101 when the transmission and reception are performed on the frequency channel ch.2 using IEEE 802.11n.

On the other hand, in setting the connection with the wireless communication base station 101 on the frequency channel ch.1, using the association request frame, the wireless communication terminal 201 makes the notification that wireless communication terminal 201 is supported with IEEE 802.11a on the frequency channel ch.2 and the notification that the transmission and reception can be performed at a certain transmission rate and the reception can be performed at a certain transmission rate when IEEE the 802.11a is used on the frequency channel ch.2 by inserting the information on the supported rates element on the frequency channel ch.2.

For example, when the wireless communication terminal 201 sends the association request frame on the frequency channel ch.1 using IEEE 802.11g, the wireless communication terminal 201 makes the notification of the supported rate element information that the transmission and reception can be performed at the transmission rates of 6 Mbps, 12 Mbps, and 24 Mbps and the reception can be performed at the transmission rates of 36 Mbps and 54 Mbps on the frequency channel ch.1, and the wireless communication terminal 201 makes the notifications that the wireless communication terminal 201 is supported with IEEE 802.11a on the frequency channel ch.2, and makes the notification of the supported rates element information that the transmission and reception can be performed at the transmission rates of 6 Mbps, 12 Mbps, and 24 Mbps, and that the reception can be performed at the transmission rates of 36 Mbps and 54 Mbps on the frequency channel ch.2. It is assumed that another wireless communication terminal 202 makes the notification of pieces of supported rates element information that the wireless communication terminal 202 can perform the transmission and reception at all the transmission rates of 6 Mbps, 9 Mbps, 12 Mbps, 18 Mbps, 24 Mbps, 36 Mbps, 48 Mbps, and 54 Mbps by IEEE 802.11g on the frequency channel ch.1 and IEEE 802.11a on the frequency channel ch.2, it is assumed that the wireless communication terminal 202 makes the notification of the supported MCS set item information that MCSs 0 to 32 can be sent and received by IEEE 802.11n on the frequency channel ch.2 and MCSs 33 and 34 can be received, and it is assumed that the wireless communication terminal 202 currently conducts the communication with the wireless communication base station 101 on the frequency channel ch.2. In such cases, a connection management table of FIG. 20 is used instead of the connection management table of FIG. 14A. The transmission rate which can be received by at least the wireless communication terminal 201 is used when the wireless communication base station 101 performs the transmission to the wireless communication terminal 201 at the sendable and receivable transmission rate, and the transmission rate which can be received by at least the wireless communication terminal 202 is used when the wireless communication base station 101 performs the transmission to the wireless communication terminal 202. For example, when the wireless communication base station 101 cannot perform the transmission at the transmission rate of 54 Mbps, necessary and sufficient information may be inserted in the connection management list in consideration of the capability of the wireless communication base station 101 such that the transmission rate of 54 Mbps is eliminated from the fields of FIG. 20.

It is assumed that the information inserted in the beacon or probe response frame from the wireless communication base station 101 is shared by IEEE 802.11g on the frequency channel ch.1 and IEEE 802.11a on the frequency channel ch.2 on the side of the wireless communication terminal 201, it is assumed that the transmission and reception can be performed at the transmission rates of 6 Mbps, 12 Mbps, 24 Mbps, and 36 Mbps, and it is assumed that the reception can be performed at the transmission rates of 9 Mbps, 18 Mbps, and 48 Mbps. In such cases, a connection management table of FIG. 21 is produced instead of the connection management table of FIG. 15 of the first embodiment. The wireless communication terminal 201 sends the frame addressed to the wireless communication base station 101 at the sendable and receivable transmission rate of the wireless communication terminal 201 using the transmission rate which can be received by at least the wireless communication base station 101. Referring to FIG. 20, the wireless communication terminal 201 cannot perform the transmission at the transmission rates of 9 Mbps, 18 Mbps, and 48 Mbps. Therefore, in consideration of the capability of the wireless communication terminal 201, necessary and sufficient information may be inserted in the connection management list such that the transmission rates of 9 Mbps, 18 Mbps, and 48 Mbps are eliminated from the fields of FIG. 21.

In the second embodiment, the supported rates element information which can be used in IEEE 802.11a and the IEEE 802.11a supported information are inserted in the supported MCS set item information which can be used in IEEE 802.11n and the IEEE 802.11n supported information. Alternatively, the frequency channel ch.2 is the 5 GHz bandwidth, the frequency channel ch.2 is supported with the IEEE 802.11 standard (including the extended system) (or that the frequency channel ch.2 is supported with the IEEE 802.11 standard is not shown when expected as already-known information), and the supported rates element information and the supported MCS set item information may be inserted while the IEEE 802.11a supported information and the IEEE 802.11n supported information are not inserted. That is, it is understood that the transmission rate which can be used in IEEE 802.11a is shown only when the supported rates element information is recognized while the frequency channel ch.2 is supported with the IEEE 802.11 standard in the 5 GHz bandwidth, and it is understood that MCS which can be used in IEEE 802.11n only when the supported MCS set item information is recognized while the frequency channel ch.2 is supported with IEEE 802.11 standard in the 5 GHz bandwidth.

When the information is shared by the frequency channels, the announcement and notification of the shared information may commonly be made, and the pieces of information can be organized on the connection management table. For example, in connection management tables of FIGS. 20 and 21, because IEEE 802.11a is equal to IEEE 802.11g in the supported rates element information, the announcement and notification are made such that the supported rates element information is applied to the frequency channels ch.1 and ch.2 as the one piece of supported rates element information, and the fields of the connection management table of FIG. 20 may be unified.

In the case where the wireless communication terminal 201 sends the change request 1001 for changing the frequency channel to the frequency channel ch.2, the wireless communication base station 101 confirms whether or not the wireless communication terminal 201 deals with the transmission rate/MCS whose transmission and reception are requested on the frequency channel ch.2 and the transmission rate/MCS in which at least the reception is requested with respect to the fields of the wireless communication terminal 201 using the connection management table of FIG. 20. When the wireless communication terminal 201 deals with the transmission rate/MCS whose transmission and reception are requested by the wireless communication base station 101 on the frequency channel ch.2 and the transmission rate/MCS in which at least the reception is requested, the wireless communication base station 101 sends the channel change response 1002 for permitting the change request to the frequency channel ch.2 to the wireless communication terminal 201. When the wireless communication terminal 201 does not deal with one of the transmission rate/MCS whose transmission and reception are requested by the wireless communication base station 101 on the frequency channel ch.2 and the transmission rate/MCS in which at least the reception is requested, the wireless communication base station 101 notifies the wireless communication terminal 201 that the change request to the frequency channel ch.2 is rejected using the channel change response 1002.

(Effect)

Thus, the announcement and notification including the modulation and coding scheme are made as the communication system used in another frequency channel. Therefore, the wireless communication base station and the wireless communication terminal can specifically recognize the level of the communication system with which the other party of the communication can deal with, and the appropriate transmission system can be selected according to the other party of the communication. The wireless communication terminal notifies the wireless communication base station of the receivable communication system of the wireless communication terminal, so that the selection range of communication system addressed to the wireless communication terminal from the wireless communication base station can be widened when the receivable communication system differs from the sendable communication system and particularly when the receivable communication system is larger than the sendable communication system in the range. The wireless communication terminal notifies the wireless communication base station of the receivable and sendable communication system of the wireless communication terminal. Therefore, the wireless communication base station can perform the transmission by the receivable communication system of the wireless communication terminal, the recognition of the sendable communication system from the wireless communication terminal can be used as the information in performing adaptive control, and the communication system of the frame sent from the wireless communication terminal can be narrowed to facilitate the wireless communication base station to deal with the reception system.

The modulation and coding scheme which can be used on another frequency channel in the wireless communication terminal whose connection is permitted on a certain frequency channel is retained along with the identifier of the wireless communication terminal. Therefore, when a change request to another frequency channel is received from the wireless communication terminal, the wireless communication base station can determine whether or not the modulation and coding scheme which can be used by the wireless communication terminal satisfies the use condition on another frequency channel. When the modulation and coding scheme satisfies the use condition on another frequency channel, the communication with the wireless communication terminal on another frequency channel can surely be secured, and the wireless communication terminal can be moved between the frequency channels with which the wireless communication base station is supported without tentatively terminating the connection with wireless communication terminal.

Third Embodiment

In a third embodiment, the description will be made centering on a point that differs from the second embodiment. The third embodiment differs from the second embodiment in that while the announcement or notification of the transmission rate and MCS is made in the second embodiment, the announcement or notification of pieces of information except for the transmission rate and MCS, that is, the announcement or notification of information necessary for the wireless communication terminal to conduct the communication with the wireless communication base station on the frequency channel ch.2 is made.

Each of IEEE 802.11a/g/n needs the information except for the transmission rate and MCS when the data exchange is started. For example, the announcement or notification of various functions such as an optional function in the PHY layer and an optional function in the MAC layer is made. In the third embodiment, the wireless communication base station 101 sends on the frequency channel ch.1 various functions relating to the frequency channel ch.2 while the various functions are inserted in the beacon or probe response frame, and the wireless communication terminal 201 sends the various functions while the various functions are inserted in the association request frame.

Figure 23:
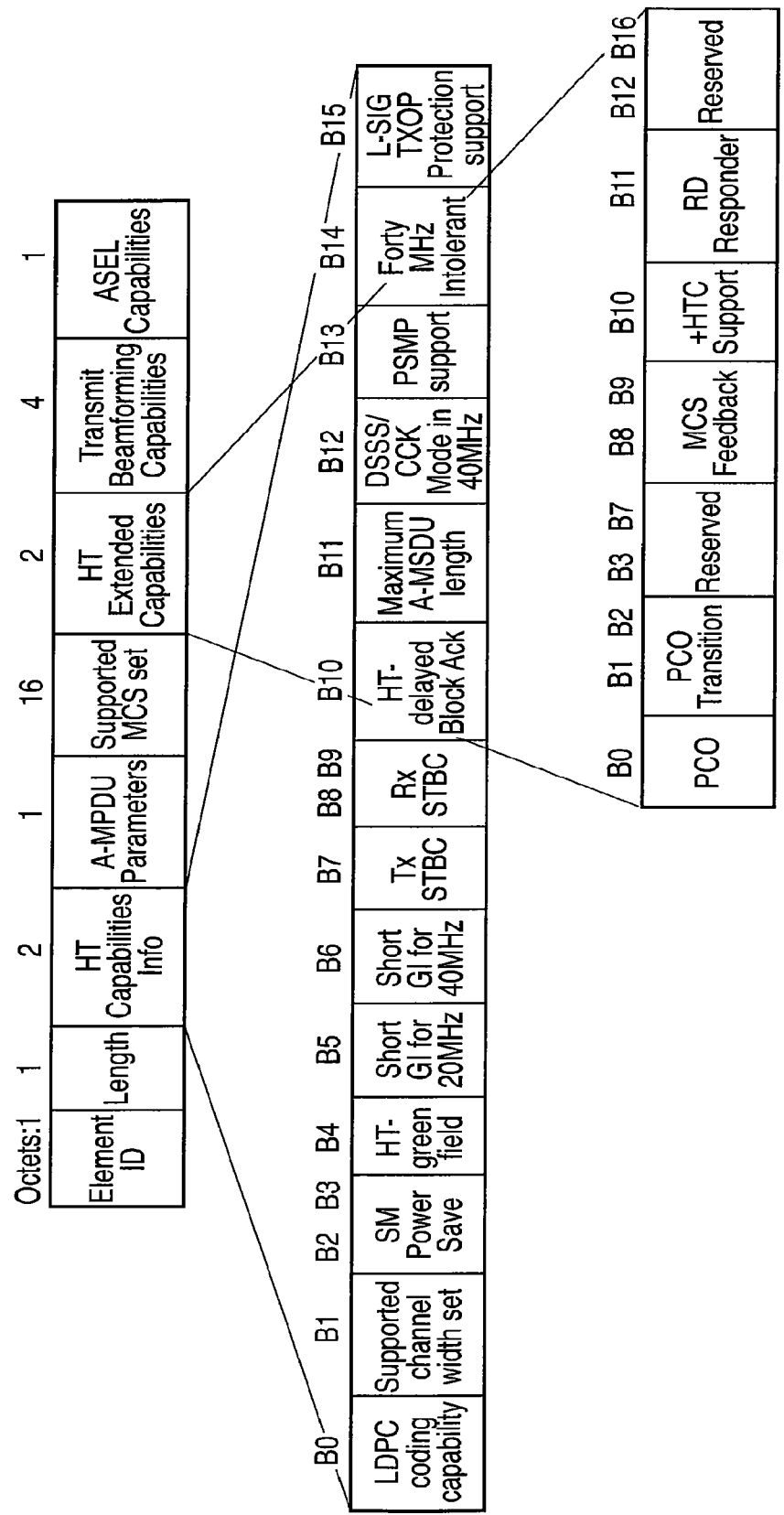
FIG. 23 shows an HT capabilities element of the third embodiment.

For example, the notification of the beacon frame is made while pieces of information of FIG. 22 are inserted in the beacon frame in order to configure the BSS on the frequency channel ch.1. In FIG. 22, the pieces of information are shown in order. However, it is not always necessary that all the pieces of information be described, and only the necessary information need be described. All the pieces of information are not described in FIG. 22. When receiving the probe request frame, the wireless communication base station replies to the wireless communication terminal while the information similar to that of the beacon frame is inserted in the probe response frame. The wireless communication terminal obtains the information necessary to be connected to the wireless communication base station on the frequency channel ch.1 by receiving the information. In the second embodiment, the information about the frequency channel ch.2 is inserted with respect to the supported rates element of FIG. 22. The HT capabilities element of FIG. 22 has a configuration of FIG. 23, and includes capability information relating to IEEE 802.11n (High Throughput; HT). The information about the frequency channel ch.2 is inserted in the supported MCS set of FIG. 23. In the third embodiment, the pieces of information except for the transmission rate and MCS relating to other frequency channels with which the wireless communication base station is supported are also sent on the frequency channel through which the beacon and probe response frames are sent. For example, the capability element of FIG. 22 has a configuration of FIG. 24, the HT capabilities element has a configuration of FIG. 23, and the HT information element has a configuration of FIG. 25. The capability element, the HT capabilities element, and the HT information element include the pieces of information except for the transmission rate and MCS, and the capability element, the HT capabilities element, and the HT information element are sent on the frequency channel ch.1 when the frequency channel ch.2 is used.

Whether or not the wireless communication base station 101 of FIG. 6 is supported with QoS is indicated by the QoS bit of the capability information item in IEEE 802.11, whether or not the wireless communication base station 101 is supported with the polling and how the wireless communication base station 101 is supported with the polling are indicated by a combination of the QoS bit, a CF-pollable bit, and a CF-poll request bit of the capability information item in IEEE 802.11, and the corresponding channel bandwidth in PHY is indicated by a supported channel width set bit in the HT cap capabilities information item of the HT capabilities element at PHY. These pieces of information are inserted as the corresponding information about the frequency channel ch.2.

When the wireless communication terminal 201 performs the frame exchange for performing the setting on the frequency channel ch.1 in order to be connected to the wireless communication base station 101, the information whose notification should be made in conducting the communication on the frequency channel ch.2 is inserted along with the information for connection on the frequency channel ch.1. For example, in IEEE 802.11, pieces of information of FIG. 26 are inserted in the association request frame in order to be connected to the wireless communication base station on the frequency channel ch.1. In FIG. 26, the pieces of information are shown in order. However, it is not always necessary that all the pieces of information be described, and only the necessary information need be described. All the pieces of information are not described in FIG. 26. In the second embodiment, the information about the frequency channel ch.2 is inserted with respect to the supported rates element of FIG. 26. The HT capabilities element of FIG. 26 has the information of FIG. 23, and the information about the frequency channel ch.2 is inserted with respect to the supported MCS set of FIG. 23. In the third embodiment, the pieces of information similar to that relating to another frequency channel (ch.2) with which the wireless communication terminal is supported are also sent on the frequency channel (ch.1) through which the association request frame is sent. For example, the capability element of FIG. 26 includes pieces of information with the configuration of FIG. 24, the HT capabilities element includes pieces of information with the configuration of FIG. 23, and the HT information element includes pieces of information with the configuration of FIG. 25. These pieces of information necessary to use the frequency channel ch.2 are also inserted when the association request frame is sent on the frequency channel ch.1. The association response frame also includes the capability element, the HT capabilities element, and the HT information element in addition to the supported rates element and the extended supported rates element. When the wireless communication base station 101 inserts the corresponding pieces of information about the frequency channel ch.2 in the association response frame, the wireless communication terminal 201 is connected to the wireless communication base station 101 on the frequency channel ch.2, and can confirm an attribute of the wireless communication base station 101 again as the information necessary to conduct the communication under the BSS of the wireless communication base station 101. These pieces of information are retained in the connection management table of each of the wireless communication base station and the wireless communication terminal.

For the simplest system, the information necessary to conduct the communication on the frequency channel ch.2 is inserted in each of the beacon frame, the probe response frame, the association request frame, and the association response frame for the frequency channel ch.1 along with the information (channel identifier and, if needed, center frequency and channel bandwidth) relating to the frequency channel ch.2. For example, in the beacon frame, the format of the beacon frame for the frequency channel ch.1 is inserted, the information about the frequency channel ch.2 is inserted, and the format of the beacon frame for the frequency channel ch.2 is inserted. The portion of the beacon frame information for the frequency channel ch.1 and the portion of the beacon frame information for the frequency channel ch.2 (the portion in which the information about the frequency channel ch.2 and the format of the beacon frame for the frequency channel ch.2 are combined) may be separated as the MAC frame while aggregated as the PHY frame. The portion of the beacon frame information for the frequency channel ch.1 and the portion of the beacon frame information for the frequency channel ch.2 may be separated and sent as the MAC frame and as the PHY frame. The portion of the beacon frame information for the frequency channel ch.1 and the portion of the beacon frame information for the frequency channel ch.2 may be sent while dealt with as a single MAC frame.

The necessary function across the frequencies may be omitted while the notification of the optional function is made.

When the function is commonly supported across the frequency channels (for example, QoS is supported in all the frequency channels), the notification of the function may commonly be made. When the function depends on the frequency channel, the notification of the function may be made in each frequency channel.

The wireless communication base station 101 can change the provided service by adjusting an access parameter corresponding to the traffic type of the communication existing on each frequency channel or restricting an application used. A notification of a service policy of the wireless communication base station on each frequency channel may be made by the beacon frame or the probe Response frame. The wireless communication terminal (in this case, wireless communication terminal 201) may determine the change of the frequency channel in consideration of the service policy on each frequency channel whose notification is made by the wireless communication base station 101. On the other hand, the wireless communication base station 101 may determine the permission or rejection of the channel change request from the wireless communication terminal 201 based on whether or not the service policy can be maintained on the changed frequency channel. For example, when the wireless communication base station 101 can predict that the wireless communication terminal 201 is moved onto the frequency channel ch.2 to restrict the AV transmission bandwidth (throughput) on the frequency channel ch.2, the wireless communication base station 101 rejects the change request to the frequency channel ch.2 of the wireless communication terminal 201. During the channel change request, the wireless communication terminal 201 notifies the wireless communication base station 101 of the service used on the changed frequency channel, and the wireless communication base station 101 may determine the permission or rejection after checking the service against the support service on the changed frequency channel. For example, in the case where the frequency channel ch.2 is provided for the purpose of AV transmission in the wireless communication base station 101, when the wireless communication terminal 201 notifies the wireless communication base station 101 to perform VoIP transmission in the change request to the frequency channel ch.2, the wireless communication base station 101 rejects the request because the frequency channel ch.2 is not used for the AV transmission.

(Effect)

The wireless communication base station and the wireless communication terminal notify each other of the information on each function in the communication system necessary to perform the connection and conduct the communication on the frequency channel except for the frequency channel on which the communication is currently conducted. Therefore, it is not necessary to set each function on the frequency channel ch.2 after the wireless communication terminal is moved to another frequency channel with which the wireless communication base station is compatible, and the communication can immediately be started with each function.

Fourth Embodiment

In a fourth embodiment, the description will be made centering on an aspect added to the first to third embodiments. In the fourth embodiment, a notification of information necessary for the connection on plural frequency channels with which the wireless communication base station is supported is made in addition to the first to third embodiment.

FIG. 27 shows the state in which the wireless communication base station 101 of the fourth embodiment sends the beacon frame on the two frequency channels ch.1 and ch.2. In the first to third embodiments, the information about the frequency channel ch.2 is inserted in the beacon frame sent on the frequency channel ch.1. On the other hand, in the fourth embodiment, the beacon frame is also sent on the frequency channel ch.2, and the information about the frequency channel ch.2 is inserted in the beacon frame. The notification of the information about the frequency channel ch.1 may be made on the frequency channel ch.2. When the probe request frame is received from the wireless communication terminal on the frequency channel ch.2, the information about the frequency channel ch.2 is inserted when the wireless communication base station sends back the probe response frame. The information about the frequency channel ch.1 may be mixed in the probe response frame sent on the frequency channel ch.2.

FIG. 27 shows only the information about the frequency channel ch.2 in the beacon frame sent on the frequency channel ch.1. However, as described above, the wireless communication terminal inserts the information about the frequency channel ch.1 in the beacon frame sent on the frequency channel ch.1 in order to set the connection with the wireless communication base station 101 on the frequency channel ch.1.

Therefore, other wireless communication terminals (including the wireless communication base station) can recognize that the wireless communication base station 101 is also activated on the frequency channel ch.2, and an interference avoiding countermeasure can be expected in other wireless communication terminals. The wireless communication terminal can recognize the wireless communication base station 101 as a connection candidate because the wireless communication base station 101 is activated on the frequency channel ch.2.

On the other hand, when the wireless communication base station 101 does not accept the new connection of the wireless communication terminal on the frequency channel ch.2 (the acceptance of the connection request is limited to the frequency channel ch.1, and the connection request is accepted on the frequency channel ch.2 only by the channel change from the frequency channel ch.1), the frame which is not the beacon frame is not sent back in response to the probe request frame as the frame in which the notification of the information about the frequency channel ch.2 is made on the frequency channel ch.2, and the information on the BSS may be sent back by another frame in response to a similar frame. That is, the subtype item frame according to embodiments of the invention which is not recognized by a conventional wireless communication terminal (hereinafter referred to as "legacy terminal") is used. For example, in the IEEE 802.11 wireless LAN standard, although the legacy terminal and the wireless communication terminal (including the wireless communication base station) of the fourth embodiment recognize the frame having the subtype item of {B4,B5,B6,B7}={0,0,0,1} as the beacon frame, a new subtype item which is different from the subtype item of {B4,B5,B6,B7}={0,0,0,1} is defined as the management frame whose BSS information is announced on the frequency channel ch.2. One of the reserved subtype fields which are not defined in the IEEE 802.11 wireless LAN standard stage with which the legacy terminal is supported is used (for the sake of convenience, the new subtype item is referred to as subtype 1). Therefore, when receiving the management frame of the new subtype 1, the wireless communication terminal of the fourth embodiment recognizes that the management frame of the new subtype 1 announces the BSS information instead of the beacon frame on the frequency channel ch.2, and that the new connection is not accepted on the frequency channel ch.2. When the management frame of the new subtype 1 sent on the frequency channel ch.2 indicates that the new connection is accepted on the frequency channel ch.1, the wireless communication terminal 201 can be moved to the frequency channel ch.1 to start the exchange of the authentication frame and association frame for setting the connection with the wireless communication base station 101. The legacy terminal cannot find the wireless communication base station 101 because the legacy terminal does not receive the beacon frame, and the legacy terminal cannot recognize the management frame of the new subtype 1 even when receiving the management frame of the new subtype 1. Therefore, when the MAC unit performs the reception processing, the legacy terminal determines that the management frame of the new subtype 1 is the frame which cannot be recognized by filtering in the subtype item, cancels contents of the frame body item (that is, even if the subtype 1 is received, the legacy terminal does not recognize the subtype 1 as the connection candidate unlike the case in which the beacon is received), and performs common processing when the legacy terminal can recognize the frame. In the common processing, a determination as to whether or not setting of NAV is made from the address item unit and the duration/ID item of the MAC header portion, or a determination of whether the wireless communication terminal which sends the frame from the power management bit (written in Pwr Mgt of FIG. 8) of the Frame Control item of the MAC header portion is in a power saving mode or an active mode (in this case, the wireless communication base station 101 which is always in the active mode). As a result, the legacy terminal does not try the connection with the wireless communication base station 101. When a subtype 2 is used on the frequency channel ch.2 instead of the probe request frame while a subtype 3 is used instead of the probe response frame, the wireless communication base station 101 does not send the probe response frame on the frequency channel ch.2 even if the wireless communication base station 101 receives the probe request, the legacy terminal does not obtain the information on BSS from the wireless communication base station 101 on the frequency channel ch.2, and does not try the connection because the legacy terminal cannot find the wireless communication base station 101. However, the wireless communication terminal 201, which is the wireless communication terminal of the fourth embodiment, can obtain the BSS information about the frequency channel ch.2 because the wireless communication base station 101 replies to the management frame of the subtype 2 using the management frame of the subtype 3. When the new connection is accepted on the frequency channel ch.1 while the information about the frequency channel ch.1 is inserted in the management frame of the subtype 3, the wireless communication terminal 201 can be moved to the frequency channel ch.1 to start the exchange of the authentication frame and association frame for setting the connection with the wireless communication base station 101. Because the frame which cannot be recognized by the legacy terminal is used, the legacy terminal cannot recognize that the wireless communication base station 101 is operated on the frequency channel ch.2, and cannot perform the connection on the frequency channel ch.2. On the other hand, in the wireless communication terminal of the fourth embodiment, the connection on the frequency channel ch.2 can be restricted such that the wireless communication base station 101 is detected and connected using the new frame such as the subtypes 1, 2, and 3 on the frequency channel ch.2.

(Effect)

Thus, the announcement and notification of the communication system or modulation and coding scheme used in another frequency channel are made on another frequency channel, so that other wireless communication base stations or wireless communication terminals which are receivable on another frequency channel can recognize what communication system or modulation and coding scheme is used on another frequency channel by the wireless communication base station.

Other wireless communication base stations and wireless communication terminals can take the interference avoiding countermeasure by using such recognition.

In the wireless communication terminal, the recognition can make the wireless communication base station the candidate of the wireless communication base station to be connected.

The connection can be restricted on the other frequency channel by the frame according to embodiments of the invention which cannot be recognized by the conventional wireless communication terminal.

Fifth Embodiment

In a fifth embodiment, the description will be made centering on an aspect added to the fourth embodiment. In the fifth embodiment, the following point is added to the fourth embodiment. That is, the same wireless communication base station straddles the plural frequency channels when the wireless communication base station makes a notification of the information necessary for the connection on plural frequency channels with which the wireless communication base station is compatible.

(In the Case where Addition is Realized by BSSID)
(In the Case of a Single BSSID)

Figures 28, 29:
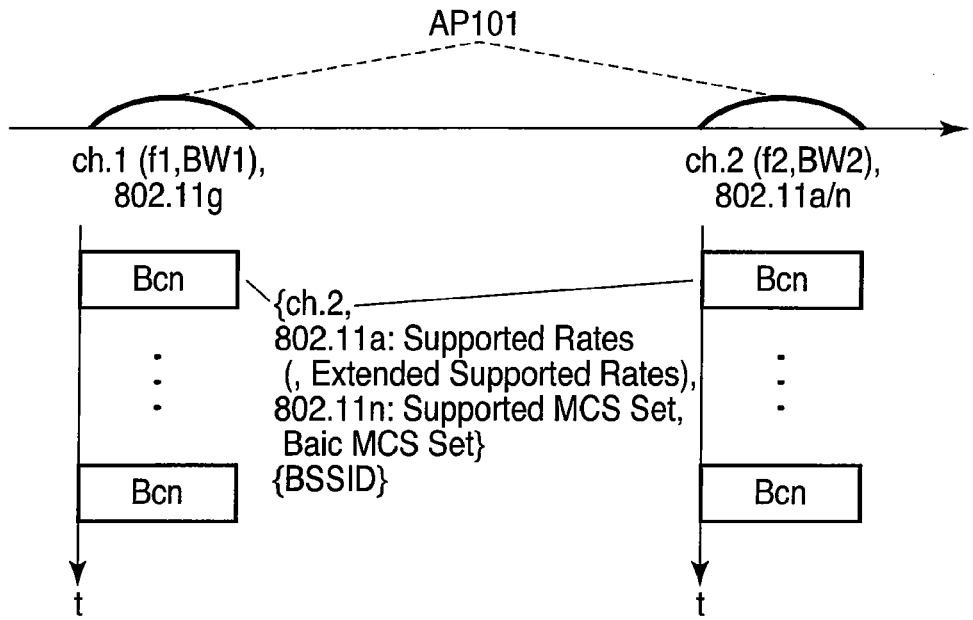
FIG. 28 shows a state in which a wireless communication base station according to a fifth embodiment sends a beacon frame.
FIG. 29 shows a BSS description of the fifth embodiment.

For example, in the IEEE 802.11 wireless LAN standard, the BSS includes a certain wireless communication base station and a wireless communication terminal connected thereto, the BSS has an identifier BSSID (Basic Service Set IDentification), and usually the BSSID is located in the MAC address of the wireless communication base station. The wireless communication base station having the configuration of FIG. 3 may have one BSSID as the MAC address. In such cases, the information about the frequency channel ch.2 is inserted in the beacon frame sent on the frequency channels ch.1 and ch.2 as shown in FIG. 28, and the common BSSID is inserted in order to indicate that the beacon frames are sent on the different frequency channels from the same wireless communication base station.

In the IEEE 802.11 wireless LAN standard, when the wireless communication base station sends the beacon frame, the BSSID is inserted in the item of the address 3 located in the MAC header of FIG. 7. One of the systems is to insert the same 48-bit value of the BSSID in the beacon frames of the frequency channels ch.1 and ch.2.

In such cases, when the wireless communication terminal performs summary processing of the information obtained by scanning the frequency channel, it is necessary to simultaneously retain the information obtained on which frequency channel. In the IEEE 802.11 wireless LAN standard, when the scanning is performed, the information on each BSS is summarized as BSS description, SME is notified of the BSS description, SME determines which BSS is connected, and the frame exchange is performed in order to set the actual connection in the MAC layer. In the fifth embodiment, on which frequency channel the information is obtained can be recognized such that the identifier of the frequency channel is added as the BSS description as shown in FIG. 29.

(In the Case of Plural BSSIDs)

Usually, a BSSID is uniquely determined from the MAC address in the wireless communication base station. Alternatively, in the wireless communication base station having the configuration of FIG. 3, the different frequency channels and associated access control units may be unified to allocate a different BSSID to each frequency channel. That is, a BSSID is set at BSSID1 when the frame is sent through the PHY1 access control unit 31, the PHY1 processing unit 33, and the first frequency conversion circuit 35 of FIG. 3, and a BSSID is set at BSSID2 when the frame is sent through the PHY2 access control unit 32, the PHY2 processing unit 34, and the second frequency conversion circuit 36 of FIG. 3. The plural BSSIDs are managed by the MAC layer management unit 30 which commonly manages the plural frequency channels. The value of a BSSID may be specified outside the MAC layer management unit 30, for example, by an external input, or the value of a BSSID may uniquely be allocated by the MAC layer management unit 30.

Here, BSSID1, which is the BSSID on the frequency channel ch.1, is inserted in the item of address 3 of the MAC header in the beacon frame on the frequency channel ch.1, the frame body item is notified that the BSSID on the frequency channel ch.2 is BSSID2 along with the information about the frequency channel ch.2, and BSSID2, which is the BSSID on the frequency channel ch.2, is inserted in the item of address 3 of the MAC header in the beacon frame on the frequency channel ch.2. When the wireless communication terminal 201 changes the frequency channel from the frequency channel ch.1 to the frequency channel ch.2, the beacon frame on the frequency channel ch.2 is received, and the confirmation that the beacon frame is sent by the same wireless communication base station can be made from the information whose notification is made on the frequency channel ch.1. The information about the frequency channel ch.1 and that the frequency channel ch.1 having BSSID of BSSID1 are inserted_in the frame body item of the beacon frame on the frequency channel ch.2, and the notification of the information about another frequency channel and BSSID used on another frequency channel may be made by the beacon frame sent on each frequency channel. This case is shown in FIG. 30. The pieces of information about other frequency channels are not limited to the order of description of FIG. 30.

In the IEEE 802.11 wireless LAN standard, in addition to a BSSID, a system identifier of an SSID (Service Set Identifier) also exists as shown in FIGS. 22, 26, and 29. In an LLC including plural BSSs, SSID is an identifier of an ESS (Extended Service Set) which is recognized as one BSS. For example, SSID is an identifier indicating a system of the same operator (in some cases, the same service is provided). The same value of the SSID may be used in either of the two examples (one BSSID and plural BSSIDs). The value of the SSID may be changed according to the frequency channels ch.1 and ch.2, when a difference is provided in the support service such that different traffic types are supported by the frequency channels ch.1 and ch.2, such that a higher priority is given to different traffic type (which can be performed by adjusting the access parameter), or such that the supported application is restricted (for example, frequency channel ch.2 is used only for the video transmission).

(Effect)

Thus, the notification that the same wireless communication base station is operated on the plural frequency channels can be made by making the notification of the identifier of the wireless communication base station on another frequency channel.

The wireless communication terminal, in which the communication with the wireless communication base station is conducted on a certain frequency channel, and the communication with the wireless communication base station is conducted again on another frequency channel, recognizes the wireless communication base station. Therefore, the frame can be sent to the wireless communication base station.

Sixth Embodiment

In a sixth embodiment, the description will be made centering on an aspect differing from the fifth embodiment. The sixth embodiment differs from the fifth embodiment in that, while the same wireless communication base station is indicated using a BSSID in the fifth embodiment, an identifier which is different from the BSSID is separately provided to indicate the same wireless communication base station.

For example, the legacy terminal which is supported with the IEEE 802.11 wireless LAN standard does not recognize the additional information of the sixth embodiment, and cannot be expected to perform the information management system according to embodiments of the invention. As described in the fifth embodiment, the pieces of information are summarized as the BSS Description in each BSSID. Therefore, when the notification system of the fifth embodiment in which the single BSSID is used is performed, the legacy terminal cannot distinguish the pieces of information on the beacon frame or probe response frame received from the same wireless communication base station on the plural frequency channels, and cannot recognize the pieces of information about the different frequency channels of the sixth embodiment. When the information is raised from the PHY layer to the MAC layer, the legacy terminal performs the desired processing (such that an information element is extracted and reflected on the subsequent processing in MAC) for the information in which the frame type (up to the subtype level) is recognized and the item position at which the information is accommodated in the frame is uniquely determined (a item start point is fixed and a item length is fixed) or the information in which, even in the information in which the item position is not determined, the element ID can be recognized in the configuration (FIG. 23) including the item accepting the identifier (Element ID), the item indicating the item length, and the information item having the variable length. The portion which cannot be recognized by the system is allocated in the MAC layer and the portion is not reflected on the subsequent processing. Accordingly, the legacy terminal can understand the beacon frame and the probe response frame, can also understand the item of address 3 when the item of address 3 is used in the notification system in which the single BSSID is used, and receives the same frame and the same information on the plural channels. The operation of the legacy terminal may become troublesome unless such situations are accounted for in the design.

Therefore, in the sixth embodiment, while different values (like the second-half example of the fifth embodiment) are allocated to BSSIDs used in the frequency channel (unlike the second-half example of the fifth embodiment in which the notification of the BSSID on another channel is made in the frame body fields of the beacon and probe response frames), new fields which can be understood by the wireless communication terminal of the sixth embodiment are provided in the frame body fields of the beacon and probe response frames. For example, as shown in FIG. 31, a common identifier called Multi-Channel ID (MCID) is inserted in the frame body fields of the beacon and probe response frames which are sent on each of the frequency channels ch.1 and ch.2. Because the legacy terminal cannot recognize an MCID, the legacy terminal does not perform the processing of the information even if the legacy terminal receives the frame, and therefore such trouble is not generated. The wireless communication terminal of the sixth embodiment can understand the MCID, and can recognize the same wireless communication base station when the MCID has the common item value even if the beacon and probe response frames having different BSSIDs are received on different frequency channels. The wireless communication terminal 201 which is moved to the frequency channel ch.2 recognizes the beacon frame and probe response frame which are sent on the frequency channel ch.2 of the wireless communication base station 101 from the MCID, and obtains the BSSID (BSSID 2) which is used on the frequency channel ch.2 by the wireless communication base station 101 from the beacon frame and probe response frame, and BSSID2 is used in the subsequent communication. Alternatively, an MCID may be inserted in the MAC header portion of the frame which is sent by the wireless communication base station 101 and the wireless communication terminal 201. An MCID may be inserted only on the frequency channel ch.2, or an MCID may be inserted in the frame which is sent on all the target frequency channels of the embodiments (in this case, frequency channels ch.1 and ch.2). The wireless communication terminal 201 can recognize the frame having an MCID as one which is sent from the wireless communication base station 101.

(Effect)

The notification that the same wireless communication base station straddles the plural frequency channels is made in the item different from the item indicating the identifier of the wireless communication base station which can conduct the communication only on the single frequency channel. Therefore, when the wireless communication terminal connectable only to the wireless communication base station which can conduct the communication only on the single frequency channel receives the notification, the wireless communication terminal can recognize the wireless communication base station as another one, and can be connected to the wireless communication base station. When the wireless communication terminal connectable to the wireless communication base station which can conduct the communication on plural frequency channels receives the notification, the wireless communication terminal can recognize the wireless communication base station as the same one, and can be connected to the wireless communication base station.

Seventh Embodiment

In a seventh embodiment, the description will be made centering on an aspect added to the third to sixth embodiments. In the seventh embodiment, the following point is added to the third to sixth embodiments. That is, the frame is simultaneously sent on all the sendable frequency channels when the wireless communication base station 101 sends a frame such as a broadcast frame and a multicast frame in which a destination address becomes a group address.

In the case where the configuration of FIG. 6 is adopted, because the wireless communication base station 101 is simultaneously sendable on the frequency channels ch.1 and ch.2 (even if the simultaneous transmission is not actually performed due to the different condition that the access right is obtained), the wireless communication base station 101 sends the group address frame on the frequency channels ch.1 and ch.2. In other words, the group address frame is simultaneously sent on all the sendable and receivable frequency channels, because the frequency channels ch.1 and ch.2 are the simultaneously receivable frequency channels for the wireless communication base station 101.

Usually, in the IEEE 802.11 wireless LAN standard, a item indicating the order of the frame is provided when the frame is sent. The order is inserted in the sequence control item of FIG. 7. Particularly, the sequence control item is divided into a fragment number item and a sequence number item as shown in FIG. 32. The sequence number item indicates a sequence number of an MSDU (MAC Service Data Unit) or MMPDU (MAC Management Protocol Data Unit), that is, the order of the frame. MSDU is a frame which is produced from data transferred from the upper level of the MAC layer, for example, LLC layer, and becomes a data frame. An MMPDU is a frame which is produced to move a management protocol of the MAC layer, and becomes a management frame. A counter of modulo-4096 is allocated to the sequence number in each Traffic Identifier (TID) or reception terminal when the wireless communication terminal distinguishes the types of QoS in the IEEE 802.11 wireless LAN standard, and the counter is incremented by one. The management frame and the QoS frame are not distinguished from each other when the group address frame or the non-QoS frame is sent. A counter of modulo-4096 is allocated to the group address frame or the non-QoS frame in addition to the plural counters, and the counter is incremented by one every time the MSDU or MMPDU frame is sent. In the case of a transmission mode in which the wireless communication terminal does not distinguish the types of QoS, one counter of modulo-4096 is incremented by one in each one MSDU or MMPDU. The fragment number item of FIG. 32 indicates the fragment number, that is, the order of the fragment when one MSDU or MMPDU is sent while divided into fine units having short frame lengths called fine fragments (referred to as fragment processing). The one MSDU or MMPDU can be divided up to 64 fragments in the fragment processing. The values 0 to 63 are allocated to the fragment number fields in each fragment. In the case where the same MSDU or MMPDU is fragmented, the same value is inserted in the sequence number fields, and the order of the fragment is written in the fragment number field.

In the IEEE 802.11 wireless LAN standard, when the wireless communication terminal (including the wireless communication base station) receives the frame, the wireless communication terminal confirms whether or not the frame is addressed to itself from the address item of the MAC header in the reception operation. Because the frame is sent while the direct address to connect terminal is described in the address 1 item of the MAC header, the wireless communication terminal compares whether or not the item of address 1 is identical to the MAC address of itself. When the item of address 1 is identical to the MAC address of the wireless communication terminal, the wireless communication terminal determines that the frame is addressed to itself. In the case where the selection retransmission system is used, the fragmented frames are arranged in the order of the fragment, the frame is converted into the form of MSDU/MMPDU which has no fragment to rearrange the order of the frames received in the order of the sequence control item when one MSDU/MMPDU is completed (referred to as defragment processing), the frame is transferred to the higher level of the MAC layer, for example, the LLC layer or the management frame is transferred to the MAC layer management unit 30, and the desired operation is performed based on the determination through an SME if needed. When the frame having the same sequence number is received from the same wireless communication terminal (the frame having the same fragment number in the case of the frame to which the fragment processing is performed), the frame is allocated because of the overlapping reception. In the case when the frame requires the ack response, the ack frame is sent after SIFS elapses since the reception irrespective of the overlapping. When the wireless communication terminal determines that the frame is not addressed to itself, while the frame is allocated, that the media is busy in the MAC layer is recognized, that is, the virtual carrier sense is invoked only for a time written in duration/ID item in which the NAV (Network Allocation Vector) is set based on the duration/ID item of FIG. 7 (described by Dur/ID in FIG. 7).

The group address is described in the item of address 1 in the case of the group address frame. In the IEEE 802.11 wireless LAN standard, when receiving the group address, the wireless communication terminal, which is connected to the wireless communication base station through the association process, extracts BSSID (the item of address 3 of FIG. 7 in the case of the management frame, or the item of address 2 of FIG. 7 in the case where the wireless communication base station sends the data frame to the wireless communication terminal thereof) described in the MAC header, and the wireless communication terminal determines whether or not the BSSID described in the MAC header is identical to the BSSID of the BSS to which the wireless communication terminal belongs. When the BSSID described in the MAC header is identical to the BSSID of the BSS to which the wireless communication terminal belongs (the wireless communication terminal further determines whether or not the BSSID described in the MAC header is a multicast frame including the wireless communication terminal in the case of the multicast frame, and when the BSSID described in the MAC header is the multicast frame), the desired processing (frame body item portion is extracted and transferred to the high-order layer or the MAC layer management unit 30, and a desired operation is performed through an SME if needed) is performed in the MAC layer. When the BSSID described in the MAC header is not identical to the BSSID of the BSS to which the wireless communication terminal belongs, the frame is allocated. In the case of the group address frame, the ack frame is not sent after SIFS, even if the group address includes the wireless communication terminal. Similarly to the unicast frame, the frame is allocated when the frame having the same sequence number is received from the same wireless communication terminal. In the case where the same group address is received from plural wireless communication terminals by a mesh-like configuration, because the transmission address which generates the data and the item corresponding to the sequence number on a mesh network are provided in the frame, the pieces of information are combined to determine whether or not the frames overlap each other. The frame is allocated when the frames overlap each other.

In the case where the single BSSID of the fifth embodiment indicates the same wireless communication base station, the wireless communication terminal 201 receives the group address frame 1 on the frequency channel ch.1. When the wireless communication terminal 201 is transferred to the frequency channel ch.2 (because the wireless communication base station 101 obtains the access right) to receive the group address frame 1 again, because the fields of the frames in which BSSID is described in the MAC header are identical to the MAC address of the wireless communication base station 101, and the frames have the same sequence number. Therefore, the group address frame 1 which is received later on the frequency channel ch.2 is allocated. In the case where the conventional wireless communication terminal performs the channel change, even if the frames are sent on plural frequency channels from the same wireless communication base station, the wireless communication terminal cannot recognize that the frames are sent on plural frequency channels from the same wireless communication base station when the notification of the frame is made by an unsupported item. Accordingly, in the seventh embodiment, the item in which the already existing BSSID is described and the item in which the sequence number is described are used according to the already existing application, so that even the conventional wireless communication terminal which is unsupported with embodiments of the invention can recognize the overlapping of the group address frames and dispose the group address frame by the MAC layer.

The wireless communication terminal 201 receives the group address frame 1 on the frequency channel ch.1, when the system of the fifth embodiment for making the notification (announcement) of BSSID, used on another frequency channel, on the frequency channel while plural BSSIDs are provided is used. When the wireless communication terminal 201 is transferred to the frequency channel ch.2 (because the wireless communication base station 101 obtains the access right) to receive the group address frame 1 again, because the wireless communication terminal 201 previously recognizes the BSSID used on the frequency channel ch.2 although the two frames differ from each other in the item in which the BSSID is described in the MAC header, the group address frame 1 received on the frequency channel ch.2 also becomes the processing target in the MAC layer. Because of the same sequence number, the wireless communication terminal 201 recognizes the same group address frame sent from the same wireless communication base station, and disposes the group address frame 1 received later on the frequency channel ch.2. In the case where the MCID of the sixth embodiment is used, the MCID is similarly inserted in the group address frame (for example, the item in which the MCID is inserted in the frame body item is provided in the case of the management frame, the item in which the MCID is inserted in the MAC header portion is provided in the case of the data frame). Therefore, the wireless communication terminal 201 can recognize the same group address frame sent from the same wireless communication base station, and can dispose the group address frame 1 received later on the frequency channel ch.2. On the other hand, in the above-described systems, even if the same group address is received on the plural frequency channels, the legacy terminal cannot recognize that the group addresses are sent from the same wireless communication base station and that the group address can be allocated because of the overlapping. Accordingly, it is necessary that the group address be identified and allocated by a layer higher than the MAC layer on the wireless communication terminal side, or it is necessary that the legacy terminal on the wireless communication base station side changes the frequency channel such that the same group address is not sent in an overlapping manner when the legacy terminal is connected to the wireless communication base station on the changed frequency channel.

As described above, in the case where the wireless communication terminal changes the frequency channel, in order to reduce the overlapping group address, desirably the wireless communication base station recognizes the time the wireless communication terminal changes the frequency channel, and performs the transmission after the frequency channel change. In the case where the frequency channel movements of plural wireless communication terminals overlap each other, desirably the wireless communication base station waits for completion of all the movements of the wireless communication terminals. Additionally, for the group address frame, in the IEEE 802.11 wireless LAN standard, sometimes the wireless communication terminal which is in the power saving mode needs to recognize the timing of the receivable state to perform the transmission. Therefore, the group address frame is sent in consideration of such need. As described above, in the case where the legacy terminal changes the frequency channel, the wireless communication base station cannot previously recognize when the frequency channel is changed and when the legacy terminal is connected to the wireless communication base station on the new frequency channel. Therefore, when the wireless communication base station 101 recognizes that the legacy terminal is moved from the frequency channel ch.1 to the frequency channel ch.2 and connected to the wireless communication base station 101, in order that the control is performed in the MAC layer such that the group address frame is not sent to the legacy terminal again, the multicast address frame addressed to the conventional wireless communication terminal and the multicast address frame addressed to the wireless communication terminal of the seventh embodiment are separately provided, and the group address frame addressed to the legacy terminal and the group address frame addressed to the wireless communication terminal of the seventh embodiment are sent while distinguished from each other such that the information which is already sent to the legacy terminal on the frequency channel ch.1 is sent on the frequency channel ch.2 using the multicast address frame addressed to the wireless communication terminal of the seventh embodiment. In such cases, the transmission may be performed on the frequency channel ch.2 after a predetermined time elapses (for example, after at least a channel change time expected in the legacy terminal). The frequency channel on which the connection of the legacy terminal is permitted is limited to one frequency channel (for example, the frequency channel ch.1), and the connection of the legacy terminal may be rejected on another frequency channel (for example, the frequency channel ch.2) to prevent the generation of such a problem.

(Effect)

Thus, the frames addressed to the plural wireless communication terminals are sent on all the sendable and receivable frequency channels. Therefore, the destination wireless communication terminal whose frequency channel is possibly moved can surely receive the frame. Additionally, in transmitting the frame, it is not necessary that the wireless communication base station correctly specify the connected frequency channel including the movement of the frequency channel to connect wireless communication terminal, and a processing load can be reduced.

When the same frames addressed to the plural wireless communication terminals are sent on the plural frequency channels, the same value is inserted in the item indicating the order of the delivery number. Therefore, in the case where the transmission timing is shifted among the plural frequency channels, the overlapping can be recognized, even if the wireless communication terminal moved between the frequency channels or the wireless communication terminal which can perform the reception on the plural frequency channels receives the same packets on the plural frequency channels.

Eighth Embodiment

In an eighth embodiment, the description will be made centering on an aspect added to the third to seventh embodiments. In the eighth embodiment, the point that the same wireless communication base station makes an announcement and a notification of a channel usage rate on another simultaneously usable frequency channel is added to the third to seventh embodiments.

The case in which the wireless communication base station 101 makes the announcement or notification of the information about the frequency channel on the frequency channels ch.1 and ch.2 as shown in FIG. 30 will be described below. The wireless communication base station 101 makes the announcement or notification of the channel usage rate of the frequency channel ch.2 on the frequency channel ch.1 while the usage rate on the frequency channel ch.2 is included in the beacon frame or probe response frame as the information about the frequency channel ch.2. On the contrary, the announcement or notification of the channel usage rate of the frequency channel ch.1 may be made on the frequency channel ch.2 while the channel usage rate on the frequency channel ch.1 is included in the information about the frequency channel ch.1.

The channel usage rate is a time in which a frequency channel is occupied for a constant observation period. In the mechanism in which the transmission is performed using CSMA, the wireless communication terminal (including the wireless communication base station) adapts a competition system in which the transmission is performed when the wireless communication terminal determines that the frequency channel is empty. CSMA/CA (Carrier Sense Multiple Access with Carrier Avoidance) is a system in which, in order that the wireless communication terminals are prevented from simultaneously getting access to the frequency channel to collide with each other in the empty time, the wireless communication terminal gets access to the frequency channel after the wireless communication terminal waits for a constant fixed time and a random time while the frequency channel is empty. In the case of the IEEE 802.11 wireless LAN standard in which CSMA/CA is used, the determination as to whether or not the frequency channel is empty is made by a Clear Channel Assessment (CCA) mechanism which recognizes the state of the wireless medium in the PHY layer and the status of the virtual carrier sense in the MAC layer. In the PHY layer, the MAC layer is notified of CCA=BUSY when a reception electric power having a predetermined level is detected on the frequency channel, and the MAC layer is notified of CCA=IDLE when the reception electric power is of the predetermined level or less (in FIG. 2, the notification signal is sent from the PHY unit 4 to MAC unit 2). For example, the reception electric power of the predetermined level is −82 dBm when a preamble portion located in the head of the PHY packet can be detected, and is −62 dBm when the preamble portion cannot be detected. The sum of sets of the period during which the CCA signal from the PHY layer is BUSY and the time described in the duration/ID item of the frame which is not addressed to the MAC layer (that the medium recognizes BUSY for the time to stop the transmission is referred to as "NAV is set", and the mechanism which recognizes the medium as BUSY even if CCA is actually IDLE in the PHY layer is referred to as "virtual carrier sense") is computed in the MAC layer, the sum of sets is recognized as the frequency channel being occupied, and an exclusive period of the sum of sets is recognized as the frequency channel being empty. Accordingly, because the observation as to whether or not the frequency channel is occupied is made when the transmission is performed on the frequency channel, statistical processing can be performed on the information to compute the time the frequency channel is occupied for the constant observation period. When the beacon interval during which the beacon frame is sent is fixed (when CSMA/CA is used, the time the beacon frame is actually sent on the frequency channel does not become constant), the frequency channel occupied time observed for the beacon interval may be indicated, or the frequency channel occupied time observed for several beacon intervals may be divided by the beacon interval (normalized by the beacon interval) to indicate an average occupied time.

The channel usage rate is a data amount which is sent per constant time by the wireless communication base station. An average data amount per unit time such as the beacon interval may be indicated after the measurement is performed for the predetermined time as described above.

The channel usage rate is a time necessary to actually obtain the access right since the access request is generated, when the wireless communication base station gets access to the wireless medium per predetermined time to perform the transmission. An average access time per unit time such as the beacon interval may be indicated after the measurement is performed for the predetermined time as described above.

In the eighth embodiment, the frequency channel usage rate is basically described by the system for computing the statistical processing when the wireless communication base station performs the channel access. The wireless communication base station is notified of the result observed by the wireless communication terminal connected to the wireless communication base station, and the information may be used as the channel usage rate. In such cases, the information on the observation result is collected from plural wireless communication terminals connected to the wireless communication base station and the statistical processing may be performed on the information to use the information as the frequency channel usage rate.

The wireless communication terminal 201 obtains the information on the channel usage rate from the wireless communication base station 101 on another frequency channel, and determines whether or not the wireless communication terminal 201 is transferred to another frequency channel. For example, when the channel occupied rate of the frequency channel ch.2 is shorter than that of the currently used frequency channel ch.1, the wireless communication terminal 201 determines that desirably the wireless communication terminal 201 is transferred to the frequency channel ch.2 to conduct the communication.

The wireless communication terminal 201 computes the statistics to compare the channel usage rate of the frequency channel ch.1 to the channel usage rate of the frequency channel ch.2. Here, when the wireless communication base station 101 obtains the channel usage rate of the frequency channel ch.1 on the frequency channel ch.1 and the channel usage rate of the frequency channel ch.2 on the frequency channel ch.2, the wireless communication terminal 201 can compare the states of the frequency channels ch.1 and ch.2 as the information from the wireless communication base station 101.

(Effect)

Thus, the wireless communication base station notifies the wireless communication terminal of the channel usage rate of another frequency channel. Thus, the information can be provided to the wireless communication terminal which determines whether or not the wireless communication terminal transferred to another frequency channel, and the wireless communication terminal determines whether or not the wireless communication terminal transferred to another frequency channel based on the information, so that the communication can be secured on the transferred frequency channel. The channel usage rate is indicated by the channel occupied rate, the average transmission data amount per unit time, or the average time to obtain the access right, so that the specific index can be obtained when the wireless communication terminal makes the determination.

Ninth Embodiment

In a ninth embodiment, the description will be made centered on points added to the first to eighth embodiments. In the ninth embodiment, the following point is added to the first to eighth embodiments. That is, the wireless communication base station includes security information set between the wireless communication base station and the wireless communication terminal in the connection management table used to manage the information on the connection with the wireless communication terminal, and conducts the communication with the wireless communication terminal with the security setting even if the wireless communication terminal changes the frequency channel.

In the IEEE 802.11 wireless LAN standard, there are plural systems for encrypting the communication. TKIP (Temporal Key Integrity Protocol), in which a security level is enhanced by developing WEP or WEP based on an ARC 4 algorithm, and CCMP (Counter mode with Cipher-block chaining Message authentication code Protocol) based on AES (Advanced Encryption Standard), which has a high level of security, can be cited as examples of encryption systems in exchanging the data frame. WEP is divided into a system in which 64-bit-length data is used for a secret key and a system in which 128-bit-length data is used to strengthen the security. The communication between the wireless communication base station and the wireless communication terminal can be encrypted when the wireless communication base station and the wireless communication terminal are supported with the common encryption system.

In the ninth embodiment, when the wireless communication terminal 201 performs the connection setting for the communication with the wireless communication base station 101 on the frequency channel ch.1 in the configuration of FIG. 6, the wireless communication terminal 201 also performs a setting for the data exchange with the wireless communication base station 101 using TKIP. The wireless communication base station 101 retains the connection management table of FIG. 33 for the connected wireless communication terminal. In the connection management table of FIG. 33, a item of security information is added instead of the connection management table of FIG. 14A. When the connection setting including the TKIP setting is normally ended between the wireless communication base station 101 and the wireless communication terminal 201 (wireless communication base station 101 permits the connection with the wireless communication terminal 201 with TKIP), the connection information on the wireless communication terminal 201 is written and retained as shown in FIG. 33. When the wireless communication base station 101 refers to the information on the wireless communication terminal 201 retained in the connection management table, the wireless communication base station 101 can understand that the wireless communication terminal 201 is supported with the frequency channels ch.1 and ch.2, the communication can be performed pursuant to IEEE 802.11g on the frequency channel ch.1, the communication can be performed pursuant to IEEE 802.11a on the frequency channel ch.2, frequency channel ch.1 is currently used, and the communication is conducted with TKIP. In the connection management table of FIG. 33, the wireless communication base station 101 conducts communication with the wireless communication terminal 202 with CCMP (AES may be described instead of CCMP) because the wireless communication base station 101 normally ends the connection setting, including the CCMP setting.

The wireless communication terminal 201 sends the change request to change the frequency channel to the frequency channel ch.2 to the wireless communication base station 101. When the wireless communication base station 101 permits the channel change request to the frequency channel ch.2, the wireless communication base station 101 and the wireless communication terminal 201 conduct the communication on the frequency channel ch.2 using TKIP, which is the encryption system set on the frequency channel ch.1, after the wireless communication terminal 201 is changed to the frequency channel ch.2. Only the item of "supported channel" of FIG. 33 is changed from the frequency channel ch.1 to the frequency channel ch.2, and the information on TKIP is retained. In FIG. 33, only the name of the encryption system is retained in the connection management table. However, when the information having resolution higher than the name of the encryption system is required in using the encryption system such that encryption keys are distinguished in each wireless communication terminal even in the same encryption system, obviously the information is included in the connection management table.

(Effect)

Thus, the wireless communication base station manages the security information and the identifier of the wireless communication terminal, and the same security information is used on the changed frequency channel when the wireless communication base station permits the change request to another frequency channel. Therefore, the communication can be started between the wireless communication base station and the wireless communication terminal without setting the security again on the changed frequency channel.

Tenth Embodiment

In a tenth embodiment, the description will be made centering on an aspect differing from the ninth embodiment. The tenth embodiment differs from the ninth embodiment in the following point. That is, while the communication is conducted using the same encryption system after the channel change of the wireless communication terminal in the ninth embodiment, the wireless communication base station confirms whether or not the wireless communication terminal is supported with the encryption system on the frequency channel of the change request in receiving the channel change request from the wireless communication terminal, the wireless communication base station permits the channel change when the wireless communication terminal is supported with the encryption system, and the wireless communication base station rejects the channel change when the wireless communication terminal is not supported with the encryption system.

For example, in the configuration of FIG. 6, the wireless communication base station 101 is supported with TKIP and CCMP on the frequency channel ch.1. However, the wireless communication base station 101 permits only the CCMP communication on the frequency channel ch.2 because the communication having a higher security intensity is permitted. The security policy, which depends on the frequency channel, may be stored in the MAC layer management unit 30 of FIG. 3 in the form of the security policy management table, or the information can be stored in an external memory, and the MAC layer management unit 30 may access the external memory to confirm and refer to the information if needed. In such cases, when the wireless communication terminal 201 sends the channel change request to the frequency channel ch.2 to the wireless communication base station 101 while the connection management table is in the state of FIG. 33, the wireless communication base station 101 refers to FIG. 33 to confirm that TKIP is the current encryption system with the wireless communication terminal 201, and the wireless communication base station 101 rejects the channel change request to the frequency channel ch.2 from the wireless communication terminal 201. In transmitting the rejection of the channel change request as the frame to the wireless communication terminal 201, a reason that the security request is not satisfied may be included in the frame. Usually, the channel change response frame is the management frame, and notification of both the rejection and the reason of the rejection is made by a item called status code in the management frame of the response system to the request when the notification of the rejection is made. Therefore, the management frame may be used.

When the security policy depends on the frequency channel, the security policy on another frequency channel may be announced by the beacon frame while the security policy is included as the information about the frequency channel, and the notification of the security policy on another frequency channel may be made by the probe response frame while the security policy is included as the information about the frequency channel. For example, in the above-described example, that the frequency channel ch.2 is supported with the CCMP encryption system or that the CCMP encryption system is required is inserted as the information about the frequency channel ch.2 in the beacon and probe response frames of the frequency channel ch.1. The beacon frame of FIG. 34 is sent instead of the beacon frame of FIG. 17. On the contrary, that the frequency channel ch.1 is supported with the TKIP and CCMP encryption systems may be inserted as the information about the frequency channel ch.1 in the beacon and probe response frames of the frequency channel ch.2. In the wireless communication terminal 201, as shown in FIG. 35, a item of the encryption system corresponding to each channel is provided instead of FIG. 15 to retain pieces of operation information about the frequency channels ch.1 and ch.2 of the wireless communication base station 101. When the notification of the encryption system which cannot be recognized by the wireless communication terminal 201 is made, the notification may be inserted in the information. For the notification of the security system on another frequency channel, when the wireless communication base station and the wireless communication terminal have the same recognition (by matching of a correlation table mutually referred to for the use of the encryption system), a display system such as the security level may simply be performed.

(Effect)

Thus, the wireless communication base station recognizes the usable security system of the wireless communication terminal before the wireless communication terminal makes the change request to another frequency channel, and determines whether the change request is permitted or rejected based on the usable security system when receiving the change request to another frequency channel. Therefore, the security of the wireless communication terminal can be retained on another frequency channel. In the case where the security system needed by the wireless communication base station is not satisfied, the wireless communication terminal previously recognizes the connection request of the wireless communication terminal which is known to be rejected on another frequency channel, and the frequency channel occupation created by the wasted frame exchange for the connection can be reduced. In the case where the wireless communication base station permits the wireless communication terminal to change the frequency channel to another frequency channel, the information on the security system of which the wireless communication terminal notifies the wireless communication base station can be used in the communication with the wireless communication terminal on the changed frequency channel.

The wireless communication base station notifies the wireless communication terminal of the security level needed on another frequency channel, so that the wireless communication terminal can determine whether or not the wireless communication terminal is supported with the security system of another frequency channel while the security level needed on another frequency channel can be changed.

Eleventh Embodiment

In an eleventh embodiment, the description will be made centering on an aspect differing from the tenth embodiment. The eleventh embodiment differs from the tenth embodiment in the following point. In the tenth embodiment, the wireless communication base station rejects the channel change request of the wireless communication terminal when the encryption system used before the channel change is not the encryption system needed on the frequency channel of the change request. On the other hand, in the eleventh embodiment, in the case where the encryption system used before the channel change is not the encryption system needed on the frequency channel of the change request, the wireless communication base station permits the change request when the wireless communication base station can select one of the encryption systems needed on the frequency channel of the change request in the usable encryption systems of the wireless communication terminal, and the wireless communication base station performs the setting of the selected encryption system with the wireless communication terminal before the data exchange communication is conducted on the changed frequency channel.

Therefore, it is necessary that the wireless communication terminal previously notify the wireless communication base station of plural supported encryption systems.

In the configuration of FIG. 6, when the wireless communication terminal 201 sends the connection request to the wireless communication base station 101 on the frequency channel ch.1, the wireless communication terminal 201 sends the information that the wireless communication terminal 201 is supported with TKIP and CCMP to the wireless communication base station 101 while the information is included in the capability. Thus, in the wireless communication base station 101, the connection management table for the wireless communication terminal becomes the connection management table of FIG. 36. In the connection management table of FIG. 36, a item of the supported encryption system is added instead of FIG. 33. FIG. 36 similarly shows the state in which the wireless communication terminal 202 makes the notification that CCMP is the supported encryption system of the wireless communication terminal 202.

When the wireless communication terminal 201 and the wireless communication base station 101 perform the connection setting of the communication in which TKIP is used on the frequency channel ch.1, the wireless communication terminal 201 may notify the wireless communication base station 101 that the wireless communication terminal 201 is supported with the frequency channel ch.2, that the wireless communication terminal 201 is supported with a certain communication system on the frequency channel ch.2, and that the wireless communication terminal 201 is supported with a certain encryption system except for TKIP. Alternatively, the wireless communication terminal 201 initially notifies the wireless communication base station 101 only that the wireless communication terminal 201 is supported with TKIP for the encryption system when the wireless communication terminal 201 performs the connection setting of the communication on the frequency channel ch.1, and the wireless communication terminal 201 may additionally notify the wireless communication base station 101 that the wireless communication terminal 201 is supported with the CCMP encryption system when the wireless communication terminal 201 understands that the CCMP encryption system is needed in the communication on the frequency channel ch.2 by the beacon frame or probe response frame from the wireless communication base station 101 and when the wireless communication terminal 201 determines that the notification of other supported encryption systems should be made because of the possibility of making the transition to the frequency channel ch.2.

When the wireless communication base station 101 receives the request frame to change the channel to the frequency channel ch.2 from the wireless communication terminal 201, the wireless communication base station 101 understands that only the communication with TKIP is set between the wireless communication base station 101 and the wireless communication terminal 201. However, from the connection management table of FIG. 36, the wireless communication base station 101 understands that the wireless communication terminal 201 is supported with the CCMP encryption system needed in the communication on the frequency channel ch.2. Therefore, the wireless communication base station 101 permits the channel change request, and performs the setting for stating the CCMP communication with the wireless communication terminal 201 before the data frame exchange is started on the frequency channel ch.2. In performing the setting for starting the CCMP communication, the CCMP setting request may be sent to the wireless communication terminal while the CCMP setting request is included in the channel change response frame. Here, the wireless communication terminal 201 which receives the channel change response frame sends the frame necessary for the CCMP setting with the wireless communication base station 101 on the frequency channel ch.1. Alternatively, the wireless communication terminal 201 sends the frame necessary for the CCMP setting on the frequency channel ch.2 after completing the movement to the frequency channel ch.2. The wireless communication base station 101 may send the CCMP setting request to the wireless communication terminal 201 after the wireless communication terminal 201 is moved to the frequency channel ch.2. Here, the wireless communication terminal 201 sends the frame necessary for the CCMP setting to the wireless communication base station 101 on the frequency channel ch.2.

In the eleventh embodiment, the wireless communication base station 101 sends the CCMP setting request to the wireless communication terminal 201 after receiving the channel change request frame from the wireless communication terminal 201. Alternatively, when the wireless communication base station 101 recognizes that the wireless communication terminal 201 is supported with the CCMP encryption system, because the wireless communication base station 101 needs the use of the CCMP encryption system on the frequency channel ch.2, the wireless communication base station 101 may send the CCMP setting request to the wireless communication terminal 201 before the wireless communication terminal 201 sends the channel change request frame.

In the eleventh embodiment, the wireless communication base station 101 makes the CCMP setting request to the wireless communication terminal 201, and the wireless communication terminal 201 sends the frame necessary for the CCMP setting to the wireless communication base station 101 in response to the CCMP setting request. Alternatively, the wireless communication terminal 201 may send the frame necessary for the CCMP setting to the wireless communication base station 101 to start the CCMP setting from the wireless communication terminal 201, when the wireless communication terminal 201 understands that the CCMP encryption system is needed in the communication on the frequency channel ch.2 by the beacon frame or probe response frame from the wireless communication base station 101, and when the wireless communication terminal 201 determines that the notification of other supported encryption systems should be made because of the possibility of making the transition to the frequency channel ch.2.

(Effect)

Thus, when the security system of the pre-change of the frequency channel change can be used after the frequency channel is changed, the frame exchange for the resetting for using the security system after the frequency channel change can be omitted by conducting the communication using the same security information. When the security system in which the wireless communication terminal is supported with the security system needed by the wireless communication base station exists although the security system of the pre-change of the frequency channel change cannot be used after the frequency channel is changed, the wireless communication base station performs the setting of the security system on the changed frequency channel between the wireless communication base station and the wireless communication terminal, and the wireless communication base station can retain the security needed on the changed frequency channel.

Twelfth Embodiment

In a twelfth embodiment, the description will be made centered on a point added to the first to eleventh embodiments. In the twelfth embodiment, the following point is added to the first to eleventh embodiments. That is, the wireless communication terminal notifies the wireless communication base station of the usable communication system on another frequency channel after the wireless communication terminal is connected to the wireless communication base station.

In the configuration of FIG. 6, the wireless communication terminal 201 exchanges the association frame with the wireless communication base station 101 in order to perform the setting necessary for the connection on the frequency channel ch.1, and the wireless communication terminal 201 is ready to conduct the communication on the frequency channel ch.1. In the twelfth embodiment, a management frame of a new subtype (in this case, subtype 5), which is different from the association frame, is provided to make the notification of the communication system supported with another frequency channel, and the wireless communication base station 101 is notified of the communication system with which the wireless communication terminal 201 is supported on the frequency channel ch.2 using the subtype 5. The notification of the supported communication system on the frequency channel ch.2 is already made in the association request frame, as in the above-described embodiments, and then the wireless communication terminal 201 is additionally supported with another frequency channel, for example, the frequency channel ch.3. In such cases, the notification of the communication system of the frequency channel ch.3 may be made by the management frame of the subtype 5. The management frame of the subtype 5 is a unicast frame addressed to the wireless communication base station 101. When receiving the management frame of the subtype 5, the wireless communication base station 101 replies with the ack frame similar to that of the case in which the usual unicast frame is received. The wireless communication base station 101 writes and retains the supported communication system on the frequency channel ch.2 in the item relating to the wireless communication terminal 201 of the connection management table.

The wireless communication terminal 201 notifies the wireless communication base station 101 of the supported communication system on the frequency channel ch.2 before transmitting the change request to the frequency channel ch.2 to the wireless communication base station 101.

(Effect)

Thus, after performing the connection on a certain frequency channel, the wireless communication terminal additionally makes the notification of the usable communication system on another frequency channel. A delay can be granted in order to prepare the notification frame relating to the communication system which can be used on another frequency channel by the wireless communication terminal, and the communication can continuously be conducted with no resetting after the channel change while a load is reduced during the connection setting.

Thirteenth Embodiment

In a thirteenth embodiment, the description will be made centering on an aspect added to the first to eleventh embodiments. In the thirteenth embodiment, the following point is added to the first to eleventh embodiments. That is, the wireless communication terminal notifies the wireless communication base station that the compatibility is changed for the information on the communication system which can be used on another frequency channel, and the notification of the information on the communication system is made in making the connection request.

In the configuration of FIG. 6, it is assumed that the wireless communication base station retains a connection management table of FIG. 37, and it is also assumed that the wireless communication terminal 202 performs the connection setting on the frequency channel ch.1. In the thirteenth embodiment, the description will be made using the wireless communication terminal 202. During the connection on the frequency channel ch.1, the wireless communication terminal 202 notifies the wireless communication base station 101 of the supported communication system on the frequency channel ch.2. When the supported communication system is changed on the frequency channel ch.2, the wireless communication terminal 202 notifies the wireless communication base station 101 of the changes using a management frame of a new subtype (in this case, subtype 6). For example, in the state of which the wireless communication terminal 202 notifies the wireless communication base station 101, the electric power is supplied, the sendable and receivable modulation and coding scheme is MCS=0 to 32 on the frequency channel ch.2 in IEEE 802.11n while the receivable modulation and coding scheme is MCS=33 and 34 on the frequency channel ch.2 in IEEE 802.11n such that the wireless communication terminal 202 corresponds to the fields of the connection management table of FIG. 37. Then, the electric power supply is eliminated, and the wireless communication terminal 202 determines that the wireless communication terminal 202 does not correspond to the receivable modulation and coding scheme of MCS=33 and 34 which is a low power consumption measure. The wireless communication terminal 202 notifies the wireless communication base station 101 that the wireless communication terminal 202 does not correspond to the receivable modulation and coding scheme of MCS=33 and 34 using the subtype 6. The wireless communication base station 101 receives contents of the subtype 6 to update the information on the proper portion relating to the wireless communication terminal 202 in the connection management table. In the wireless communication base station 101, the connection management table is updated as shown in FIG. 38. For the system in which the wireless communication terminal 202 notifies the wireless communication base station 101 of the changes, because only a portion of IEEE 802.11n is changed, the notification of the changed portion that the receivable modulation and coding scheme is eliminated may be made, or the notification of all the supported communication systems (the sendable and receivable modulation and coding scheme is MCS=0 to 32 and the receivable modulation and coding scheme is MCS=void) relating to the frequency channel ch.2 may be made. When the plural frequency channels have some change in common, the notification of the frequency channel (in this case, frequency channels ch.1 and ch.2) influenced by the change and the communication system may be made, or the notification of the change of the communication system may be made while the frequency channel is omitted. In the case where the notification of the change of the communication system is made while the frequency channel is omitted, the wireless communication terminal 202 notifies the wireless communication base station 101 of contents relating to MCS, so that the wireless communication base station 101 understands that the wireless communication terminal 202 is supported with IEEE 802.11n and therefore it is only necessary to update the retained contents on the frequency channel ch.2.

When the supported communication system on the frequency channel ch.2 has some change, the wireless communication terminal 202 notifies the wireless communication base station 101 before transmitting the change request to the frequency channel ch.2 to the wireless communication base station 101.

(Effect)

Thus, when the communication system which can be used by the wireless communication terminal is changed, the wireless communication terminal re-notifies the wireless communication base station of the information. Therefore, the wireless communication terminal and the wireless communication base station can conduct the communication with each other by a communication system appropriate to the communication state of the wireless communication terminal.

Fourteenth Embodiment

In a fourteenth embodiment, the description will be made centering on an aspect added to the first to thirteenth embodiments. In the fourteenth embodiment, the following point is added to the first to thirteenth embodiments. That is, the fourteenth embodiment includes an operation in the case where the wireless communication terminal is connected to the wireless communication base station by which the information on the wireless communication terminal connected on plural frequency channels cannot be shared and managed.

In the configuration of FIG. 39, the wireless communication terminal 201 can conduct the communication on both the frequency channel ch.1 and the frequency channel ch.2. The wireless communication base station 102 may simultaneously conduct the communication on the frequency channel ch.2, or the wireless communication base station 102 may simultaneously conduct the communication only on one frequency channel (in this case, frequency channel ch.1). Only the information about the frequency channel (for example, in this case, frequency channel ch.1) is inserted in the frame (such as the beacon frame and the probe response frame) sent on the frequency channel (for example, in this case, frequency channel ch.1). Even if the wireless communication terminal 201 sends the information necessary to conduct the communication on another frequency channel (in this case, frequency channel ch.2), the wireless communication base station 102 retains the information, and the wireless communication base station 102 does not use the information when conducting the communication with the wireless communication terminal 201 on another frequency channel (ch.2). On the other hand, although the wireless communication base station 103 is similar to the wireless communication base station 102, the frequency channel ch.1 in the wireless communication base station 102 is changed to the frequency channel ch.2.

In such conditions, the wireless communication terminal 201 is connected to the wireless communication base station 102 on the frequency channel ch.1 to conduct the communication with the wireless communication base station 102. It is assumed that the wireless communication terminal 201 makes a request to change the frequency channel to the frequency channel ch.2. The channel change request is made in consideration of the wireless communication status or the transmitting traffic requirement of the wireless communication terminal 201 from the result in which SME collects the information through the PHY layer and the MAC layer, and the MAC layer management unit 30 is notified of the channel change request.

Here, the wireless communication terminal 201 recognizes that the wireless communication base station 102 cannot retain and use the communication information used on the frequency channel ch.2 of the wireless communication terminal 201 even if the wireless communication base station 102 makes the change request to the frequency channel ch.2. For example, in the case where the wireless communication base station exerts a function of making the announcement and notification of frequency channel information which is different from the information retaining capability between the frequency channels of the wireless communication terminal, the wireless communication base station 102 can recognize that the wireless communication base station 102 cannot retain and use the communication information used on the frequency channel ch.2 of the wireless communication terminal 201, because the wireless communication base station 102 does not perform the transmission while the information about the frequency channel ch.2 is included in the beacon frame/probe response frame on the frequency channel ch.1. In the case where the wireless communication base station has the information retaining capability between the frequency channels of the wireless communication terminal, the wireless communication base station 102 can recognize that the wireless communication base station 102 cannot retain and use the communication information used on the frequency channel ch.2 of the wireless communication terminal 201, when the notification of the information is made as the capability of the wireless communication base station by the beacon frame/probe response frame.

The wireless communication terminal 201 switches the frequency channel to the frequency channel ch.2, and searches for the operated wireless communication base station by the scan. Here, the wireless communication terminal 201 may send a frame (in the IEEE 802.11 wireless LAN standard, the management frame is called a disassociation frame) for notifying the wireless communication base station 102 of the disconnection. The wireless communication terminal 201 sends the frame to the wireless communication base station 102, so that the wireless communication base station 101 can suppress the retaining information amount by deleting the information on the wireless communication terminal 201 from the connection management table. When detecting that the wireless communication base station 103 is operated on the frequency channel ch.2, the wireless communication terminal 201 makes the connection request to the wireless communication base station 103. When the wireless communication base station 103 permits the connection, the wireless communication terminal 201 starts the communication with the wireless communication base station 103 on the frequency channel ch.2. When detecting the plural wireless communication base stations on the frequency channel ch.2, the wireless communication terminal 201 collects the pieces of information on the plural wireless communication base stations using the MAC layer management unit 30, the wireless terminal entity selects the wireless communication base station to which the connection request is sent according to the collected pieces of information, and the connection setting operation is started through the MAC layer management unit 30. For example, it is assumed that the wireless communication base station 102 is also operated on the frequency channel ch.2 (terminal management is not shared by the frequency channel ch.1) and it is assumed that the wireless communication terminal 201 detects the wireless communication base station 102 and the wireless communication base station 103 on the frequency channel ch.2. Here, the wireless communication terminal 201 selects the wireless communication base station to which the connection request is sent in consideration of the frame receiving conditions (such as reception electric power and interference amount) from each wireless communication base station and the capability of each wireless communication base station. In transmitting the connection request, the wireless communication terminal 201 notifies the wireless communication base station of the capability necessary to conduct the communication on the frequency channel ch.2. According to the embodiment, examples of the notification of the capability include the supported communication standard, the modulation and coding scheme, and the encryption system. The wireless communication terminal 201 may send the connection request in the form of a reconnection request when transmitting the connection request to the wireless communication base station 103 without notifying the wireless communication base station 102 of the disconnection (in the IEEE 802.11 wireless LAN standard, the case in which the disassociation frame is not sent). In the IEEE 802.11 wireless LAN standard, the connection request in the form of a reconnection request becomes a management frame called reassociation request. The information which is basically similar to that on the association request frame is sent in the reassociation request frame. Additionally, notification of the previously connected wireless communication base station (in this case, the wireless communication base station 102) is made in the reassociation request frame. When the wireless communication base station 103 receives the reassociation request frame from the wireless communication terminal 201, and when the reassociation request frame shows that the previously connected wireless communication base station is the wireless communication base station 102, cooperation can be made between the wireless communication base stations such that the wireless communication base station 103 notifies the wireless communication base station 102 that the wireless communication terminal 201 is connected to the wireless communication base station 103, and such that the data addressed to the wireless communication terminal 201 which is sent to the wireless communication base station 102 is transferred to the wireless communication base station 103. In the reassociation process, similarly to the association process, the wireless communication base station sends the response management frame (the reassociation response frame to the reassociation request frame).

When the wireless communication terminal 201 can detect on the frequency channel ch.1 the wireless communication base station which is operated on the frequency channel ch.2, desirably the wireless communication terminal 201 is connected to the wireless communication base station on the frequency channel ch.1 in consideration of the generation of the channel change request to the frequency channel ch.2.

(Effect)

Thus, the wireless communication terminal is connected to the wireless communication base station with which the communication can be conducted on a single frequency channel while connected to the wireless communication base station with which the communication can be conducted simultaneously on at least two frequency channels, so that options of the communication destination can be increased. Additionally, in the case where the transfer request to the second frequency channel is made even if the wireless communication terminal is connected to the wireless communication base station with which the communication can be conducted on a single frequency channel, the wireless communication terminal notifies the wireless communication base station of the usable communication system on the second frequency channel to make the connection request when searching for and detecting the wireless communication base station which can be connected on the second frequency channel, and can be connected to the wireless communication base station which is operated on the second frequency channel.

Fifteenth Embodiment

In a fifteenth embodiment, the description will be made centering on an aspect to the first to thirteenth embodiments. In the fifteenth embodiment, the following point is added to the first to thirteenth embodiments. That is, the fifteenth embodiment is an operation of the wireless communication terminal when the wireless communication base station rejects the channel change request sent from the wireless communication terminal.

In the configuration of FIG. 6, the wireless communication terminal 201 is connected and conducts the communication with the wireless communication base station 101 on the frequency channel ch.1, and sends the channel change request to the frequency channel ch.2 to the wireless communication base station 101. The wireless communication base station 101 receives the channel change request, and rejects the channel change request because the wireless communication terminal 201 is not supported with the modulation and coding scheme needed on the frequency channel ch.2, because the wireless communication terminal 201 is not supported with the encryption system needed on the frequency channel ch.2, or because the wireless communication terminal 201 cannot support the communication on the frequency channel ch.2 (for example, the wireless communication base station 101 is already connected to many wireless communication terminals). When receiving the channel change response of the rejection from the wireless communication base station 101, the wireless communication terminal 201 switches the frequency channel to the frequency channel ch.2 to scanning whether or not another wireless communication base station is operated on the frequency channel ch.2. Similarly to the fourteenth embodiment, the wireless communication terminal 201 may send the frame (in the IEEE 802.11 wireless LAN standard, the disassociation frame) notifying the wireless communication base station 101 of the disconnection. When only the wireless communication base station 101 is detected on the frequency channel ch.2, the wireless communication terminal 201 can make the connection request to the wireless communication base station 101 again. However, desirably the wireless communication terminal 201 detects and selects another wireless communication base station because the wireless communication terminal 201 can expect that the connection request is rejected. In the case where the wireless communication terminal 201 detects another wireless communication base station except for the wireless communication base station 101, (after the wireless communication terminal 201 determines that the wireless communication base station is supported with the communication system needed by the wireless communication terminal 201 on the frequency channel ch.2), the wireless communication terminal 201 makes the connection request to the wireless communication base station. Similarly to the fourteenth embodiment, the wireless communication terminal 201 may send the connection request in the form of a reconnection request (in the IEEE 802.11 wireless LAN standard, a reassociation request frame) when transmitting the connection request to the newly connected wireless communication base station without notifying the wireless communication base station 101 of the disconnection (in the IEEE 802.11 wireless LAN standard, the case in which the disassociation frame is not sent).

In the case where the communication cannot be conducted on the frequency channel ch.2 because only the wireless communication base station 101 can be detected as the wireless communication base station suitable for the communication on the frequency channel ch.2 or because the wireless communication base station 101 rejects the connection request even if the wireless communication terminal 201 makes the connection request to the wireless communication base station 101 on the frequency channel ch.2 again, the wireless communication terminal 201 reviews the channel change request, and returns to the communication on the frequency channel ch.1 or tries the connection on another frequency channel except for the frequency channel ch.2. For example, the wireless communication terminal 201 sends the channel change request to the frequency channel ch.3 to the wireless communication base station 101, when the wireless communication terminal 201 recognizes that the wireless communication base station 101 is operated on the frequency channel ch.3 in addition to the frequency channels ch.1 and ch.2.

(Effect)

While the wireless communication terminal is connected to the wireless communication base station with which the communication can be simultaneously conducted on at least two frequency channels, the wireless communication terminal searches for another wireless communication base station which can be connected on the second frequency channel when the wireless communication base station rejects the channel change request to the second channel. When detecting another wireless communication base station, the wireless communication terminal notifies another wireless communication base station of the usable communication system on the second frequency channel to make the connection request, and can be connected to another wireless communication base station operated on the second frequency channel.

Therefore, options of the communicable wireless communication base station can be increased.

Sixteenth Embodiment

In a sixteenth embodiment, the description will be made centered on an aspect added to the first to thirteenth embodiments. In the sixteenth embodiment, the following point is added to the first to thirteenth embodiments. That is, the sixteenth embodiment is an operation of the wireless communication terminal when the wireless communication terminal makes a change request to a frequency channel which is not supported by the wireless communication base station.

In the configuration of FIG. 6, it is assumed that the wireless communication terminal 201 is supported with the frequency channels ch.1, ch.2, and ch.3 while the wireless communication base station 101 can simultaneously conduct the communication on the frequency channels ch.1 and ch.2. The assumption includes not only the case in which wireless communication terminal 201 is supported with all the frequency channels with which the wireless communication base station 101 compatible, and other frequency channels, but also the case in which the frequency channels partially overlap such that the wireless communication base station 101 is supported with the frequency channels ch.1 and ch.2 while the wireless communication terminal 201 is supported with the frequency channels ch.1 and ch.3.

In the fifteenth embodiment, the wireless communication terminal 201 conducts the communication with the wireless communication base station 101 on the frequency channel ch.1, and the frequency channel is changed to the frequency channel ch.2 with which both the wireless communication base station 101 and the wireless communication terminal 201 are compatible. On the other hand, in the sixteenth embodiment, the wireless communication terminal 201 changes the frequency channel to the frequency channel ch.3 of which the wireless communication base station 101 does not make the announcement or notification as the simultaneously communicable frequency channel. As described above, SME makes the determination of the change to the frequency channel ch.3 based on the wireless communication situation or the traffic request. Because the wireless communication base station 101 does not include the frequency channel ch.3 as the simultaneously communicable frequency channel, even if the wireless communication terminal 201 changes the frequency channel to the frequency channel ch.3, the wireless communication terminal 201 understands that the wireless communication base station 101 has no guarantee to be able to start the communication on the frequency channel ch.3 without performing the resetting while retaining the information on the connection with the wireless communication terminal 201. Therefore, the wireless communication terminal 201 switches the frequency channel to the frequency channel ch.3 to scanning whether or not another wireless communication base station is operated on the frequency channel ch.3. Before the wireless communication terminal 201 scans whether or not another wireless communication base station is operated on the frequency channel ch.3, the wireless communication terminal 201 assumes that the wireless communication terminal 201 is not reconnected to the wireless communication base station 101 on the frequency channel ch.3, and may send the frame (in the IEEE 802.11 wireless LAN standard, disassociation frame) notifying the wireless communication base station 101 of the disconnection, as in the fifteenth embodiment. When the wireless communication base station is detected (when the wireless communication terminal 201 determines that the wireless communication base station is supported with the communication system needed by the wireless communication terminal 201 on the frequency channel ch.3), the wireless communication terminal 201 makes the connection request to the wireless communication base station. Similarly to the fifteenth embodiment, the wireless communication terminal 201 may send the connection request in the form of a reconnection request (in the IEEE 802.11 wireless LAN standard, the reassociation request frame), when making the connection request to the new wireless communication base station without notifying the wireless communication base station 101 of the disconnection (in the IEEE 802.11 wireless LAN standard, the case in which the disassociation frame is not sent). When the wireless communication base station 101 can be detected on the frequency channel ch.3 (even if the announcement and notification of the frequency channels ch.1 and ch.2 are not made as the simultaneously supported frequency channel), and when the wireless communication base station 101 is supported with the communication system satisfying the need during the use of the frequency channel ch.3 of the wireless communication terminal 201, the wireless communication terminal 201 makes the connection request to the wireless communication base station 101 again. Here, the wireless communication terminal 201 sends the association frame to the wireless communication base station 101 when the disassociation frame has already been sent. The wireless communication terminal 201 sends the association frame or the reassociation frame to the wireless communication base station 101 when the disassociation frame is not sent.

In the case where the communication cannot be conducted on the frequency channel ch.3 because the wireless communication base station suitable for the communication on the frequency channel ch.3 cannot be detected or because the wireless communication base station rejects the connection request even if the wireless communication terminal makes the connection request to the wireless communication base station on the frequency channel ch.3, the wireless communication terminal reviews the channel change request, and returns to the communication on the frequency channel ch.1 or tries the connection on another frequency channel except for the frequency channel ch.3. For example, when the wireless communication terminal 201 is also supported with the frequency channel ch.4, the wireless communication terminal 201 scans whether or not the appropriate wireless communication base station exists on the frequency channel ch.4.

(Effect)

While the wireless communication terminal is connected to the wireless communication base station with which the communication can be simultaneously conducted on at least two frequency channels, the wireless communication terminal searches for another wireless communication base station which can be connected on the third frequency channel when the channel change request to the third frequency channel with which the same wireless communication station is not supported is made. When detecting another wireless communication base station, the wireless communication terminal notifies another wireless communication base station of the usable communication system on the third frequency channel to make the connection request, and the wireless communication terminal can be connected to another wireless communication base station operated on the third frequency channel. Therefore, options of the communicable wireless communication base station can be increased.

Seventeenth Embodiment

In a seventeenth embodiment, the description will be made centered on an aspect that differs with the first to thirteenth embodiments. The seventeenth embodiment differs from the first to thirteenth embodiments in that the wireless communication terminal notifies the wireless communication base station of the information about another frequency channel during the connection request even if the wireless communication base station does not make the announcement and notification of the information about the communication system on another frequency channel.

In the configuration of FIG. 6, the wireless communication base station 101 of the seventeenth embodiment does not insert the communication system used on the frequency channel ch.2 in the beacon frame sent on the frequency channel ch.1, and the communication system used on the frequency channel ch.2 is not inserted in the probe response frame sent by the wireless communication base station 101 when the wireless communication terminal 201 sends the probe request frame to the wireless communication base station 101 (either the group address frame or the unicast frame) on the frequency channel ch.1.

Here, in the wireless communication base station 101, the identifier for making the notification that the wireless communication base station 101 is sendable and receivable on another frequency channel or that the information on the connection with the wireless communication terminal and the connection on another frequency channel is commonly managed may be inserted in the beacon frame or the probe response frame. For example, the MCID of the sixth embodiment can be used in this application.

On the other hand, the wireless communication terminal 201 notifies the wireless communication base station 101 of the communication system with which the wireless communication terminal 201 is supported on the frequency channel ch.2 when making the connection request to the wireless communication base station 101 on the frequency channel ch.1. Here, the wireless communication terminal 201 determines that the wireless communication base station 101 is not the legacy wireless communication base station but the wireless communication base station of the seventeenth embodiment by inserting an MCID in the beacon frame or the probe response frame, and the wireless communication terminal 201 may notify the wireless communication base station 101 of the supported communication system on the frequency channel ch.2.

When the wireless communication base station 101 detects that the information about the communication system with which the wireless communication terminal 201 is supported on the frequency channel ch.2 is included in the association request frame from the wireless communication terminal 201, the wireless communication base station 101 registers the information on the wireless communication terminal 201 in the connection management table, and notifies the wireless communication terminal 201 of the successful connection using the association response frame. The notification of the successful connection is inserted in a status code. A code indicating the permitted association request including another supported frequency channel may be used as the status code instead of the code simply indicating that the association is successful. The wireless communication base station 101 may insert the communication system with which the wireless communication base station 101 is supported on the frequency channel ch.2 in the association response frame. Therefore, because the association response frame includes the status code and the information about the frequency channel ch.2 as described below, the wireless communication terminal 201 can confirm that the wireless communication base station 101 accepts the supported notification on the frequency channel ch.2.

(Effect)

Although the wireless communication base station does not make the announcement and notification of the information about another frequency channel, the wireless communication terminal which is supported with the plural frequency channels notifies the wireless communication base station which can simultaneously send and receive on the plural frequency channels of the information about another frequency channel with which the wireless communication terminal is compatible, and the wireless communication base station commonly manages the information across the plural frequency channels. Therefore, the connection can be maintained even if the wireless communication terminal is transferred to another frequency channel.

Eighteenth Embodiment

In an eighteenth embodiment, the description will be made centering on an aspect added to the sixteenth and seventeenth embodiments. In the eighteenth embodiment, the following point is added to the sixteenth and seventeenth embodiments. That is, in the case where the wireless communication terminal changes the frequency channel to establish the connection with the wireless communication base station again, the information on the wireless communication terminal is utilized when the information on the wireless communication terminal remains in the connection management table.

In the configuration of FIG. 6, in the case where the wireless communication terminal 201 changes the frequency channel ch.1 to the frequency channel ch.2 to establish the connection with the wireless communication base station 101 without making the request to change the frequency channel ch.1 to the frequency channel ch.2 to the wireless communication base station 101, when the information about the frequency channel ch.2 of the wireless communication terminal 201 is retained in the connection management table of the wireless communication base station 101, the wireless communication base station 101 notifies the wireless communication terminal 201 that the wireless communication base station 101 has the information about the frequency channel ch.2 of the wireless communication terminal 201 at the stage in which the wireless communication terminal 201 is transferred to the frequency channel ch.2 to try the connection with the wireless communication base station 101. For example, the wireless communication terminal 201 performs the scanning on the frequency channel ch.2 again, adjusts a timer of itself to a timer of the wireless communication base station 101 based on timer information (in the IEEE 802.11 wireless LAN standard, a item called time stamp is used) in the beacon frame or probe response frame sent by the wireless communication base station 101 (in the IEEE 802.11 wireless LAN standard, join operation), and is reconnected to the wireless communication base station 101 on the frequency channel ch.2 through the authentication process and the association process. The wireless communication base station 101 understands that the wireless communication terminal 201 is being connected to the wireless communication base station 101 in receiving the probe request frame through the scanning process or in the authentication process, and notifies the wireless communication terminal 201 that the wireless communication base station 101 retains the information on the communication system with which the wireless communication terminal 201 is supported on the frequency channel ch.2. The notification that the information is retained may be made using the probe response frame or a management frame called subtype 7. Therefore, the wireless communication terminal 201 recognizes that the wireless communication base station

101 already has the information on the communication system with which the wireless communication terminal 201 is supported on the frequency channel ch.2, so that a simple association process can be realized while the supported communication system on the frequency channel ch.2 is omitted. Such a simple process may not be performed using the association request frame and the association response frame, and may instead be performed while a management frame called a management frame called subtype 8 and a management frame subtype 9 which is the response frame of the subtype 8 are provided. Similarly to the ninth embodiment, the encryption system which is already set on the frequency channel ch.1 is also used on the frequency channel ch.2, whereby the setting of the encryption system may be omitted on the frequency channel ch.2.

(Effect)

When the wireless communication base station retains the information on the plural supported frequency channels of the wireless communication terminal, even if the wireless communication terminal does not previously notify the wireless communication base station that the wireless communication terminal is transferred among the plural frequency channels with which the wireless communication base station is compatible, the wireless communication base station can conduct the communication with the wireless communication terminal using the information which is already retained in establishing the connection with the wireless communication terminal on another supported frequency channel, and the connection setting can be simplified on the transferred frequency channel.

Nineteenth Embodiment

In a nineteenth embodiment, the description will be made centered on an aspect differing with the first to thirteenth embodiments. The nineteenth embodiment differs from the first to thirteenth embodiments in that the announcement and notification of the communication system with which the wireless communication base station and the wireless communication terminal are supported are made by the PHY system.

In the configuration of FIG. 6, it is assumed that the wireless communication base station 101 and the wireless communication terminals 201 and 202 are operated pursuant to the IEEE 802.11 wireless LAN standard. For example, OFDM (Orthogonal Frequency Division Multiplexing) is used in IEEE 802.11a, DSSS (Direct Sequence Spread Spectrum) and CCK (Complementary Code Keying) are used in IEEE 802.11b, and OFDM (called ERP-OFDM in IEEE 802.11g, ERP is an abbreviated form of Extended Rate PHY conforming to Clause 19, that is, an extended rate of the PHY layer pursuant to the clause 19 of the IEEE 802.11 standard) and an ERP-PBCC (Packet Binary Convolutional Code) mode and a DSSS-OFDM mode as options are used in IEEE 802.11g. In the nineteenth embodiment, the announcement and notification are made using the above-described systems. For example, the announcement and notification are made using OFDM instead of IEEE 802.11a, and using DSSS instead of IEEE 802.11b. It may be assumed that the nineteenth embodiment is used based on the IEEE 802.11 wireless LAN standard. Alternatively, the wireless communication terminal (including the wireless communication base station) may be notified of the IEEE 802.11 wireless LAN by a MAC frame format of IEEE 802.11 at a necessary or common PHY rate, or may implicitly be notified from the MAC frame format of IEEE 802.11 at the necessary or common PHY rate.

The wireless communication base station or wireless communication terminal which receives the announcement and notification by the PHY system can recognize the communication standard from the frequency channel included in contents of the announcement and notification. For example, when the wireless communication base station 101 notifies the wireless communication terminal 201 that another supported frequency channel is 2.4 GHz bandwidth in the beacon frame sent in the 5 GHz bandwidth and OFDM is the supported PHY system, the wireless communication terminal 201 located in the 5 GHz bandwidth can recognize that the use of OFDM in the 2.4 GHz bandwidth is supported with ERP-OFDM of IEEE 802.11g. Similarly, when the wireless communication terminal 201 notifies the wireless communication base station 101 of the supported information about another frequency channel using the association request frame, the wireless communication base station 101 can recognize the information.

(Effect)

The announcement and notification are made by the PHY system, so that the information similar to that of the communication standard system can be imparted from the information about the frequency channel corresponding to the PHY system which can be utilized across the plural frequency channels.

[Additional Statement]

(1) In accordance with a first aspect of the embodiments, a wireless communication base station which can simultaneously conduct communication on at least two frequency channels is characterized in that a notification of an identifier of a second frequency channel and a communication system is made on a first frequency channel, the second frequency channel being in a wireless packet receivable state except for the first frequency channel, the communication system being used on the second frequency channel, a communication system is retained in a connection management table along with an identifier of a wireless communication terminal and an identifier of a frequency channel, the communication system being able to be used by the wireless communication terminal, the wireless communication terminal making a notification of the communication system when connection of the wireless communication terminal is permitted on the first frequency channel, and the communication is conducted with the wireless communication terminal on the second frequency channel using the communication system when a request from the wireless communication terminal to change the first frequency channel to the second frequency channel is permitted, the communication system being able to be used by the wireless communication terminal on the connection management table from the identifier of the wireless communication terminal in the communication systems used on the second frequency channel.

(Effect of Additional Statement (1))

The notification of the communication system used on the second frequency channel is made on the first frequency channel, so that the wireless communication terminal which performs the transmission and reception on the first frequency channel can recognize the communication system which is used on the second frequency channel by the wireless communication base station. Additionally, the communication system which can be used by the wireless communication terminal whose connection is permitted is retained along with the identifier of the wireless communication terminal and the identifier of the frequency channel, so that the wireless communication terminal can be moved between the frequency channels supported by the wireless communication base station without tentatively terminating the connection with the wireless communication terminal.

(1-1) In accordance with a second aspect of the embodiments, a wireless communication base station which can simultaneously conduct communication on at least two frequency channels is characterized in that a notification of an identifier of a second frequency channel and a communication system is made on a first frequency channel, the second frequency channel being in a wireless packet receivable state except for the first frequency channel, the communication system being used on the second frequency channel, a communication system is retained in a connection management table along with an identifier of a wireless communication terminal and an identifier of a frequency channel, the communication system being able to be used on the first frequency channel by the wireless communication terminal, the wireless communication terminal making a notification of the communication system when connection of the wireless communication terminal is permitted on the first frequency channel, pieces of information on the identifier of the second frequency channel and the communication system which can be used on the second frequency channel of the wireless communication terminal are added to the connection management table while correlated with the identifier of the wireless communication terminal when a notification of the communication system which can be used on the second frequency channel is received from the wireless communication terminal, and the communication is conducted with the wireless communication terminal on the second frequency channel using the communication system when a request from the wireless communication terminal to change the first frequency channel to the second frequency channel is permitted, the communication system being able to be used by the wireless communication terminal on the connection management table from the identifier of the wireless communication terminal in the communication systems used on the second frequency channel.

(Effect of Additional Statement (1-1))

The notification of the communication system which can be used on the second frequency channel is additionally made on the first frequency channel after the connection. Therefore, the effects similar to those of the first aspect of the embodiments can be obtained, that is, a delay can be granted in order to prepare a notification frame relating to the communication system which can be used on the second frequency channel by the wireless communication terminal, and the communication can continuously be conducted with no re-setting after the channel change while a load is reduced during a connection setting.

(1-2) In accordance with a third aspect of the embodiments, a wireless communication base station is the wireless communication base station described in the additional statement (1) or (1-1), and is characterized in that the wireless communication base station updates the information on the supported connection management table when receiving a renotification of the usable communication system or a renotification of the usable frequency channel and the usable communication system from the wireless communication terminal whose connection is permitted.

(Effect of Additional Statement (1-2))

The information on the connection management table is updated by receiving the renotification of the usable communication system from the wireless communication terminal, so that the communication can be conducted by the appropriate communication system which is supported with the communication state of the wireless communication terminal.

(1-3-1) In accordance with a fourth aspect of the embodiments, a wireless communication base station is the wireless communication base station described in the additional statement (1), (1-1), or (1-2), and is characterized in that the communication system is expressed by the type of communication standard.

(Effect of Additional Statement (1-3-1))

The notification of the type of the communication standard used on the second frequency channel is made on the first frequency channel, so that the wireless terminal which performs the transmission and reception on the first frequency channel can recognize the type of the communication standard which is used on the second frequency channel by the wireless communication base station. Additionally, the type of the communication standard which can be used by the wireless communication terminal whose connection is permitted is retained along with the identifier of the wireless communication terminal and the identifier of the frequency channel, so that the wireless communication terminal can be moved between the frequency channels supported by the wireless communication base station without tentatively terminating the connection with the wireless communication terminal.

(1-3-2) In accordance with a fifth aspect of the embodiments, a wireless communication base station is the wireless communication base station described in the additional statement (1-3-1), and is characterized in that extended systems in the same communication standard are distinguished from each other in the type of the communication standard.

(Effect of Additional Statement (1-3-2))

The notification of the type of the extended system in the same communication standard used on the second frequency channel is made on the first frequency channel, so that the wireless terminal which performs the transmission and reception on the first frequency channel can recognize the type of the extended system in the same communication standard which is used on the second frequency channel by the wireless communication base station. Additionally, the type of the extended system in the same communication standard which can be used by the wireless communication terminal whose connection is permitted is retained along with the identifier of the wireless communication terminal and the identifier of the frequency channel, so that the wireless communication terminal can be moved between the frequency channels supported by the wireless communication base station without tentatively terminating the connection with the wireless communication terminal.

(2) In accordance with a sixth aspect of the embodiments, a wireless communication base station which can simultaneously conduct communication on at least two frequency channels is characterized in that plural modulation and coding schemes are used in the frequency channels, a notification of an identifier of a second frequency channel and a modulation and coding scheme is made on a first frequency channel, the second frequency channel being in a wireless packet receivable state except for the first frequency channel, the modulation and coding scheme being used on the second frequency channel, a modulation and coding scheme is retained in the connection management table along with the identifier of the wireless communication terminal and the identifier of the frequency channel, the modulation and coding scheme being able to be used by the wireless communication terminal, the wireless communication terminal making a notification of the modulation and coding scheme when the connection request from the wireless communication terminal is received and permitted on the first frequency channel, a determination as to whether or not the modulation and coding scheme which can be used by the wireless communication terminal on the connection management table can be used on the second frequency channel is made from the identifier of the wireless communication terminal when receiving the request to change the first frequency channel to the second frequency channel from the wireless communication terminal, the identifier of the frequency channel is updated to the identifier of the second frequency channel to retain the updated identifier of the second frequency channel when the determination that the modulation and coding scheme can be used on the second frequency channel is made to permit the use of the modulation and coding scheme, and the communication is conducted with the wireless communication terminal on the second frequency channel using the modulation and coding scheme, the modulation and coding scheme being able to be used by the wireless communication terminal on the connection management table from the identifier of the wireless communication terminal in the modulation and coding schemes used on the second frequency channel.

(Effect of Additional Statement (2))

The notification of the modulation coding communication system of the second frequency channel is made on the first frequency channel of the two frequency channels in which plural modulation and coding schemes are used, so that the wireless communication terminal which performs the transmission and reception on the first frequency channel can recognize the modulation and coding scheme which is used on the second frequency channel by the wireless communication base station. Additionally, the modulation and coding scheme which can be used by the wireless communication terminal whose connection is permitted is retained along with the identifier of the wireless communication terminal and the identifier of the frequency channel. Therefore, the determination as to whether or not the modulation and coding scheme which can be used by the wireless communication terminal can be used on the second frequency channel can be made when the request to change the first frequency channel to the second frequency channel is received from the wireless communication terminal, and the communication with the wireless communication terminal can be assured on the second frequency channel when the determination that the modulation and coding scheme can be used on the second frequency channel is made to permit the use of the modulation and coding scheme. On such basis, the wireless communication terminal can be moved between the frequency channels supported by the wireless communication base station without tentatively terminating the connection with wireless communication terminal.

(2-1) In accordance with a seventh aspect of the embodiments, a wireless communication base station which can simultaneously conduct communication on at least two frequency channels is characterized in that plural modulation and coding schemes are used in the frequency channels, a notification of an identifier of a second frequency channel and a modulation and coding scheme is made on a first frequency channel, the second frequency channel being in a wireless packet receivable state except for the first frequency channel, the modulation and coding scheme being used on the second frequency channel, a modulation and coding scheme is retained in the connection management table along with the identifier of the wireless communication terminal and the identifier of the frequency channel, the modulation and coding scheme being able to be used by the wireless communication terminal on the first frequency channel, the wireless communication terminal making a notification of the modulation and coding scheme when the connection request from the wireless communication terminal is received and permitted on the first frequency channel, pieces of information on the identifier of the second frequency channel and the modulation and coding scheme which can be used on the second frequency channel of the wireless communication terminal are added to the connection management table while correlated with the identifier of the wireless communication terminal when a notification of the modulation and coding scheme which can be used on the second frequency channel is received from the wireless communication terminal, a determination as to whether or not the modulation and coding scheme which can be used by the wireless communication terminal on the connection management table can be used on the second frequency channel is made from the identifier of the wireless communication terminal when a request to change the first frequency channel to the second frequency channel is received from the wireless communication terminal, and the communication is conducted with the wireless communication terminal on the second frequency channel using the modulation and coding scheme when the determination that the modulation and coding scheme can be used on the second frequency channel is made to permit the use of the modulation and coding scheme, the modulation and coding scheme being able to be used by the wireless communication terminal on the connection management table from the identifier of the wireless communication terminal in the modulation and coding schemes used on the second frequency channel.

(Effect of Additional Statement (2-1))

The notification of the modulation and coding scheme which can be used on the second frequency channel is additionally made on the first frequency channel after the setting. Therefore, the effects similar to those of the sixth aspect of the embodiments can be obtained, that is, a delay can be granted in order to prepare a notification frame relating to the modulation and coding scheme which can be used on the second frequency channel by the wireless communication terminal, and the communication can continuously be conducted with no re-setting after the channel change while a load is reduced during a connection setting.

(2-2) In accordance with an eighth aspect of the embodiments, a wireless communication base station is the wireless communication base station described in the additional statement (2) or (2-1), and is characterized in that the wireless communication base station updates the information on the supported connection management table when receiving a renotification of the usable modulation and coding scheme or a renotification of the usable frequency channel and the usable modulation and coding scheme from the wireless communication terminal whose connection is permitted.

(Effect of Additional Statement (2-2))

The information on the connection management table is updated by receiving the renotification of the usable modulation and coding scheme from the wireless communication terminal, so that the communication can be conducted by the appropriate modulation and coding scheme which is supported with the communication state of the wireless communication terminal.

(3-1) In accordance with a ninth aspect of the embodiments, a wireless communication base station is the wireless communication base station described in the additional statement (1), (1-1), (2), or (2-1), and is characterized in that a notification of the communication system or modulation and coding scheme used on the second frequency channel is made on the second frequency channel.

(Effect of Additional Statement (3-1))

The notification of the communication system or modulation and coding scheme used on the second frequency channel is made on the second frequency channel, so that other wireless communication base stations or wireless communication terminals which are receivable on the second frequency channel can recognize what communication system or modulation and coding scheme is used on the second frequency channel by the wireless communication base station. In other wireless communication base stations or wireless communication terminals, an interference-prevention measure can be taken by the recognition. In the wireless communication terminal, the wireless communication base station can be specified as a connected candidate of a wireless communication base station by such recognition.

(3-2) In accordance with a tenth aspect of the embodiments, a wireless communication base station is the wireless communication base station described in the additional statement (1), (1-1), (2), or (2-1), and is characterized in that a notification that the wireless communication base station has the same first frequency channel is made on the second frequency channel.

(Effect of Additional Statement (3-2))

The notification of the identifier of the wireless communication base station is made on the second frequency channel, so that the notification that the same wireless communication base station is operated on the first and second frequency channels is made on the second frequency channel. In other wireless communication base stations or wireless communication terminals, an interference-prevention measure can be taken by such recognition. The wireless communication terminal can recognize the wireless communication base station to send the wireless packet. Additionally, the wireless communication terminal conducts the communication with the wireless communication base station on the first frequency channel, changes the first frequency channel to the second frequency channel, and conducts the communication again with the wireless communication base station.

(3-2-1-1) In accordance with an eleventh aspect of the embodiments, a wireless communication base station is the wireless communication base station described in the additional statement (3-2), and is characterized in that a wireless packet is sent on all wireless packet sendable and receivable frequency channels, the wireless packet being addressed to all or a part of plural wireless communication terminals, the wireless communication terminals being connected on one of frequency channels in wireless packet sendable and receivable states.

(Effect of Additional Statement (3-2-1-1))

The wireless packet addressed to the plural wireless communication terminals is sent on all the wireless packet sendable and receivable frequency channels, so that the destination wireless communication terminal that can move the frequency channel can securely receive the wireless packet. Additionally, it is not necessary that the wireless communication base station correctly specify the connected frequency channel including the movement of the frequency channel to connect wireless communication terminal in transmitting the wireless packet, so that the load on processing can be reduced.

(3-2-1-2) In accordance with a twelfth aspect of the embodiments, a wireless communication base station is the wireless communication base station described in the additional statement (3-2-1-1), and is characterized in that an identical value is inserted in a item indicating order of a delivery number when the wireless packet addressed to all or a part of plural wireless communication terminals is sent on all the wireless packet sendable and receivable frequency channels.

(Effect of Additional Statement (3-2-1-2))

The identical value is inserted in the item indicating the order of the delivery number when the wireless packet addressed to the same plural wireless communication terminals is sent on the plural frequency channels. Therefore, when the transmission timing is shifted between the plural frequency channels, the wireless communication terminal which is moved between the frequency channels during the shift of the transmission timing or the wireless communication terminal which is receivable on the plural frequency channels can recognize that the received packets are overlapping even if the wireless communication terminal receives the same packets on the plural frequency channels.

(3-2-2-1) In accordance with a thirteenth aspect of the embodiments, a wireless communication base station is the wireless communication base station described in the additional statement (3-2), and is characterized in that a first item and a second item are provided in the wireless packet used in the notification, the first item indicating the identifier of the wireless communication base station which can be also used in a wireless communication base station which can conduct communication only on the single frequency channel, the identifier inserted in the first item differs from channel to channel, and the identifier indicating the same wireless communication base station between the frequency channels is inserted in the second field.

(Effect of Additional Statement (3-2-2-1))

The notification of the same wireless communication base station as the first frequency channel is made by the item different from the item indicating the identifier of the wireless communication base station which can be used in a wireless communication base station which can conduct the communication only on the single frequency channel. Therefore, when the notification is received by the wireless communication terminal which can be connected only to the wireless communication base station which can conduct the communication only on the single frequency channel, the wireless communication base station which can conduct the communication only on the single frequency channel can be recognized as another wireless communication base station to connect the wireless communication terminal to the wireless communication base station. In the wireless communication terminal which can be connected to the wireless communication base station which can conduct the communication on the plural frequency channels, the wireless communication terminal can recognize the wireless communication base station which can conduct the communication on the plural frequency channels as the same wireless communication base station to connect the wireless communication terminal to the wireless communication base station.

(4) In accordance with a fourteenth aspect of the embodiments, a wireless communication base station is the wireless communication base station described in the additional statement (1), (1-1), (2), or (2-1), and the wireless communication base station is characterized in that the notification of the communication system or modulation and coding scheme used in the first frequency channel is made on the first frequency channel.

(Effect of Additional Statement (4))

The notification of the communication system or modulation and coding scheme used in the first frequency channel is made on the first frequency channel. Therefore, other wireless packet receivable wireless communication base stations or wireless communication terminals can recognize on the first frequency channel that the wireless communication base station is operated on the first and second frequency channels and which communication system or modulation and coding scheme is used on the first frequency channel. In other wireless communication base stations or wireless communication terminals, an interference-prevention measure can be taken by such recognition. In the wireless communication terminal, the wireless communication base station can be specified as a candidate of a connected wireless communication base station by such recognition.

(5) In accordance with a fifteenth aspect of the embodiments, a wireless communication base station is the wireless communication base station described in the additional statement (1), (1-1), (2), or (2-1), and is characterized in that the identifier of the wireless communication terminal is a management number allocated to the wireless communication terminal when the wireless communication base station permits the wireless communication terminal to be connected thereto.

(Effect of Additional Statement (5))

The management number allocated to the wireless communication terminal when the wireless communication base station permits the wireless communication terminal to be connected thereto is retained as the identifier of the wireless communication terminal by the connection management table, so that the wireless communication base station can identify the wireless communication terminal using the unique identifier, and the management of the wireless communication terminal can be simplified.

(6) In accordance with a sixteenth aspect of the embodiments, a wireless communication base station is the wireless communication base station described in the additional statement (1), (1-1), (2), or (2-1), and is characterized by including a queue in which the sent wireless packet is stored in each frequency channel, and the wireless packet addressed to the wireless communication terminal is moved from a first queue for the first frequency channel to a second queue for the second frequency channel when the request from the wireless communication terminal to change the first frequency channel to the second frequency channel is permitted.

(Effect of Additional Statement (6))

The wireless communication base station includes the queue in which the sent wireless packet is stored in each frequency channel, and the wireless packet addressed to the wireless communication terminal is moved to the transmission queue of the supported frequency channel in response to the frequency channel change request from the wireless communication terminal. Therefore, the wireless communication terminal moved between the frequency channels can send the wireless packet addressed to the wireless communication terminal on the frequency channel on which the communication is conducted.

(7) In accordance with a seventeenth aspect of the embodiments, a wireless communication base station is the wireless communication base station described in the additional statement (1), (1-1), (2), or (2-1), and is characterized in that, when the request from the wireless communication terminal to change the first frequency channel to the second frequency channel is permitted, the wireless communication base station starts the communication with the wireless communication terminal on the second frequency channel after at least a fixed time elapses since the permission.

(Effect of Additional Statement (7))

The wireless communication base station starts the communication with the wireless communication terminal on the changed frequency channel after at least the fixed time elapses since the request from the wireless communication terminal to change the first frequency channel to the second frequency channel is permitted. Therefore, a delay can be granted in order to prepare the start of the communication between the wireless communication base station and the wireless communication terminal on the changed frequency channel.

(7-1) In accordance with an eighteenth aspect of the embodiments, a wireless communication base station is the wireless communication base station described in the additional statement (7), and is characterized in that at least a time necessary to move the frequency channel of the wireless communication terminal is set at the fixed time.

(Effect of Additional Statement (7-1))

The communication is started between the wireless communication base station and the wireless communication terminal on the changed frequency channel after at least the time necessary to move the frequency channel of the wireless communication terminal elapses. Therefore, that the wireless communication terminal is in the receivable state on the changed frequency channel can be assured to start the transmission of the wireless packet.

(7-1-1) In accordance with a nineteenth aspect of the embodiments, a wireless communication base station is the wireless communication base station described in the additional statement (7-1), and is characterized in that a time necessary to change the frequency channel is obtained from the wireless communication terminal before the request to change the first frequency channel to the second frequency channel is permitted.

(Effect of Additional Statement (7-1-1))

The time necessary to change the frequency channel is obtained from the wireless communication terminal before the request to change the first frequency channel to the second frequency channel is permitted, and the time necessary to move the frequency channel of the wireless communication terminal is correctly recognized. Then the communication is started between the wireless communication base station and the wireless communication terminal on the changed frequency channel after at least the time elapses, so that the degree of certainty can be enhanced for the assurance that the wireless communication terminal is in the receivable state on the changed frequency channel.

(7-2) In accordance with a twentieth aspect of the embodiments, a wireless communication base station is the wireless communication base station described in the additional statement (6), and is characterized in that, when the request from the wireless communication terminal to change the first frequency channel to the second frequency channel is permitted, the wireless communication base station starts the communication with the wireless communication terminal on the second frequency channel after at least the time necessary to move the wireless packet from the first queue to the second queue elapses since the permission.

(Effect of Additional Statement (7-2))

The wireless communication base station starts the communication with the wireless communication terminal on the changed frequency channel after at least the time necessary to move the wireless packet addressed to the wireless communication terminal between the queues elapses, so that the wireless packet addressed to the wireless communication terminal can surely be sent to the wireless communication terminal on the changed frequency channel.

(7-3) In accordance with a twenty-first aspect of the embodiments, a wireless communication base station is the wireless communication base station described in the additional statement (7), and is characterized in that a determination of the fixed time is made by exchange of the wireless packet with the wireless communication terminal before the change to the second frequency channel is permitted.

(Effect of Additional Statement (7-3))

The time to start the communication with the wireless communication terminal on the changed frequency channel is determined by the exchange of the wireless packet, so that the start of the communication can be assured after the communication can surely be conducted between the wireless communication base station and the wireless communication terminal on the changed frequency channel.

(8) In accordance with a twenty-second aspect of the embodiments, a wireless communication base station is the wireless communication base station described in the additional statement (1), (1-1), (2), or (2-1), and is characterized in that a notification of a usage rate of the second frequency channel is made on the first frequency channel.

(Effect of Additional Statement (8))

The information for making a determination of the transition to another frequency channel can be provided to the wireless communication terminal by making the notification of the usage rate of another frequency channel.

(9) In accordance with a twenty-third aspect of the embodiments, a wireless communication base station is the wireless communication base station described in the additional statement (1), (1-1), (2), or (2-1), and is characterized in that a notification of a second bandwidth which is the bandwidth of the second frequency channel is made on the first frequency channel.

(Effect of Additional Statement (9))

The notification of the bandwidth of another frequency channel is made, so that the wireless communication terminal determines whether or not the wireless communication terminal can conduct the communication with the bandwidth of another frequency channel.

(10) In accordance with a twenty-fourth aspect of the embodiments, a wireless communication base station is the wireless communication base station described in the additional statement (1), (1-1), (2), or (2-1), and is characterized in that security information set in conducting the communication with the wireless communication terminal on the first frequency channel is retained in the connection management table while correlated with the identifier of the wireless communication terminal, and the communication is conducted with the wireless communication terminal on the second frequency channel using the retained security information when the request from the wireless communication terminal to change the first frequency channel to the second frequency channel is permitted.

(Effect of Additional Statement (10))

The security information is managed along with the identifier of the wireless communication terminal, and the same security information is used on the changed frequency channel when the request of the change to another frequency channel is permitted, so that the communication can be started unless the security setting is performed again on the changed frequency channel.

(10-1) In accordance with a twenty-fifth aspect of the embodiments, a wireless communication base station is the wireless communication base station described in the additional statement (10), and is characterized in that a security system which can be used by the wireless communication terminal is retained in the connection management table while correlated with the identifier of the wireless communication terminal, the notification of the security system being made on the first frequency channel by the wireless communication terminal, whether or not the security system is matched with a security system necessary for the wireless communication base station on the second frequency channel is referred to from the connection management table when the wireless communication terminal makes the request to change the first frequency channel to the second frequency channel, and the reference is used to make the determination of the permission.

(Effect of Additional Statement (10-1))

The security system which can be used by the wireless communication terminal is recognized before the request of the change to another frequency channel, and the security system is used to determine whether or not the request of the change to another frequency channel is permitted, so that the security can be retained on another frequency channel. Additionally, when the security system necessary for the wireless communication base station is not satisfied, the connection request from the wireless communication terminal which is known to be rejected on another frequency channel is previously recognized by the wireless communication terminal, so that the occupancy of the frequency channel caused by the exchange of the wireless packet due to the wasted connection can be reduced. When the change of the wireless communication terminal to another frequency channel is permitted, the information on the security system of which the wireless communication terminal notifies the wireless communication base station can be used in the communication with the wireless communication terminal on the changed frequency channel.

(10-1-1) In accordance with a twenty-sixth aspect of the embodiments, a wireless communication base station is the wireless communication base station described in the additional statement (10-1), and is characterized in that, in the permission of the request of the change to second frequency channel, the communication is conducted with the wireless communication terminal on the second frequency channel using information on a retained security setting when a first security system used on the first frequency channel can be used on the second frequency channel, one of the corresponding security systems which are supported with the second frequency channel of the wireless communication base station in the security systems which can be used on the second frequency channel by the wireless communication terminal is selected as a second security system from the connection management table when the first security system cannot be used on the second frequency channel, and the second security system is set before the communication is conducted with the wireless communication terminal on the second frequency channel using such security system.

(Effect of Additional Statement (10-1-1))

When the security system before the frequency channel change can be used as the frequency channel after the frequency channel change, the communication is conducted using the same security information, so that the re-setting of the exchange of the wireless packet can be omitted. The exchange of the wireless packet is re-set in order to use the security system on the changed frequency channel. When the security systems supported with the wireless communication terminal exist in the security systems necessary for the wireless communication base station although the security system before the frequency channel change cannot be used on the changed frequency channel, the setting of one of the security systems which are supported with the wireless communication terminal is performed on the changed frequency channel between the wireless communication base station and the wireless communication terminal, so that the security necessary for the wireless communication base station on the changed frequency channel can be retained.

(10-2) In accordance with a twenty-seventh aspect of the embodiments, a wireless communication base station is the wireless communication base station described in the additional statement (10-1), and is characterized in that a notification of the security system necessary for the second frequency channel is made on the first frequency channel.

(Effect of Additional Statement (10-2))

The notification of the security level necessary for another frequency channel is made. Therefore, a security level necessary for another frequency channel can be changed, and the wireless communication terminal can determine whether or not another frequency channel is supported with the security system of the wireless communication terminal.

(11) In accordance with a twenty-eighth aspect of the embodiments, a wireless communication terminal which can conduct communication on at least two frequency channels, selecting at least one of the frequency channels to conduct the communication, is characterized in that the wireless communication base station which can simultaneously conduct the communication on the first and second frequency channels is notified on the first frequency channel of communication systems which can be used on the first and second frequency channels of the wireless communication terminal, the communication is conducted with the wireless communication base station on the first frequency channel when connection is permitted by the wireless communication base station, and the communication is conducted with wireless communication base station on the second frequency channel when the change to the second frequency channel is permitted by the wireless communication base station.

(Effect of Additional Statement (11))

The notification of the communication system which can be used on the second frequency channel is made on the first frequency channel, so that the wireless communication base station connected on the first frequency channel can previously recognize the communication system which can be used on the second frequency channel of the wireless communication terminal and the communication can be started without making the notification of the connection information necessary for the communication on the second frequency channel.

(11-1) In accordance with a twenty-ninth aspect of the embodiments, a wireless communication terminal which can conduct communication on at least two frequency channels, selecting at least one of the frequency channels to conduct the communication, is characterized in that the wireless communication base station which can simultaneously conduct the communication on the first and second frequency channels is notified on the first frequency channel of communication systems which can be used on the first frequency channel of the wireless communication terminal, the communication is conducted with the wireless communication base station on the first frequency channel and a notification of the communication system which can be used on the second frequency channel is made during the communication when the connection is permitted by the wireless communication base station, and the communication is conducted with the wireless communication base station on the second frequency channel when the change to the second frequency channel is permitted by the wireless communication base station.

(Effect of Additional Statement (11-1))

Therefore, the effects similar to those of the above-described aspect of the embodiments can be obtained, that is, the notification of the communication system which can be used on the second frequency channel is additionally made on the first frequency channel after the connection, so that the delay can be granted in order to prepare a notification frame relating to the communication system which can be used on the second frequency channel by the wireless communication terminal, and the communication can continuously be conducted with no re-setting after the channel change while the load is reduced during the connection setting.

(11-2) In accordance with a thirtieth aspect of the embodiments, a wireless communication terminal is the wireless communication terminal described in the additional statement (11) or (11-1), and is characterized in that, when the usable communication system is changed, the wireless communication base station which permits the connection is notified again of the usable communication system, or of the usable frequency channel and the usable communication system.

(Effect of Additional Statement (11-2))

The wireless communication base station is notified again of the information when the usable communication system is changed, so that the communication can be conducted by the appropriate communication system which is supported with the communication state of the wireless communication terminal.

(11-3-1) In accordance with a thirty-first aspect of the embodiments, a wireless communication terminal is the wireless communication terminal described in the additional statement (11) or (11-1), and is characterized in that the communication system is expressed by the type of communication standard.

(Effect of Additional Statement (11-3-1))

The notification of the type of the communication standard which can be used on the second frequency channel is made on the first frequency channel. Therefore, the wireless communication base station which is the destination connected on the first frequency channel can previously recognize the type of the communication standard which can be used on the second frequency channel of the wireless communication terminal, and the communication can be started without making the renotification of the connection information necessary for the communication on the second frequency channel.

(11-3-2) In accordance with a thirty-second aspect of the embodiments, a wireless communication terminal is the wireless communication terminal described in the additional statement (11-3-1), and is characterized in that, in the type of the communication standard, extended systems in the same communication standard are distinguished from each other.

(Effect of Additional Statement (11-3-2))

The notification of the type of the extended systems in the same communication standard which can be used on the second frequency channel is made on the first frequency channel. Therefore, the wireless communication base station which is the destination connected on the first frequency channel can previously recognize the type of the extended systems in the same communication standard which can be used on the second frequency channel of the wireless communication terminal, and the communication can be started without making the renotification of the connection information necessary for the communication on the second frequency channel.

(12) In accordance with a thirty-third aspect of the embodiments, a wireless communication terminal which can conduct communication on at least two frequency channels using plural modulation and coding schemes, selecting at least one of the frequency channels to conduct the communication, is characterized in that, when a connection request is sent on the first frequency channel to the wireless communication base station which can simultaneously conduct communication on the first and second frequency channels using the plural modulation and coding schemes, a notification of at least a modulation and coding scheme which can be used by the wireless communication terminal in modulation and coding schemes on the second frequency channel is made in addition to the modulation and coding scheme which can be used on the first frequency channel of the wireless communication terminal, the notifications of the modulation and coding schemes on the first frequency channel being made by the wireless communication base station, the communication is conducted with the wireless communication base station on the first frequency channel using the notified modulation and coding scheme which can be used by the wireless communication terminal on the first frequency channel when the connection is permitted by a response from the wireless communication base station, a request of change to the second frequency channel is made to the wireless communication base station, and the communication is conducted with the wireless communication base station on the second frequency channel using the notified modulation and coding scheme which can be used on the second frequency channel by the wireless communication terminal when the change to the second frequency channel is permitted by the response from the wireless communication base station.

(Effect of Additional Statement (12))

The notification of the modulation and coding scheme which can be used on the second frequency channel of the two frequency channels using the plural modulation and coding schemes is made on the first frequency channel in the connection, so that the wireless communication base station which can simultaneously conduct the communication on the first and second frequency channels can recognize the modulation and coding scheme which can be used on the second frequency channel of the wireless communication terminal through the first frequency channel and the communication can be started without making the notification of the connection information necessary for the communication on the second frequency channel. In the connection and in the channel change, the request is sent from the wireless communication terminal, and the response is received from the wireless communication base station. Therefore, consistency of the connection information can be assured between the wireless communication terminal and the wireless communication base station.

(12-1) In accordance with a thirty-fourth aspect of the embodiments, a wireless communication terminal which can conduct communication on at least two frequency channels using plural modulation and coding schemes, selecting at least one of the frequency channels to conduct the communication, is characterized in that the wireless communication base station which can simultaneously conduct communication on the first and second frequency channels using plural modulation and coding schemes is notified on the first frequency channel of a modulation and coding scheme which can be used on the first frequency channel by the wireless communication terminal, the communication is conducted with the wireless communication base station on the first frequency channel using the modulation and coding scheme which can be used by the wireless communication terminal on the first frequency channel when the connection is permitted by a response from the wireless communication base station, a notification of the modulation and coding scheme which can be used on the second frequency channel is made during the communication, a request of change to the second frequency channel is made to the wireless communication base station, and the communication is conducted with the wireless communication base station on the second frequency channel using the notified modulation and coding scheme which can be used on the second frequency channel by the wireless communication terminal when the change to the second frequency channel is permitted by the response from the wireless communication base station.

(Effect of Additional Statement (12-1))

Therefore, the effects similar to those of the above-described aspect of the embodiments can be obtained, that is, the notification of the modulation and coding scheme which can be used on the second frequency channel is additionally made on the first frequency channel after the connection, so that the delay can be granted in order to prepare a notification frame relating to the modulation and coding scheme which can be used on the second frequency channel by the wireless communication terminal, and the communication can continuously be conducted with no re-setting after the channel change while the load is reduced during the connection setting.

(12-2) In accordance with a thirty-fifth aspect of the embodiments, a wireless communication terminal is the wireless communication terminal described in the additional statement (12) or (12-1), and is characterized in that, when the usable modulation and coding scheme is changed, the wireless communication base station whose connection is permitted is notified again of the usable modulation and coding scheme, or of the usable frequency channel and the usable modulation and coding scheme.

(Effect of Additional Statement (12-2))

When the usable modulation and coding scheme is changed, the wireless communication base station is notified of the information again, so that the communication can be conducted by the appropriate modulation and coding scheme which is supported with the communication state of the wireless communication terminal.

(13) In accordance with a thirty-sixth aspect of the embodiments, a wireless communication terminal is the wireless communication terminal described in the additional statement (11), (11-1), (12), or (12-1), and is characterized in that a notification of the communication system or modulation and coding scheme which can be used on the first frequency channel is made when the wireless communication terminal is connected on the first frequency channel to the wireless communication base station which can conduct communication on single frequency channel, the communication is conducted with the wireless communication base station on the first frequency channel when the wireless communication base station gives the connection permission, the wireless communication terminal is transferred to the second frequency channel to search for other wireless communication base stations which are operated on the second frequency channel in the case of the change to the second frequency channel, other wireless communication base stations are notified of the communication system or modulation and coding scheme which can be used on the second frequency channel when other connectable wireless communication base stations are detected, and a connection request is made to other wireless communication base stations.

(Effect of Additional Statement (13))

While the wireless communication terminal is connected to the wireless communication base station which can simultaneously conduct communication on at least two frequency channel, the wireless communication terminal can also be connected to wireless communication base stations with which the wireless communication terminal can conduct the communication on the single frequency channel, so that the number of options can be increased in the wireless communication base station with which the wireless communication terminal can conduct the communication. A wireless communication base station which can be connected on the second frequency channel is searched for when the request to transfer to the second frequency channel is made even if the wireless communication terminal is connected to the wireless communication base station with which the wireless communication terminal can conduct the communication on the single frequency channel, the wireless communication base station is notified of the communication system or modulation and coding scheme which can be used on the second frequency channel when the connectable wireless communication base station is detected, and the connection request is made to the wireless communication base station. Therefore, the wireless communication terminal can be connected to the wireless communication base station which is operated on the second frequency channel.

(14) In accordance with a thirty-seventh aspect of the embodiments, a wireless communication terminal is the wireless communication terminal described in the additional statement (11), (11-1), (12), or (12-1), and is characterized in that the wireless communication terminal is transferred to the second frequency channel to search other wireless communication base stations which are operated on the second frequency channel when the permission of the channel change is not given, other wireless communication base stations are notified of the communication system or modulation and coding scheme which can be used on the second frequency channel when other connectable wireless communication base stations are detected, and a connection request is made to other wireless communication base stations.

(Effect of Additional Statement (14))

While the wireless communication terminal is connected to the wireless communication base station which can simultaneously conduct communication on at least two frequency channels, other wireless communication base stations which are connectable on the second frequency channel are searched for when the permission of the request to transfer to the second frequency channel is not given to the wireless communication base station, other wireless communication base stations are notified of the communication system or modulation and coding scheme which can be used on the second frequency channel when other connectable wireless communication base stations are detected, and a connection request is made to other wireless communication base stations. Therefore, the wireless communication terminal can be connected to other wireless communication base stations which are operated on the second frequency channel, and the number of options can be increased in the wireless communication base station with which the wireless communication terminal can conduct the communication.

(15) In accordance with a thirty-eighth aspect of the embodiments, a wireless communication terminal is the wireless communication terminal described in the additional statement (11), (11-1), (12), or (12-1), and is characterized in that the wireless communication terminal is transferred to a third frequency channel to search for other wireless communication base stations which are operated on the third frequency channel when the request to transfer to the third frequency channel is made, other wireless communication base stations are notified of the communication system or modulation and coding scheme which can be used on the third frequency channel when other connectable wireless communication base stations are detected, and a connection request is made to other wireless communication base stations.

(Effect of Additional Statement (15))

While the wireless communication terminal is connected to the wireless communication base station which can simultaneously conduct communication on at least two frequency channels, a wireless communication base station which can be connected on the third frequency channel is searched for when the request to transfer to the third frequency channel which is not supported with the same wireless communication base station is made, the wireless communication base station is notified of the communication system or modulation and coding scheme which can be used on the third frequency channel when the wireless communication base station is detected, and the connection request is made to the wireless communication base station. Therefore, the wireless communication terminal can be connected to the wireless communication base station which is operated on the third frequency channel, and the number of options can be increased in the wireless communication base station with which the wireless communication terminal can conduct the communication.

(16) In accordance with a thirty-ninth aspect of the embodiments, a wireless communication terminal is the wireless communication terminal described in the additional statement (11), (11-1), (12), or (12-1), and is characterized in that, when the wireless communication base station gives the permission of the request of change to the second frequency channel, the communication with the wireless communication base station is started on the second frequency channel after at least a fixed time elapses since the permission.

(Effect of Additional Statement (16))

The communication is started between the wireless communication base station and the wireless communication terminal on the changed frequency channel after at least the fixed time elapses since the wireless communication base station gives the permission of the request of the frequency channel change, so that the delay can be granted in order to prepare the start of the communication between the wireless communication terminal and wireless communication base station on the changed frequency channel.

(16-1) In accordance with a fortieth aspect of the embodiments, a wireless communication terminal is the wireless communication terminal described in the additional statement (16), and is characterized in that at least a time necessary to move the frequency channel of the wireless communication terminal is set at the fixed time.

(Effect of Additional Statement (16-1))

The communication is started between the wireless communication base station and the wireless communication terminal on the changed frequency channel after at least the time necessary to move the frequency channel of the wireless communication terminal elapses. Therefore, the communication can surely be started after the wireless communication terminal can send and receive on the changed frequency channel.

(16-1-1) In accordance with a forty-first aspect of the embodiments, a wireless communication terminal is the wireless communication terminal described in the additional statement (16-1), and is characterized in that the wireless communication base station is notified of a time necessary for the frequency channel change before the change to the second frequency channel is permitted.

(Effect of Additional Statement (16-1-1))

The wireless communication base station is notified of the time necessary for the frequency channel change before the change to the second frequency channel is permitted, so that the wireless communication base station can correctly recognize the time necessary for the frequency channel movement in the wireless communication terminal and the wireless communication base station can start the transmission addressed to the wireless communication terminal on the changed frequency channel after at least the time necessary for the frequency channel movement elapses.

(16-2) In accordance with a forty-second aspect of the embodiments, a wireless communication terminal is the wireless communication terminal described in the additional statement (16), and is characterized in that the fixed time is a time which is specified by the wireless communication base station.

(Effect of Additional Statement (16-2))

The communication is started between the wireless communication base station and the wireless communication terminal on the changed frequency channel after at least the time specified by the wireless communication base station elapses. Therefore, the delay can be granted in order to prepare the start of the communication between the wireless communication terminal and wireless communication base station on the changed frequency channel, and the communication with the wireless communication base station can surely be started on the changed frequency channel.

(16-3) In accordance with a forty-third aspect of the embodiments, a wireless communication terminal is the wireless communication terminal described in the additional statement (16), and is characterized in that the fixed time is determined by the exchange of the wireless packet with the wireless communication base station before the change to the second frequency channel is permitted.

(Effect of Additional Statement (16-3))

The time to start the communication with the wireless communication base station on the changed frequency channel is determined by the exchange of the wireless packet, so that the start of the communication can be assured after the communication can surely be conducted between the wireless communication terminal and the wireless communication base station on the changed frequency channel.

(17) In accordance with a forty-fourth aspect of the embodiments, a wireless communication terminal is the wireless communication terminal described in the additional statement (11), (11-1), (12), or (12-1), and is characterized in that a usage rate of the second frequency channel is obtained from the wireless communication base station to determine whether or not the request to transfer to the second frequency channel is sent.

(Effect of Additional Statement (17))

The usage rate of the second frequency channel is used to determine whether or not the request to transfer to the second frequency channel is sent, so that the communication can be assured in the case of the transition to the second frequency channel.

(18) In accordance with a forty-fifth aspect of the embodiments, a wireless communication terminal is the wireless communication terminal described in the additional statement (11), (11-1), (12), or (12-1), and is characterized in that a second bandwidth, which is the bandwidth of the second frequency channel, is obtained from the wireless communication base station to determine whether or not the request to transfer to the second frequency channel is sent.

(Effect of Additional Statement (18))

The bandwidth of another frequency channel is used to determine whether or not the request to transfer to the second frequency channel is sent, so that the communication can be assured in the case of the transition to the second frequency channel.

(19) In accordance with a forty-sixth aspect of the embodiments, a wireless communication terminal is the wireless communication terminal described in the additional statement (11), (11-1), (12), or (12-1), and is characterized in that the wireless communication base station is notified on the first frequency channel of the security system which can be used on the first and second frequency channels.

(Effect of Additional Statement (19))

The wireless communication base station is notified of the security system which can be used on another frequency channel. Therefore, the wireless communication base station can determine whether or not the permission is given when the wireless communication terminal makes the request of the change to another frequency channel, and the information on the notified security system can be used in the communication with the wireless communication terminal on the changed frequency channel when the permission is given.

(21) In accordance with a forty-seventh aspect of the embodiments, a wireless communication system includes a wireless communication base station which can simultaneously conduct communication on at least two frequency channels and a wireless communication terminal which can simultaneously conduct communication on at least two frequency channels and selecting at least one of the frequency channels to conduct the communication, and the wireless communication system is characterized in that the wireless communication base station notifies the wireless communication terminal of an identifier of a second frequency channel and a communication system on a first frequency channel, the second frequency channel being in a wireless packet receivable state except for the first frequency channel, the communication system being used on the second frequency channel, the wireless communication terminal notifies the wireless communication base station of communication systems on the first frequency channel, the communication systems being able to be used on the first and second frequency channels of the wireless communication terminal, the wireless communication base station retains the communication system in a connection management table along with an identifier of the wireless communication terminal and an identifier of a frequency channel, the communication system being able to be used by the wireless communication terminal, the wireless communication terminal making a notification of the communication system when the wireless communication base station permits connection of the wireless communication terminal, the wireless communication base station conducts the communication with the wireless communication terminal on the second frequency channel using the communication system when permitting a request from the wireless communication terminal to change the first frequency channel to the second frequency channel, the communication system being able to be used by the wireless communication terminal on the connection management table from the identifier of the wireless communication terminal in the communication systems used on the second frequency channel, the wireless communication terminal retains a communication system in a connection management table along with an identifier of a frequency channel, the communication system being used on the second frequency channel, the wireless communication base station notifying the wireless communication terminal of the communication system used on the second frequency channel, and the wireless communication terminal conducts the communication with the wireless communication base station on the second frequency channel using the communication system when the wireless communication base station permits the request of change to the second frequency channel, the communication system being used by the wireless communication base station on the connection management table in the communication systems which can be used on the second frequency channel.

(Effect of Additional Statement (21))

The wireless communication base station notifies the wireless communication terminal on the first frequency channel of the communication system used on the second frequency channel, so that the wireless communication terminal which performs the transmission and reception on the first frequency channel can recognize the communication system which is used on the second frequency channel by the wireless communication base station. Additionally, the wireless communication terminal notifies the connected wireless communication base station on the first frequency channel of the communication system which can be used on the second frequency channel, so that the wireless communication base station can previously recognize the communication system which can be used on the second frequency channel of the wireless communication terminal. Therefore, the wireless communication base station and the wireless communication terminal can previously recognize the communication system which should be used on the second frequency channel, and the communication can be started without performing the exchange of the connection information again, the exchange of the connection information being necessary for the communication in making the transition to the second frequency channel.

(21-1) In accordance with a forty-eighth aspect of the embodiments, a wireless communication system includes a wireless communication base station which can simultaneously conduct communication on at least two frequency channels and a wireless communication terminal which can simultaneously conduct communication on at least two frequency channels and selecting at least one of the frequency channels to conduct the communication, and the wireless communication system is characterized in that the wireless communication base station notifies the wireless communication terminal of an identifier of a second frequency channel and a communication system on a first frequency channel, the second frequency channel being in a wireless packet receivable state except for the first frequency channel, the communication system being used on the second frequency channel, the wireless communication terminal notifies the wireless communication base station of communication systems on the first frequency channel, the communication systems being able to be used on the first frequency channel of the wireless communication terminal, the wireless communication terminal conducts the communication with the wireless communication base station on the first frequency channel when the wireless communication base station permits the connection, the wireless communication terminal notifies the wireless communication base station of the communication system which can be used on the second frequency channel during the communication, the wireless communication base station retains the communication system in a connection management table along with an identifier of the wireless communication terminal and an identifier of a frequency channel, the communication system being able to be used on the first frequency channel of the wireless communication terminal, the wireless communication terminal making a notification of the communication system when the wireless communication base station permits connection of the wireless communication terminal, the wireless communication base station adds the identifier of the second frequency channel and information on the communication system to the connection management table while correlating the identifier of the second frequency channel and the information with the identifier of the wireless communication terminal when the wireless communication terminal notifies the wireless communication base station of the communication system which can be used on the second frequency channel, the communication system being able to be used on the second frequency channel of the wireless communication terminal, the wireless communication base station conducts the communication with the wireless communication terminal on the second frequency channel using the communication system when permitting a request from the wireless communication terminal to change the first frequency channel to the second frequency channel, the communication system being able to be used by the wireless communication terminal on the connection management table from the identifier of the wireless communication terminal in the communication systems used on the second frequency channel, the wireless communication terminal retains a communication system in a connection management table along with an identifier of a frequency channel, the communication system being used on the second frequency channel, the wireless communication base station notifying the wireless communication terminal of the communication system used on second frequency channel, and the wireless communication terminal conducts the communication with the wireless communication base station on the second frequency channel using the communication system when the wireless communication base station permits the request of change to the second frequency channel, the communication system being used by the wireless communication base station on the connection management table in the communication systems which can be used on the second frequency channel.

(Effect of Additional Statement (21-1))

The effects similar to those of the above-described aspect of the embodiments can be obtained, that is, after the connection is established on the first frequency channel, the wireless communication terminal additionally notifies the wireless communication base station of the communication system which can be used on the second frequency channel by the wireless communication terminal. Therefore, a delay can be granted in order to prepare a notification frame relating to the communication system which can be used on the second frequency channel of the wireless communication terminal, and the communication can continuously be conducted with no re-setting after the channel change while a load is reduced during a connection setting.

(21-2) In accordance with a forty-ninth aspect of the embodiments, a wireless communication system is the wireless communication system described in the additional statement (21) or (21-1), and is characterized in that, when the usable communication system is changed, the wireless communication terminal notifies the wireless communication base station which permits the connection again of the usable communication system or of the usable frequency channel and the usable communication system, and the wireless communication base station updates the corresponding information in the connection management table when receiving the renotification of the usable communication system or the renotifications of the usable frequency channel and the usable communication system from the wireless communication terminal whose connection is permitted.

(Effect of Additional Statement (21-2))

The wireless communication base station is notified again of the information when the communication system which can be used by the wireless communication terminal is changed, so that the wireless communication terminal and the wireless communication base station can conduct the communication with each other by the appropriate communication system which is supported with the communication state of the wireless communication terminal.

(21-3-1) In accordance with a fiftieth aspect of the embodiments, a wireless communication system is the wireless communication system described in the additional statement (21), and is characterized in that the communication system is expressed by the type of the communication standard.

(Effect of Additional Statement (21-3-1))

The wireless communication base station notifies the wireless communication terminal on the first frequency channel of the type of the communication standard which is used on the second frequency channel, so that the wireless communication terminal which performs the transmission and reception on the first frequency channel can recognize the type of the communication standard which is used on the second frequency channel by the wireless communication base station. Additionally, the wireless communication terminal notifies the connected wireless communication base station on the first frequency channel of the type of the communication standard which can be used on the second frequency channel, so that the wireless communication base station can previously recognize the type of the communication standard which can be used on the second frequency channel of the wireless communication terminal. Therefore, the wireless communication base station and the wireless communication terminal can previously recognize the type of the communication standard which should be used on the second frequency channel, and the communication can be started without making the exchange of the connection information again necessary for the communication in making the transition to the second frequency channel.

(21-3-2) In accordance with a fifty-first aspect of the embodiments, a wireless communication system is the wireless communication system described in the additional statement (21-3-1), and the wireless communication system is characterized in that, in the type of the communication standard, extended systems in the same communication standard are distinguished from each other.

(Effect of Additional Statement (21-3-2))

The wireless communication base station notifies the wireless communication terminal on the first frequency channel of the type of the extended systems in the same communication standard which is used on the second frequency channel, so that the wireless communication terminal which performs the transmission and reception on the first frequency channel can recognize the type of the extended systems in the same communication standard which can be used on the second frequency channel of the wireless communication base station. Additionally, the wireless communication terminal notifies the connected wireless communication base station on the first frequency channel of the type of the extended systems in the same communication standard which can be used on the second frequency channel, so that the wireless communication base station can previously recognize the type of the extended systems in the same communication standard which can be used on the second frequency channel of the wireless communication terminal. Therefore, the wireless communication base station and the wireless communication terminal can previously recognize the type of the extended systems in the communication standard which should be used on the second frequency channel, and the communication can be started without making the exchange of the connection information again necessary for the communication in making the transition to the second frequency channel.

(22) In accordance with a fifty-second aspect of the embodiments, a wireless communication system includes a wireless communication base station which can simultaneously conduct communication on at least two frequency channels using plural modulation and coding schemes, and a wireless communication terminal which can simultaneously conduct communication on at least two frequency channels using plural modulation and coding schemes, selecting at least one of the frequency channels to conduct the communication, and the wireless communication system is characterized in that the wireless communication base station notifies the wireless communication terminal of an identifier of a second frequency channel and a modulation and coding scheme on a first frequency channel, the second frequency channel being in a wireless packet receivable state except for the first frequency channel, the modulation and coding scheme being used on the second frequency channel, the wireless communication terminal notifies the wireless communication base station of at least a modulation and coding scheme on the first frequency channel in addition to the modulation and coding scheme which can be used on the first frequency channel of the wireless communication terminal when transmitting the connection request to the wireless communication base station on the first frequency channel, the modulation and coding scheme being able to be used by the wireless communication terminal in the modulation and coding schemes on the second frequency channel, the wireless communication base station notifying the wireless communication terminal on the first frequency channel of the modulation and coding schemes on the second frequency channel, the wireless communication base station retains the modulation and coding scheme in a connection management table along with an identifier of the wireless communication terminal and an identifier of a frequency channel, the modulation and coding scheme being able to be used by the wireless communication terminal, the wireless communication terminal making a notification of the modulation and coding scheme when the wireless communication base station receives and permits a connection request from the wireless communication terminal, the wireless communication base station determines whether or not the modulation and coding scheme can be used on the second frequency channel from the identifier of the wireless communication terminal when receiving a request from the wireless communication terminal to change the first frequency channel to the second frequency channel, the modulation and coding scheme being able to be used by the wireless communication terminal on a connection management table, the wireless communication base station updates the identifier of the frequency channel to the identifier of the second frequency channel and retains the identifier of the second frequency channel when determining that modulation and coding scheme can be used on the second frequency channel, the wireless communication base station conducts the communication with the wireless communication terminal on the second frequency channel using the modulation and coding scheme which can be used by the wireless communication terminal on the connection management table from the identifier of the wireless communication terminal in the modulation and coding schemes used on the second frequency channel, the wireless communication terminal retains a modulation and coding scheme in a connection management table along with an identifier of a frequency channel, the modulation and coding scheme being used on the second frequency channel, the wireless communication base station notifying the wireless communication terminal of the modulation and coding scheme used on the second frequency channel, the wireless communication terminal sends a request of change to the second frequency channel to the wireless communication base station, and the wireless communication terminal conducts the communication with the wireless communication base station on the second frequency channel using the modulation and coding scheme when the wireless communication base station permits the request of the change to the second frequency channel, the modulation and coding scheme being used by the wireless communication base station on the connection management table in the modulation and coding schemes which can be used on the second frequency channel.

(Effect of Additional Statement (22))

The wireless communication base station notifies the wireless communication terminal on the first frequency channel of the modulation and coding scheme used on the second frequency channel, so that the wireless communication terminal which performs the transmission and reception on the first frequency channel can recognize the modulation and coding scheme which is used on the second frequency channel by the wireless communication base station. Additionally, the wireless communication terminal notifies the connected wireless communication base station on the first frequency channel of the modulation and coding scheme which can be used on the second frequency channel, so that the wireless communication base station can previously recognize the modulation and coding scheme which can be used on the second frequency channel of the wireless communication terminal. Therefore, the wireless communication base station and the wireless communication terminal can previously recognize the modulation and coding scheme which should be used on the second frequency channel, and the communication can be started without performing the exchange of the connection information again, the exchange of the connection information being necessary for the communication in making the transition to the second frequency channel.

In the connection and in the channel change, the request is sent from the wireless communication terminal, and the response is received from the wireless communication base station. Therefore, consistency of the connection information can be assured between the wireless communication terminal and the wireless communication base station.

(22-1) In accordance with a fifty-second aspect of the embodiments, a wireless communication system includes a wireless communication base station which can simultaneously conduct communication on at least two frequency channels using plural modulation and coding schemes, and a wireless communication terminal which can simultaneously conduct communication on at least two frequency channels using plural modulation and coding schemes, and selecting at least one of the frequency channels to conduct the communication, and the wireless communication system is characterized in that the wireless communication base station notifies the wireless communication terminal on a first frequency channel of an identifier of the first frequency channel, a modulation and coding scheme used on the first frequency channel, an identifier of a second frequency channel, and a modulation and coding scheme used on the second frequency channel, the second frequency channel being in a wireless packet receivable state except for the first frequency channel, the wireless communication terminal notifies the wireless communication base station of the modulation and coding scheme which can be used on the first frequency channel of the wireless communication terminal when transmitting the connection request to the wireless communication base station on the first frequency channel, the wireless communication base station retains the modulation and coding scheme in a connection management table along with an identifier of the wireless communication terminal and an identifier of a frequency channel, the modulation and coding scheme being able to be used on the first frequency channel by the wireless communication terminal, the wireless communication terminal making a notification of the modulation and coding scheme when the wireless communication base station receives and permits a connection request from the wireless communication terminal, the wireless communication terminal retains a modulation and coding scheme in a connection management table along with an identifier of a frequency channel when the wireless communication base station permits the connection of the wireless communication terminal, the wireless communication base station notifying the wireless communication terminal of the modulation and coding scheme used on the first and second frequency channel, the wireless communication terminal conducts the communication with the wireless communication base station on the first frequency channel using the modulation and coding scheme on the connection management table which is used by the wireless communication base station in the modulation and coding schemes which can be used on the first frequency channel, the wireless communication terminal notifies the wireless communication base station of at least the modulation and coding scheme which can be used by the wireless communication terminal in the modulation and coding schemes on the second frequency channel, the wireless communication base station notifying the wireless communication terminal on the first frequency channel of the modulation and coding schemes on the second frequency channel, the wireless communication base station adds the identifier of the second frequency channel and information on the modulation and coding scheme which can be used on the second frequency channel of the wireless communication terminal to the connection management table while correlating the identifier of the second frequency channel and the information with the identifier of the wireless communication terminal when the wireless communication terminal notifies the wireless communication base station of the modulation and coding scheme which can be used on the second frequency channel, the wireless communication base station determines whether or not the modulation and coding scheme can be used on the second frequency channel from the identifier of the wireless communication terminal when receiving a request from the wireless communication terminal to change the first frequency channel to the second frequency channel, the modulation and coding scheme being able to be used by the wireless communication terminal on a connection management table, the wireless communication base station updates the identifier of the frequency channel to the identifier of the second frequency channel and retains the identifier of the second frequency channel when determining that the modulation and coding scheme can be used on the second frequency channel, the wireless communication base station conducts the communication with the wireless communication terminal on the second frequency channel using the modulation and coding scheme which can be used by the wireless communication terminal on the connection management table from the identifier of the wireless communication terminal in the modulation and coding schemes used on the second frequency channel, the wireless communication terminal sends a request of change to the second frequency channel to the wireless communication base station, and the wireless communication terminal conducts the communication with the wireless communication base station on the second frequency channel using the modulation and coding scheme when the wireless communication base station permits the request of the change to the second frequency channel, the modulation and coding scheme being used by the wireless communication base station on the connection management table in the modulation and coding schemes which can be used on the second frequency channel.

(Effect of Additional Statement (22-1))

The effects similar to those of the above-described aspect of the embodiments can be obtained, that is, after the connection is established on the first frequency channel, the wireless communication terminal additionally notifies the wireless communication base station of the modulation and coding scheme which can be used on the second frequency channel by the wireless communication terminal. Therefore, a delay can be granted in order to prepare a notification frame relating to the modulation and coding scheme which can be used on the second frequency channel of the wireless communication terminal, and the communication can continuously be conducted with no re-setting after the channel change while a load is reduced during a connection setting.

(22-2) In accordance with a fifty-third aspect of the embodiments, a wireless communication system is the wireless communication system described in the additional statement (22) or (22-1), and the wireless communication system is characterized in that, when the usable modulation and coding scheme is changed, the wireless communication terminal notifies the wireless communication base station which permits the connection again of the usable modulation and coding scheme or of the usable frequency channel and the usable modulation and coding scheme, and the wireless communication base station updates the corresponding information in the connection management table when receiving the renotification of the usable modulation and coding scheme or the renotifications of the usable frequency channel and the usable modulation and coding scheme from the wireless communication terminal whose connection is permitted.

(Effect of Additional Statement (22-2))

The wireless communication base station is notified again of the information when the modulation and coding scheme which can be used by the wireless communication terminal is changed, so that the wireless communication terminal and the wireless communication base station can conduct the communication with each other by the appropriate modulation and coding scheme which is supported with the communication state of the wireless communication terminal.

(23-1) In accordance with a fifty-fourth aspect of the embodiments, a wireless communication system is the wireless communication system described in the additional statement (21), (21-1), (22), or (22-1), and is characterized in that the wireless communication base station notifies the wireless communication terminal on the second frequency channel of the communication system or modulation and coding scheme used on the second frequency channel.

(Effect of Additional Statement (23-1))

The notification of the communication system or modulation and coding scheme used on the second frequency channel is made on the second frequency channel, so that other wireless communication base stations or wireless communication terminals which are receivable on the second frequency channel can recognize what communication system or modulation and coding scheme is used on the second frequency channel by the wireless communication base station. In other wireless communication base stations or wireless communication terminals, an interference-prevention measure can be taken by the recognition. In the wireless communication terminal, the wireless communication base station can be specified as a candidate of a connected wireless communication base station by such recognition.

(23-2) In accordance with a fifty-fifth aspect of the embodiments, a wireless communication system is the wireless communication system described in the additional statement (21), (21-1), (22), or (22-1), and is characterized in that the wireless communication base station notifies the wireless communication terminal on the second frequency channel that the wireless communication base station has the same first frequency channel.

(Effect of Additional Statement (23-2))

The notification of the identifier of the wireless communication base station is made on the second frequency channel, so that the notification that the same wireless communication base station is operated on the first and second frequency channels is made on the second frequency channel. In other wireless communication base stations or wireless communication terminals, an interference-prevention measure can be taken by such recognition. The wireless communication terminal can recognize the wireless communication base station to send the wireless packet. Additionally, the wireless communication terminal conducts the communication with the wireless communication base station on the first frequency channel, changes the first frequency channel to the second frequency channel, and conducts the communication again with the wireless communication base station.

(23-2-1-1) In accordance with a fifty-sixth aspect of the embodiments, a wireless communication system is the wireless communication system described in the additional statement (23-2), and is characterized in that the wireless communication base station sends a wireless packet on all wireless packet sendable and receivable frequency channels, the wireless packet being addressed to all or a part of plural wireless communication terminals, the wireless communication terminals being connected on one of frequency channels in wireless packet sendable and receivable states.

(Effect of Additional Statement (23-2-1-1))

The wireless packet addressed to the plural wireless communication terminals is sent on all the wireless packet sendable and receivable frequency channels, so that the destination wireless communication terminal that can move the frequency channel can securely receive the wireless packet. Additionally, it is not necessary that the wireless communication base station correctly specify the connected frequency channel including the movement of the frequency channel to connect wireless communication terminal in transmitting the wireless packet, so that the load on processing can be reduced.

(23-2-1-2) In accordance with a fifty-seventh aspect of the embodiments, a wireless communication system is the wireless communication system described in the additional statement (23-2-1-1), and is characterized in that the wireless communication base station inserts an identical value in a item indicating the order of a delivery number when transmitting the wireless packet addressed to all or a part of plural wireless communication terminals on all the wireless packet sendable and receivable frequency channels.

(Effect of Additional Statement (23-2-1-2))

The identical value is inserted in the item indicating the order of the delivery number when the wireless packet addressed to the same plural wireless communication terminals is sent on the plural frequency channels. Therefore, when the transmission timing is shifted between the plural frequency channels, the wireless communication terminal which is moved between the frequency channels during the shift of the transmission timing or the wireless communication terminal which is receivable on the plural frequency channels can recognize that the received packets are overlapping even if the wireless communication terminal receives the same packets on the plural frequency channels.

(23-2-2-1) In accordance with a fifty-eighth aspect of the embodiments, a wireless communication system is the wireless communication system described in the additional statement (23-2), and is characterized in that, in the wireless communication base station, a first item and a second item are provided in the wireless packet used in the notification, the first item indicating the identifier of the wireless communication base station which is also used in the wireless communication base station which can conduct communication only on the single frequency channel, the identifier inserted in the first item differs from channel to channel, and the identifier indicating the same wireless communication base station between the frequency channels is inserted in the second field.

(Effect of Additional Statement (23-2-2-1))

The notification of the same wireless communication base station as the first frequency channel is made by the item different from the item indicating the identifier of the wireless communication base station which is used in the wireless communication base station which can conduct the communication only on the single frequency channel. Therefore, when the notification is received by the wireless communication terminal which can be connected only to the wireless communication base station which can conduct the communication only on the single frequency channel, the wireless communication base station which can conduct the communication only on the single frequency channel can be recognized as another wireless communication base station to connect the wireless communication terminal to the wireless communication base station. In the wireless communication terminal which can be connected to the wireless communication base station which can conduct the communication on the plural frequency channels, the wireless communication terminal can recognize the wireless communication base station which can conduct the communication on the plural frequency channels as the same wireless communication base station to connect the wireless communication terminal to the wireless communication base station.

(25) In accordance with a fifty-ninth aspect of the embodiments, a wireless communication system is the wireless communication system described in the additional statement (21), (21-1), (22), or (22-1), and is characterized in that the identifier of the wireless communication terminal in the connection management table retained by the wireless communication base station is a management number allocated to the wireless communication terminal when the wireless communication base station permits the wireless communication terminal to be connected thereto.

(Effect of Additional Statement (25))

The management number allocated to the wireless communication terminal when the wireless communication base station permits the wireless communication terminal to be connected thereto is retained as the identifier of the wireless communication terminal by the connection management table, so that the wireless communication base station can identify the wireless communication terminal using the unique identifier, and the management of the wireless communication terminal can be simplified.

(26) In accordance with a sixtieth aspect of the embodiments, a wireless communication system is the wireless communication system described in the additional statement (21), (21-1), (22), or (22-1), and is characterized in that the wireless communication base station includes a queue in which the sent wireless packet is stored in each frequency channel, and the wireless packet addressed to the wireless communication terminal is moved from a first queue for the first frequency channel to a second queue for the second frequency channel when the wireless communication base station permits the request from the wireless communication terminal to change the first frequency channel to the second frequency channel is permitted.

(Effect of Additional Statement (26))

The wireless communication base station includes the queue in which the sent wireless packet is stored in each frequency channel, and the wireless packet addressed to the wireless communication terminal is moved to the transmission queue of the supported frequency channel in response to the frequency channel change request from the wireless communication terminal. Therefore, the wireless communication terminal moved between the frequency channels can send the wireless packet addressed to the wireless communication terminal on the appropriate frequency channel on which the communication is conducted.

(27) In accordance with a sixty-first aspect of the embodiments, a wireless communication system is the wireless communication system described in the additional statement (21), (21-1), (22), or (22-1), and is characterized in that, when the wireless communication base station permits the request from the wireless communication terminal to change the first frequency channel to the second frequency channel, the wireless communication base station starts the communication with the wireless communication terminal on the second frequency channel after at least a fixed time elapses since the permission.

(Effect of Additional Statement (27))

The wireless communication base station starts the communication with the wireless communication terminal on the changed frequency channel after at least the fixed time elapses since the request from the wireless communication terminal to change the first frequency channel to the second frequency channel is permitted. Therefore, a delay can be granted in order to prepare the start of the communication between the wireless communication base station and the wireless communication terminal on the changed frequency channel.

(27-1) In accordance with a sixty-second aspect of the embodiments, a wireless communication system is the wireless communication system described in the additional statement (27), and is characterized in that at least a time necessary to move the frequency channel of the wireless communication terminal is set at the fixed time.

(Effect of Additional Statement (27-1))

The communication is started between the wireless communication base station and the wireless communication terminal on the changed frequency channel after at least the time necessary to move the frequency channel of the wireless communication terminal elapses. Therefore, that the wireless communication terminal is in the receivable state on the changed frequency channel can be assured to start the transmission of the wireless packet.

(27-1-1) In accordance with a sixty-third aspect of the embodiments, a wireless communication system is the wireless communication system described in the additional statement (27-1), and is characterized in that the wireless communication base station obtains a time necessary to change the frequency channel from the wireless communication terminal before permitting the request to change the first frequency channel to the second frequency channel of the wireless communication terminal.

(Effect of Additional Statement (27-1-1))

The time necessary to change the frequency channel is obtained from the wireless communication terminal before the request to change the first frequency channel to the second frequency channel is permitted, and the time necessary to move the frequency channel of the wireless communication terminal is correctly recognized. Then the communication is started between the wireless communication base station and the wireless communication terminal on the changed frequency channel after at least the time elapses, so that a degree of certainty can be enhanced for the assurance that the wireless communication terminal is in the receivable state on the changed frequency channel.

(27-2) In accordance with a sixty-fourth aspect of the embodiments, a wireless communication system is the wireless communication system described in the additional statement (26), and is characterized in that, when the wireless communication base station permits the request from the wireless communication terminal to change the first frequency channel to the second frequency channel, the wireless communication base station starts the communication with the wireless communication terminal on the second frequency channel after at least the time necessary to move the wireless packet from the first queue to the second queue in the wireless communication base station elapses since the permission.

(Effect of Additional Statement (27-2))

The wireless communication base station starts the communication with the wireless communication terminal on the changed frequency channel after at least the time necessary to move the wireless packet addressed to the wireless communication terminal between the queues in the wireless communication base station elapses, so that the wireless packet addressed to the wireless communication terminal can surely be sent to the wireless communication terminal on the changed frequency channel.

(27-3) In accordance with a sixty-fifth aspect of the embodiments, a wireless communication system is the wireless communication system described in the additional statement (27), and is characterized in that a determination of the fixed time is made by exchange of the wireless packet between the wireless communication base station and the wireless communication terminal before the change to the second frequency channel is permitted.

(Effect of Additional Statement (27-3))

The time to start the communication with the wireless communication terminal on the changed frequency channel is determined by the exchange of the wireless packet, so that the start of the communication can be assured after the communication can surely be conducted between the wireless communication base station and the wireless communication terminal on the changed frequency channel.

(28) In accordance with a sixty-sixth aspect of the embodiments, a wireless communication system is the wireless communication system described in the additional statement (21), (21-1), (22), or (22-1), and is characterized in that the wireless communication base station notifies the wireless communication terminal on the first frequency channel of a usage rate of the second frequency channel, and the wireless communication terminal determines whether or not the wireless communication terminal sends the request to transfer to the second frequency channel based on the usage rate of the second frequency channel from the wireless communication base station.

(Effect of Additional Statement (28))

The wireless communication base station notifies the wireless communication terminal of the usage rate of another frequency channel. Therefore, the wireless communication base station can provide the information as to whether or not the wireless communication terminal makes the transition to another frequency channel, and the wireless communication terminal can make the determination of the transition to another frequency channel based on the information to assure the communication on the transferred frequency channel.

(29) In accordance with a sixty-seventh aspect of the embodiments, a wireless communication system is the wireless communication system described in the additional statement (21), (21-1), (22), or (22-1), and is characterized in that the wireless communication base station notifies the wireless communication terminal on the first frequency channel of a second bandwidth which is the bandwidth of the second frequency channel, and the wireless communication terminal determines whether or not the wireless communication terminal sends the request to transfer to the second frequency channel based on the second bandwidth from the wireless communication base station.

(Effect of Additional Statement (29))

The wireless communication base station notifies the wireless communication terminal of the bandwidth of another frequency channel, so that the wireless communication terminal can make the determination of whether or not another frequency channel has a bandwidth in which the wireless communication terminal can conduct communication, and assure the communication on the transferred frequency channel.

(30) In accordance with a sixty-eighth aspect of the embodiments, a wireless communication system is the wireless communication system described in the additional statement (21), (21-1), (22) or (22-1), and is characterized in that the wireless communication base station retains security information in the connection management table while correlating the security information with the identifier of the wireless communication terminal, the security information being set in conducting the communication with the wireless communication terminal on the first frequency channel, and the communication is conducted with the wireless communication terminal on the second frequency channel using the retained security information when the request from the wireless communication terminal to change the first frequency channel to the second frequency channel is permitted.

(Effect of Additional Statement (30))

The wireless communication base station manages the security information along with the identifier of the wireless communication terminal, and the same security information is used on the changed frequency channel when the request of the change to another frequency channel is permitted, so that the communication can be started between the wireless communication base station and the wireless communication terminal unless the security setting is performed again on the changed frequency channel.

(30-1) In accordance with a sixty-ninth aspect of the embodiments, a wireless communication system is the wireless communication system described in the additional statement (30), and is characterized in that the wireless communication terminal notifies the wireless communication base station on the first frequency channel of the security system which can be used on the first and second frequency channels, the wireless communication base station retains a security system which can be used by the wireless communication terminal in the connection management table while correlating the security system with the identifier of the wireless communication terminal, the wireless communication terminal notifying the wireless communication base station of the security system, the wireless communication base station refers to whether or not the security system is matched with a security system necessary for the wireless communication base station on the second frequency channel from the connection management table when the wireless communication terminal makes the request to change the first frequency channel to the second frequency channel, and the reference is used to make the determination of the permission.

(Effect of Additional Statement (30-1))

The wireless communication base station recognizes the security system which can be used by the wireless communication terminal before the request of the change to another frequency channel, and uses the security system for determining whether or not the wireless communication base station permits the request of the change to another frequency channel, so that the security can be retained on another frequency channel. Additionally, when the security system necessary for the wireless communication base station is not satisfied, the wireless communication terminal previously recognizes the connection request from the wireless communication terminal which is known to be rejected on another frequency channel, so that the occupancy of the frequency channel caused by the exchange of the wireless packet due to the wasted connection can be reduced. When the wireless communication base station permits the wireless communication terminal to be changed to another frequency channel, the information on the security system of which the wireless communication terminal notifies the wireless communication base station can be used in the communication with the wireless communication terminal on the changed frequency channel.

(30-1-1) In accordance with a seventieth aspect of the embodiments, a wireless communication system is the wireless communication system described in the additional statement (30-1), and is characterized in that, when the wireless communication base station permits the request from the wireless communication terminal of the change to the second frequency channel, the communication is conducted with the wireless communication terminal on the second frequency channel using information on the retained security setting when a first security system used on the first frequency channel can be used on the second frequency channel, one of the corresponding security systems which are supported with the second frequency channel of the wireless communication base station in the security systems which can be used on the second frequency channel by the wireless communication terminal is selected as a second security system from the connection management table when the first security system cannot be used on the second frequency channel, and the second security system is set before the communication is conducted with the wireless communication terminal using the security system on the second frequency channel.

(Effect of Additional Statement (30-1-1))

When the security system before the frequency channel change can be used as the frequency channel after the frequency channel change, the communication is conducted using the same security information, so that the re-setting of the exchange of the wireless packet can be omitted. The exchange of the wireless packet is re-set in order to use the security system on the changed frequency channel. When the security systems supported with the wireless communication terminal exist in the security systems necessary for the wireless communication base station although the security system before the frequency channel change cannot be used on the changed frequency channel, the setting of one of the security systems which are supported with the wireless communication terminal is performed on the changed frequency channel between the wireless communication base station and the wireless communication terminal, so that the security necessary for the wireless communication base station on the changed frequency channel can be retained.

(30-2) In accordance with a seventieth aspect of the embodiments, a wireless communication system is the wireless communication system described in the additional statement (30-1), and is characterized in that the wireless communication base station notifies the wireless communication terminal on the first frequency channel of the security system necessary for the second frequency channel.

(Effect of Additional Statement (30-2))

The wireless communication base station notifies the wireless communication terminal of the security level necessary for another frequency channel. Therefore, a security level necessary for another frequency channel can be changed, and the wireless communication terminal can determine whether or not another frequency channel is supported with the security system of the wireless communication terminal.

(31-0-1) The wireless communication base station described in the additional statement (1) or (1-1), the wireless communication terminal described in the additional statement (11) or (11-1), or the wireless communication system described in the additional statement (21) or (21-1) is characterized in that the communication system which can be used by the wireless communication terminal is a communication system which can be received at least by the wireless communication terminal.

(Effect of Additional Statement (31-0-1))

The wireless communication terminal notifies the wireless communication base station of the communication system which can be received by the wireless communication terminal. Therefore, a selection range of the communication system addressed to the wireless communication terminal from the wireless communication base station can be widened, when the receivable communication system differs from the sendable communication system, particularly when the range of the receivable communication system is wider than that of the sendable communication system.

(31-0-2) The wireless communication base station described in the additional statement (1) or (1-1), the wireless communication terminal described in the additional statement (11) or (11-1), or the wireless communication system described in the additional statement (21) or (21-1) is characterized in that the communication system which can be used by the wireless communication terminal is a communication system which can be received and sent at least by the wireless communication terminal.

(Effect of Additional Statement (31-0-2))

The wireless communication base station is notified of the communication system which can be received and sent by the wireless communication terminal, so that the wireless communication base station can perform the transmission by the communication system which can be received by the wireless communication terminal. The wireless communication base station recognizes the communication system which can be sent from the wireless communication terminal, so that the communication system which can be sent from the wireless communication terminal can be used as information in performing adaptive control. The type of the communication system of the wireless packet sent from the wireless communication terminal is narrowed, so that the wireless communication base station can easily correspond to the reception system.

(31-0-3) The wireless communication base station described in the additional statement (1) or (1-1), the wireless communication terminal described in the additional statement (11) or (11-1), or the wireless communication system described in the additional statement (21) or (21-1) is characterized in that the communication system which can be used by the wireless communication terminal is a communication system in which communication system that can be received by the wireless communication terminal and a communication system that can be sent by the wireless communication terminal are distinguished from each other.

(Effect of Additional Statement (31-0-3))

The wireless communication terminal notifies the wireless communication base station of the communication system which can be received by the wireless communication terminal. Therefore, a selection range of the communication system addressed to the wireless communication terminal from the wireless communication base station can be widened, when the receivable communication system differs from the sendable communication system, particularly when the range of the receivable communication system is wider than that of the sendable communication system.

The wireless communication base station is notified of the communication system which can be sent by the wireless communication terminal, so that the wireless communication base station can use the communication system which can be sent from the wireless communication terminal as information in performing adaptive control of the communication between the wireless communication base station and the wireless communication terminal. The type of the communication system of the wireless packet sent from the wireless communication terminal is narrowed, so that the wireless communication base station can easily correspond to the reception system.

(31-1-1) The wireless communication base station described in the additional statement (1) or (1-1), the wireless communication terminal described in the additional statement (11) or (11-1), or the wireless communication system described in the additional statement (21) or (21-1) is characterized in that the modulation and coding scheme which can be used by the wireless communication terminal is a modulation and coding scheme which can be received at least by the wireless communication terminal.

(Effect of Additional Statement (31-1-1))

The wireless communication terminal notifies the wireless communication base station of the modulation and coding scheme which can be received by the wireless communication terminal. Therefore, a selection range of the modulation and coding scheme addressed to the wireless communication terminal from the wireless communication base station can be widened, when the receivable modulation and coding scheme differs from the sendable modulation and coding scheme, particularly when the range of the receivable modulation and coding scheme is wider than that of the sendable modulation and coding scheme.

(31-1-2) The wireless communication base station described in the additional statement (1) or (1-1), the wireless communication terminal described in the additional statement (11) or (11-1), or the wireless communication system described in the additional statement (21) or (21-1) is characterized in that the modulation and coding scheme which can be used by the wireless communication terminal is a modulation and coding scheme which can be received and sent by the wireless communication terminal.

(Effect of Additional Statement (31-1-2))

The wireless communication base station is notified of the modulation and coding scheme which can be received and sent by the wireless communication terminal, so that the wireless communication base station can perform the transmission by the modulation and coding scheme which can be received by the wireless communication terminal. The wireless communication base station recognizes the modulation and coding scheme which can be sent from the wireless communication terminal, so that the modulation and coding scheme which can be sent from the wireless communication terminal can be used as information in performing adaptive control. The type of the modulation and coding scheme of the wireless packet sent from the wireless communication terminal is narrowed, so that the wireless communication base station can easily correspond to the reception system.

(31-1-3) The wireless communication base station described in the additional statement (1) or (1-1), the wireless communication terminal described in the additional statement (11) or (11-1), or the wireless communication system described in the additional statement (21) or (21-1) is characterized in that the modulation and coding scheme which can be used by the wireless communication terminal is a modulation and coding scheme in which a modulation and coding scheme that can be received by the wireless communication terminal and a modulation and coding scheme that can be sent by the wireless communication terminal are distinguished from each other.

(Effect of Additional Statement (31-1-3))

The wireless communication terminal notifies the wireless communication base station of the modulation and coding scheme which can be received by the wireless communication terminal. Therefore, a selection range of the modulation and coding scheme addressed to the wireless communication terminal from the wireless communication base station can be widened, when the receivable modulation and coding scheme differs from the sendable modulation and coding scheme, particularly when the range of the receivable modulation and coding scheme is wider than that of the sendable modulation and coding scheme.

The wireless communication base station is notified of the modulation and coding scheme which can be sent by the wireless communication terminal, so that the wireless communication base station can use the modulation and coding scheme which can be sent from the wireless communication terminal as information in performing adaptive control of the communication between the wireless communication base station and the wireless communication terminal. The type of the modulation and coding scheme of the wireless packet sent from the wireless communication terminal is narrowed, so that the wireless communication base station can easily correspond to the reception system.

(32-1) The wireless communication base station described in the additional statement (8), the wireless communication terminal described in the additional statement (17), or the wireless communication system described in the additional statement (28) is characterized in that the usage rate of the second frequency channel is an average amount of data which the wireless communication base station sends per unit time on the second frequency channel.

(Effect of Additional Statement (32-1))

The wireless communication base station provides the average amount of data which is sent per unit time on another frequency channel, so that the wireless communication base station can provide the information to the wireless communication terminal in order to make the determination of the transition to another frequency channel.

(32-2) The wireless communication base station described in the additional statement (8), the wireless communication terminal described in the additional statement (17), or the wireless communication system described in the additional statement (28) is characterized in that the usage rate of the second frequency channel is a channel occupancy rate of the wireless communication base station on the second frequency channel.

(Effect of Additional Statement (32-2))

The wireless communication base station provides the channel occupancy rate on another frequency channel, so that the wireless communication base station can provide the information to the wireless communication terminal in order to make the determination of the transition to another frequency channel.

(32-3) The wireless communication base station described in the additional statement (8), the wireless communication terminal described in the additional statement (17), or the wireless communication system described in the additional statement (28) is characterized in that the usage rate of the second frequency channel is an average time to obtain an access right since the access request is made when the wireless communication base station sends the wireless packet on the second frequency channel.

(Effect of Additional Statement (32-3))

The wireless communication base station provides the average time to obtain the access right on another frequency channel, so that the wireless communication base station can provide the information to the wireless communication terminal in order to make the determination of the transition to another frequency channel.

(33-1) The wireless communication base station described in the additional statement (9), the wireless communication terminal described in the additional statement (18), or the wireless communication system described in the additional statement (29) is characterized in that the second bandwidth is at least two and an integral multiple of the first bandwidth which is the bandwidth of the first frequency channel.

(Effect of Additional Statement (33-1))

The wireless communication base station provides the information that the bandwidth of another frequency channel is at least two and the integral multiple of the first bandwidth to the wireless communication terminal. Therefore, the wireless communication terminal can easily determine whether or not another frequency channel has the bandwidth in which the wireless communication terminal can conduct the communication, and the bandwidth extended communication system can easily be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus capable of controlling communication on at least a first frequency channel and a second frequency channel, comprising:
    a baseband processor to generate a beacon frame, the beacon frame, via the first frequency channel, notifying of an identifier of the second frequency channel, frequency band information on the second frequency channel, and a group identifier which is used on the second frequency channel, a group of the group identifier being a system component configured by the wireless communication apparatus and that controls to transmit and receive frames on the first frequency channel and the second frequency channel,
    wherein each of the frames includes a source address and a destination address, and the baseband processor controls to:
    receive, via the first frequency channel, a connection request frame in which a first address is specified as the source address;
    receive, via the first frequency channel, a change request frame to change to the second frequency channel in which the first address is specified as the source address, after permitting a connection request by the connection request frame, and
    conduct, via the second frequency channel, sending of a frame in which the first address is specified as the destination address and receiving of a frame in which the first address is specified as the source address, after permitting a change request by the change request frame.

2. The apparatus according to claim 1, wherein the baseband processor further makes a notification of a communication system which is used on the second frequency channel.

3. The apparatus according to claim 2, wherein the communication system includes a plurality of modulation and coding schemes, and wherein the baseband processor controls to conduct, via the second frequency channel, sending of the frame in which the first address is specified as the destination address and receiving of the frame in which the first address is specified as the source address, using one of the modulation and coding schemes if the change request by the change request frame is permitted.

4. The apparatus according to claim 1, wherein the baseband processor makes, via the second frequency channel, a notification of an identifier of the first frequency channel, frequency band information on the first frequency channel, and a group identifier of a group to which the wireless communication apparatus belongs on the first frequency channel.

5. The apparatus according to claim 1, wherein the baseband processor controls to send, via the first frequency channel, a first response frame by which the change request to change to the second frequency channel is permitted,
    controls to receive, via the second frequency channel, a change completion notification frame by which a notification of completion of a change to the second frequency channel is made, wherein the first address is specified as the source address, and
    controls to send, via the second frequency channel, a second response frame.

6. The apparatus according to claim 1, further comprising a connection management table which retains a communication system along with the first address, wherein the communication system is notified by a frame in which the first address is specified as the source address, and the baseband processor refers to the connection management table to determine the communication system to be used for sending the frame in which the first address is specified as the destination address and receiving the frame in which the first address is specified as the source address.

7. A wireless communication apparatus capable of controlling communication on at least a first frequency channel and a second frequency channel and selecting at least one of the first and second frequency channels, comprising:
    a baseband processor that controls to receive, via the first frequency channel, information on a third frequency channel, the information including frequency band information on the third frequency channel and a group identifier which is used on the third frequency channel and controls
    to send and receive frames on the first frequency channel and the second frequency channel,
    wherein each of the frames includes a source address and a destination address, and wherein the baseband processor controls to:
    send, via the first frequency channel, a connection request frame in which a first address is specified as the destination address;
    receive a permission with respect to the connection request frame;
    send a change request frame to change to the second frequency channel in which the first address is specified as the destination address, if the third frequency channel corresponds to the second frequency channel; and
    conduct communication on the second frequency channel using the information on the third frequency channel, after a permission with respect to the change request frame is received.

8. The apparatus according to claim 7, wherein the connection request frame includes information on communication systems which can be used on the first frequency channel and the second frequency channel, and wherein the baseband processor controls to:
  conduct communication on the first frequency channel, using one of the communication systems which can be used on the first frequency channel, and
  if the permission with respect to the change request frame to change to the second frequency channel is received, conduct the communication on the second frequency channel, using one of the communication systems which can be used on the second frequency channel.

9. The apparatus according to claim 8, wherein the communication systems include a plurality of modulation and coding schemes and the baseband processor
  controls to conduct, via the first frequency channel, the communication using one of the modulation and coding schemes which can be used on the first frequency channel, and
  if the permission with respect to the change request frame to change to the second frequency channel is received, controls to conduct, via the second frequency channel, the communication using one of the modulation and coding schemes which can be used on the second frequency channel.

10. A wireless communication apparatus capable of controlling communication on at least a first frequency channel and a second frequency channel, comprising:
  a baseband processor to generate a beacon frame, the beacon frame, via the first frequency channel, notifying of a channel bandwidth and a center frequency of the second frequency channel, and that controls to transmit and receive frames on the first frequency channel and the second frequency channel,
  wherein each of the frames includes a source address and a destination address, and the baseband processor controls to:
  receive, via the first frequency channel, a connection request frame in which a first address is specified as the source address;
  receive, via the first frequency channel, a change request frame to change to the second frequency channel in which the first address is specified as the source address, after permitting a connection request by the connection request frame,
  send, via the first frequency channel, an acknowledgement frame in which the first address is specified as the destination address, and
  conduct, via the second frequency channel, sending of a frame in which the first address is specified as the destination address and receiving of a frame in which the first address is specified as the source address.

11. The apparatus according to claim 10, wherein the baseband processor further makes a notification of a communication system which is used on the second frequency channel.

12. The apparatus according to claim 11, wherein the communication system includes a plurality of modulation and coding schemes, and the baseband processor controls to conduct, via the second frequency channel, sending of the frame in which the first address is specified as the destination address and receiving of the frame in which the first address is specified as the source address, using one of the modulation and coding schemes if a change request by the change request frame is permitted.

13. The apparatus according to claim 10, wherein the connection request frame and the change request frame are unicast management frames.

14. The apparatus according to claim 10, wherein the acknowledgement frame is a control frame.

15. The apparatus according to claim 10, wherein the first frequency channel and the second frequency channel partly overlap each other on frequencies.

16. The apparatus according to claim 10, further comprising a connection management table which retains a communication system along with the first address, wherein the communication system is notified by a frame in which the first address is specified as the source address, and the baseband processor refers to the connection management table to determine the communication system to be used for sending the frame in which the first address is specified as the destination address and receiving the frame in which the first address is specified as the source address.

17. A wireless communication apparatus capable of controlling communication on at least a first frequency channel and a second frequency channel and selecting at least one of the first and second frequency channels, comprising:
  a baseband processor that controls to receive, via the first frequency channel, information on a third frequency channel, the information including a channel bandwidth and a center frequency of the third frequency channel, and
  controls to send and receive frames on the first frequency channel and the second frequency channel,
  wherein each of the frames includes a source address and a destination address, and the baseband processor controls to:
  send, via the first frequency channel, a connection request frame in which a first address is specified as the destination address;
  receive a permission with respect to the connection request frame;
  send a change request frame to change to the second frequency channel in which the first address is specified as the destination address, if the third frequency channel corresponds to the second frequency channel; and
  conduct communication on the second frequency channel using the information on the third frequency channel, after a permission with respect to the change request frame is received.

18. The apparatus according to claim 17, wherein the connection request frame includes information on communication systems which can be used on the first frequency channel and the second frequency channel, and the baseband processor controls to:
  conduct communication on the first frequency channel, using one of the communication systems which can be used on the first frequency channel, and
  if the permission with respect to the change request frame to change to the second frequency channel is received, controls to conduct the communication on the second frequency channel, using one of the communication systems which can be used on the second frequency channel.

19. The apparatus according to claim 18, wherein the communication systems include a plurality of modulation and coding schemes and the baseband processor
  controls to conduct, via the first frequency channel, the communication using one of the modulation and coding schemes which can be used on the first frequency channel, and if the permission with respect to the change request frame to change to the second frequency channel is received, controls to conduct, via the second frequency channel, the communication using one of the modulation and coding schemes which can be used on the second frequency channel.

20. The apparatus according to claim 17, wherein the connection request frame is an association request frame.

21. The apparatus according to claim 1, further comprising a first antenna capable of conducting communication on the first frequency channel and a second antenna capable of conducting communication on the second frequency channel, wherein the baseband processor controls to send and receive the frames using the first antenna and the second antenna.

22. The apparatus according to claim 1, further comprising an antenna capable of conducting communication on the first frequency channel and the second frequency channel, wherein the baseband processor controls to send and receive the frames using the antenna.

23. A wireless communication method capable of controlling communication on at least a first frequency channel and a second frequency channel, comprising:
generating a beacon frame, via the first frequency channel, the beacon frame notifying of an identifier of the second frequency channel, frequency band information on the second frequency channel, and a group identifier which is used on the second frequency channel, a group of the group identifier being a system component; and
controlling to transmit and receive frames on the first frequency channel and the second frequency channel,
wherein each of the frames includes a source address and a destination address, and the method further comprises:
controlling to receive, via the first frequency channel, a connection request frame in which a first address is specified as the source address;
controlling to receive, via the first frequency channel, a change request frame to change to the second frequency channel in which the first address is specified as the source address, after permitting a connection request by the connection request frame, and
controlling to conduct, via the second frequency channel, sending of a frame in which the first address is specified as the destination address and receiving of a frame in which the first address is specified as the source address, after permitting a change request by the change request frame.

24. A wireless communication method capable of controlling communication on at least a first frequency channel and a second frequency channel and selecting at least one of the first and second frequency channels, comprising:
controlling to receive, via the first frequency channel, information on a third frequency channel, the information including frequency band information on the third frequency channel and a group identifier which is used on the third frequency channel; and
controlling to send and receive frames on the first frequency channel and the second frequency channel,
wherein each of the frames includes a source address and a destination address, and the method further comprises:
controlling to send, via the first frequency channel, a connection request frame in which a first address is specified as the destination address;
controlling to receive a permission with respect to the connection request frame;
controlling to send a change request frame to change to the second frequency channel in which the first address is specified as the destination address, if the third frequency channel corresponds to the second frequency channel; and
controlling to conduct communication on the second frequency channel using the information on the third frequency channel, after a permission with respect to the change request frame is received.

25. A wireless communication method capable of controlling communication on at least a first frequency channel and a second frequency channel, comprising:
generating a beacon frame, via the first frequency channel, the beacon frame notifying a notification of a channel bandwidth and a center frequency of the second frequency channel; and
controlling to transmit and receive frames on the first frequency channel and the second frequency channel,
wherein each of the frames includes a source address and a destination address, and the method further comprises:
controlling to receive, via the first frequency channel, a connection request frame in which a first address is specified as the source address;
controlling to receive, via the first frequency channel, a change request frame to change to the second frequency channel in which the first address is specified as the source address, after permitting a connection request by the connection request frame,
controlling to send, via the first frequency channel, an acknowledgement frame in which the first address is specified as the destination address, and
controlling to conduct, via the second frequency channel, sending of a frame in which the first address is specified as the destination address and receiving of a frame in which the first address is specified as the source address.

26. A wireless communication method capable of controlling communication on at least a first frequency channel and a second frequency channel and selecting at least one of the first and second frequency channels, comprising:
controlling to receive, via the first frequency channel, information on a third frequency channel, the information including a channel bandwidth and a center frequency of the third frequency channel,
controlling to send and receive frames on the first frequency channel and the second frequency channel,
wherein each of the frames includes a source address and a destination address, and the method further comprises:
controlling to send, via the first frequency channel, a connection request frame in which a first address is specified as the destination address;
controlling to receive a permission with respect to the connection request frame;
controlling to send a change request frame to change to the second frequency channel in which the first address is specified as the destination address, if the third frequency channel corresponds to the second frequency channel; and
controlling to conduct communication on the second frequency channel using the information on the third frequency channel, after a permission with respect to the change request frame is received.

27. The apparatus according to claim 7, further comprising a first antenna capable of conducting communication on the first frequency channel and a second antenna capable of conducting communication on the second frequency channel, wherein the baseband processor controls to send and receive the frames using the first antenna and the second antenna.

28. The apparatus according to claim 10, further comprising a first antenna capable of conducting communication on the first frequency channel and a second antenna capable of conducting communication on the second frequency channel, wherein the baseband processor controls to send and receive the frames using the first antenna and the second antenna.

29. The apparatus according to claim 17, further comprising a first antenna capable of conducting communication on the first frequency channel and a second antenna capable of conducting communication on the second frequency channel, wherein the baseband processor controls to send and receive the frames using the first antenna and the second antenna.

30. The apparatus according to claim 7, further comprising an antenna capable of conducting communication on the first frequency channel and the second frequency channel, wherein the baseband processor controls to send and receive the frames using the antenna.

31. The apparatus according to claim 10, further comprising an antenna capable of conducting communication on the first frequency channel and the second frequency channel, wherein the baseband processor controls to send and receive the frames using the antenna.

32. The apparatus according to claim 17, further comprising an antenna capable of conducting communication on the first frequency channel and the second frequency channel, wherein the baseband processor controls to send and receive the frames using the antenna.

33. The apparatus according to claim 1, wherein the group of the group identifier is a Basic Service Set.

34. The apparatus according to claim 7, wherein the third frequency channel corresponds to the second frequency channel.

35. The apparatus according to claim 17, wherein the third frequency channel corresponds to the second frequency channel.

\* \* \* \* \*